(12) United States Patent
Ushiki

(10) Patent No.: US 8,320,747 B2
(45) Date of Patent: Nov. 27, 2012

(54) VIDEO QUALITY ESTIMATION APPARATUS, VIDEO QUALITY ESTIMATION METHOD, FRAME TYPE DETERMINATION METHOD, AND RECORDING MEDIUM

(75) Inventor: Kazunari Ushiki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 368 days.

(21) Appl. No.: 12/447,447

(22) PCT Filed: Aug. 22, 2008

(86) PCT No.: PCT/JP2008/065009
§ 371 (c)(1),
(2), (4) Date: Feb. 23, 2010

(87) PCT Pub. No.: WO2009/025357
PCT Pub. Date: Feb. 26, 2009

(65) Prior Publication Data
US 2010/0166388 A1 Jul. 1, 2010

(30) Foreign Application Priority Data

Aug. 22, 2007 (JP) ................................. 2007-216364
Apr. 15, 2008 (JP) ................................. 2008-105708

(51) Int. Cl.
*H04N 5/917* (2006.01)
*H04N 5/92* (2006.01)
*H04N 5/84* (2006.01)
*H04N 5/89* (2006.01)
*G06K 9/36* (2006.01)
*G06K 9/46* (2006.01)

(52) U.S. Cl. ........ 386/330; 386/326; 386/328; 386/329; 386/332; 386/334; 382/232; 382/235; 382/236; 382/238

(58) Field of Classification Search .................. 386/326, 386/328, 329, 330, 332, 334; 382/232, 235, 382/236, 238
See application file for complete search history.

(56) References Cited

U.S. PATENT DOCUMENTS 5,650,829 A * 7/1997 Sugimoto et al. ............. 348/699
6,011,868 A * 1/2000 van den Branden et al. . 382/233
6,988,238 B1 1/2006 Kovacevic et al.
7,835,615 B2 * 11/2010 Itoh et al. ...................... 386/241

FOREIGN PATENT DOCUMENTS

| JP | 2001-024994 A | 1/2001 |
| JP | 2006-033722 A | 2/2006 |
| JP | 2007-060475 A | 3/2007 |
| KR | 10-0740421 | 7/2007 |
| WO | WO 99/13648 A1 | 3/1999 |
| WO | WO 2006/114761 A1 | 11/2006 |
| WO | WO 2009/012297 A1 | 1/2009 |

* cited by examiner

*Primary Examiner* — Daquan Zhao
(74) *Attorney, Agent, or Firm* — Blakely, Sokoloff, Taylor & Zafman

(57) ABSTRACT

A frame type determination unit (15B) counts, as the frame data amount of each frame, the number of TS packets included in the frame based on a frame start position included in an input TS packet of video communication, and determines a frame type based on the large/small relationships between the frame data amounts of the frames. A video quality estimation unit (15C) estimates the video quality of the video communication based on the frame type of each frame obtained by the frame type determination unit (15B), the frame structure (14A) of an elementary stream read out from a storage unit (14), and a TS packet loss state detected from the TS packets of the video communication.

18 Claims, 49 Drawing Sheets

VIDEO QUALITY ESTIMATION APPARATUS, VIDEO QUALITY ESTIMATION METHOD, FRAME TYPE DETERMINATION METHOD, AND RECORDING MEDIUM

The present patent application is a national phase application of International Application No. PCT/JP2008/065009, filed Aug. 22, 2008.

TECHNICAL FIELD

The present invention relates to a video communication technique and, more particularly, to a video communication technique of converting an elementary stream, which is obtained by compression-coding a video signal to a plurality of types of frames, into TS packets and transmitting them.

BACKGROUND ART

When a compression-coding method such as MPEG-2 standard (ISO/IEC 13818) or H.246 is used in video distribution such as digital broadcasting using radio waves or video distribution such as digital broadcasting using a communication network, an original video image is compression-coded to frames (pictures) such as I, P, and B frames to generate an elementary stream, and the elementary stream is divided into packets called TS packets (Transport Stream Packets) and distributed.

If due consideration must be given to copyright in such video distribution, the payload portion of a TS packet where video data or audio data is stored is encrypted. The encrypted TS packet is received and decrypted by a reception terminal, and finally output as a video and supplied to a viewer.

In these video applications, if an atmospheric condition deteriorates in video distribution using radio waves, or packet loss or delay occurs in a network or a terminal for video distribution using a network, the video quality degrades, resulting in poor service quality. To provide a stable service, it is necessary to manage the quality of a communication network or a terminal to ensure predetermined video quality.

Such quality control requires to manage the quality state by measuring the influence of an atmospheric condition or network quality (e.g., packet loss or delay) on the quality of a video viewed by a user.

A video signal compressed by efficient encoding is transmitted using motion prediction encoding between frames. Since pieces of frame information on the preceding and succeeding sides are used, an atmospheric condition or TS packet loss in a network or a terminal, which causes loss of a packet, may degrade the video quality not only in one video frame but throughout a plurality of frames.

In this case, the video quality degrades in the decoded video of a succeeding frame even without packet loss. The atmospheric condition or packet loss on the network does not necessarily correspond to degradation in the video application. Hence, to accurately obtain the correspondence relationship between the atmospheric condition or network quality and the application quality, it is necessary to correctly grasp the range of influence of quality degradation based on encoded information.

To grasp the range of influence of quality degradation based on encoded information, a technique has been proposed, in which each packet is added with frame type information and distributed, and the receiving side acquires the frame type information and calculates the number of frames to be affected by degradation based on a degraded frame type and the states of preceding and succeeding frames (e.g., Japanese Patent Laid-Open No. 2006-33722). This technique is poor in versatility because frame type information needs to be added to each packet.

To grasp the range of influence of quality degradation based on encoded information, another technique has conventionally been proposed, which calculates the number of frames to be affected by degradation based on a degraded frame type and the states of preceding and succeeding frames (e.g., Japanese Patent Laid-Open No. 2007-60475).

DISCLOSURE OF INVENTION

Problem to be Solved by the Invention

However, the related art grasps the frame type of each frame of an elementary stream by analyzing the payload portion of a TS packet and is therefore inapplicable to an encoded payload portion.

The present invention has been made to solve this problem, and has as its object to provide a video quality estimation apparatus, video quality estimation method, frame type determination method, and recording medium capable of grasping the frame type of each frame and estimating video quality in consideration of the influence of a degraded frame even when the payload portion of a TS packet is encrypted.

Means of Solution to the Problem

In order to solve the above-described problem, according to the present invention, there is provided a video quality estimation method used by a video quality estimation apparatus including an arithmetic processing unit and a storage unit to estimate, based on TS packets, video quality of video communication which converts an elementary stream into TS packets and transmits the TS packets, the elementary stream being obtained by compression-coding a video signal into a plurality of kinds of frames, comprising the storage step of causing the storage unit to store a frame structure of the elementary stream, the frame type determination step of causing the arithmetic processing unit to count, as a frame data amount of each frame, the number of TS packets included in the frame based on a frame start position included in an input TS packet of the video communication, and determine a frame type based on a large/small relationships between the frame data amounts of the frames, and the video quality estimation step of causing the arithmetic processing unit to estimate the video quality of the video communication based on the frame type of each frame obtained in the frame type determination step, the frame structure of the elementary stream read out from the storage unit, and a TS packet loss state detected from the TS packets of the video communication.

According to the present invention, there is provided a video quality estimation apparatus for estimating, based on TS packets, video quality of video communication which converts an elementary stream into TS packets and transmits the TS packets, the elementary stream being obtained by compression-coding a video signal into a plurality of kinds of frames, comprising a storage unit which stores a frame structure of the elementary stream, a frame type determination unit which counts, as a frame data amount of each frame, the number of TS packets included in the frame based on a frame start position included in an input TS packet of the video communication, and determines a frame type based on a large/small relationships between the frame data amounts of the frames, and a video quality estimation unit which estimates the video quality of the video communication based on the frame type of each frame obtained by the frame type determination unit, the frame structure of the elementary stream read out from the storage unit, and a TS packet loss state detected from the TS packets of the video communication.

According to the present invention, there is provided a frame type determination method of causing a processing apparatus including an arithmetic processing unit and a storage unit to determine a type of each frame based on TS packets in video communication which converts an elementary stream into TS packets and transmits the TS packets, the elementary stream being obtained by compression-coding a video signal into a plurality of kinds of frames, comprising the storage step of causing the storage unit to store a frame structure of the elementary stream, and the frame type determination step of causing the arithmetic processing unit to count, as a frame data amount of each frame, the number of TS packets included in the frame based on a frame start position included in an input TS packet of the video communication, and determine a frame type based on a large/small relationships between the frame data amounts of the frames.

According to the present invention, there is provided a recording medium recording a program for a video quality estimation apparatus which includes an arithmetic processing unit and a storage unit and estimates, based on TS packets, video quality of video communication which converts an elementary stream into TS packets and transmits the TS packets, the elementary stream being obtained by compression-coding a video signal into a plurality of kinds of frames, the program causing the computer to execute a storage step of causing the storage unit to store a frame structure of the elementary stream, a frame type determination step of causing the arithmetic processing unit to count, as a frame data amount of each frame, the number of TS packets included in the frame based on a frame start position included in an input TS packet of the video communication, and determine a frame type based on a large/small relationships between the frame data amounts of the frames, and a video quality estimation step of causing the arithmetic processing unit to estimate the video quality of the video communication based on the frame type of each frame obtained in the frame type determination step, the frame structure of the elementary stream read out from the storage unit, and a TS packet loss state detected from the TS packets of the video communication.

According to the present invention, there is provided another recording medium recording a program for a processing apparatus which includes an arithmetic processing unit and a storage unit and determines a type of each frame based on TS packets in video communication which converts an elementary stream into TS packets and transmits the TS packets, the elementary stream being obtained by compression-coding a video signal into a plurality of kinds of frames, the program causing the computer to execute a storage step of causing the storage unit to store a frame structure of the elementary stream, and a frame type determination step of causing the arithmetic processing unit to count, as a frame data amount of each frame, the number of TS packets included in the frame based on a frame start position included in an input TS packet of the video communication, and determine a frame type based on a large/small relationships between the frame data amounts of the frames.

Effect of the Invention

According to the present invention, it is possible to grasp the frame type of each frame based on information obtained from an unencrypted TS header portion and accurately estimate video quality in consideration of the influence of a degraded frame even when the payload portion of a TS packet is encrypted.

BEST MODE FOR CARRYING OUT THE INVENTION

The embodiments of the present invention will now be described with reference to the accompanying drawings.

[First Embodiment]

Figure 1:
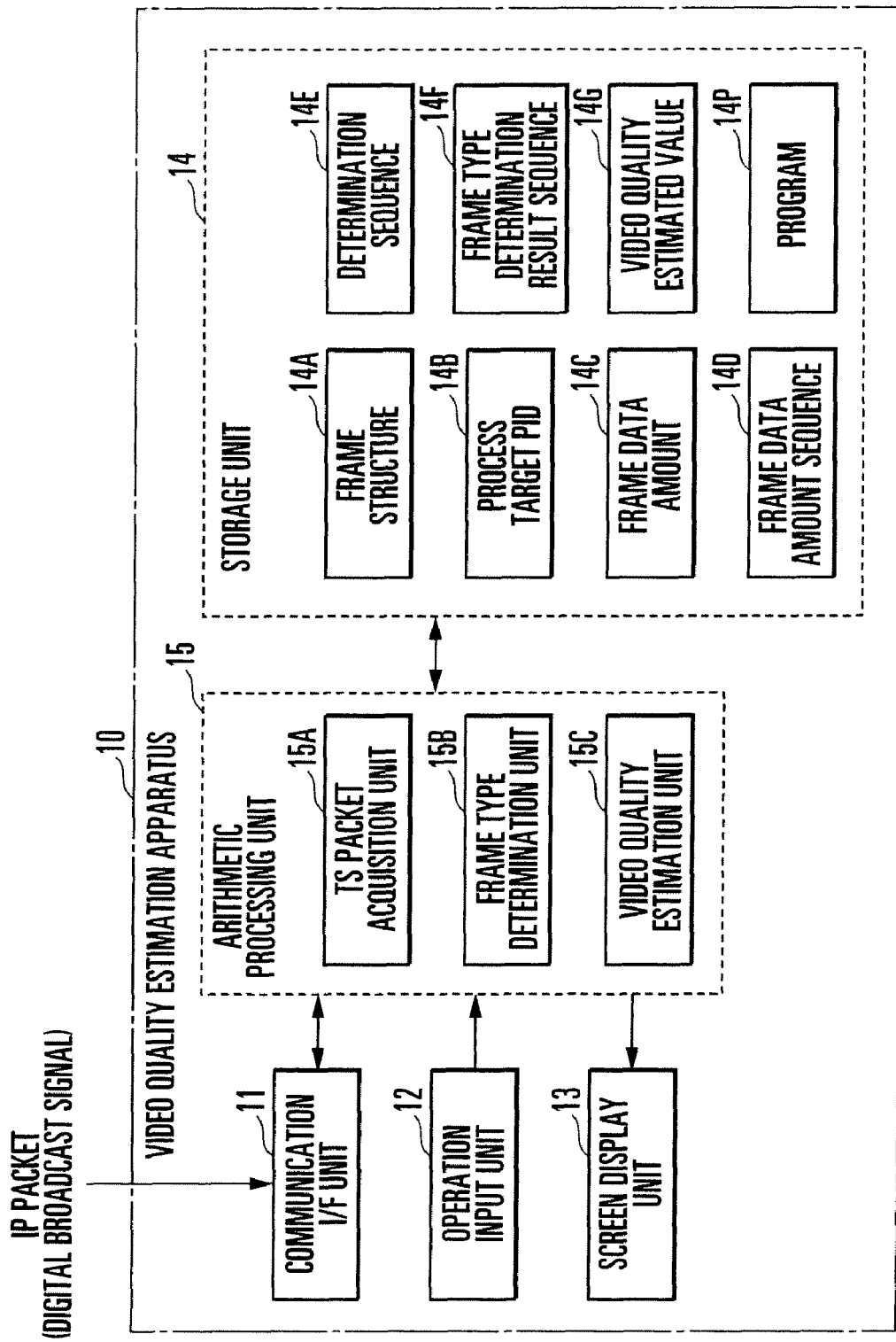
FIG. 1 is a block diagram showing the arrangement of a video quality estimation apparatus according to the first embodiment of the present invention.

A video quality estimation apparatus according to the first embodiment of the present invention will be described with reference to FIG. 1.

A video quality estimation apparatus 10 is formed from an information processing apparatus such as a computer which processes input data. The video quality estimation apparatus 10 has a function of estimating video quality based on a TS packet in video communication in which an elementary stream obtained by compression-coding a video signal to a plurality of types of frames (pictures) is converted into TS packets and transmitted from a transmission apparatus to a reception apparatus via digital broadcasting or a packet communication network such as the Internet.

The video quality estimation apparatus 10 includes, as main functional units, a communication interface unit (to be referred to as a communication I/F unit hereinafter) 11, operation input unit 12, screen display unit 13, storage unit 14, and arithmetic processing unit 15. The arithmetic processing unit 15 includes, as main processing units, a TS packet acquisition unit 15A, frame type determination unit 15B, and video quality estimation unit 15C.

In this embodiment, the frame type determination unit 15B counts, based on a frame start position included in an input TS packet of video communication, the number of TS packets included in each frame as the frame data amount of each frame, and determines the frame types based on the large/small relationships between the frame data amounts of the frames. The video quality estimation unit 15C estimates the video quality of the video communication based on the frame type of each frame obtained by the frame type determination unit 15B, the frame structure of the elementary stream read out from the storage unit 14, and a TS packet loss state detected from a TS packet of the video communication.

Figure 2:
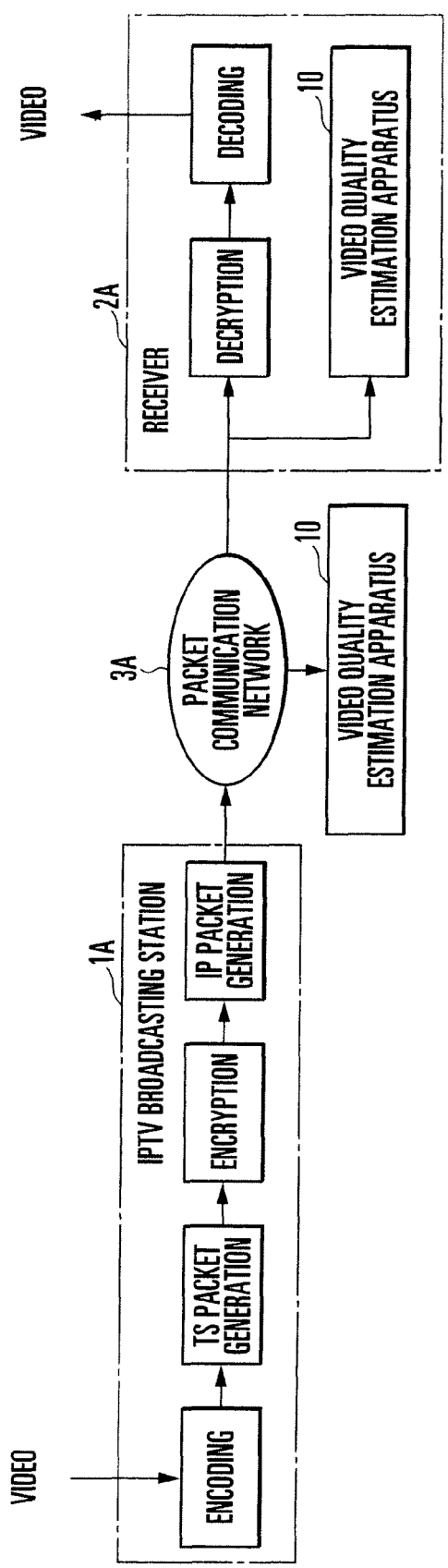
FIG. 2 is a block diagram showing an example of the arrangement of an IPTV system using the video quality estimation apparatus according to the present invention.

The video quality estimation apparatus according to the present invention is used in an IPTV system or a digital broadcasting system. An IPTV system shown in FIG. 2 is a video distribution system such as an Internet television system which converts a video signal into IP packets and distributes them via a packet communication network 3A. The IPTV system includes a transmission apparatus (IPTV broadcasting station) 1A and a reception apparatus 2A, which are connected to the packet communication network 3A.

The transmission apparatus 1A compression-codes a video signal into a plurality of types of frames by encoding based on MPEG-2 standard (ISO/IEC 13818), thereby generating an elementary stream. Then, the transmission apparatus 1A converts the elementary stream into TS packets, encrypts their payload portions, stores the TS packets in an IP packet, and transmits it to the packet communication network 3A.

The reception apparatus 2A extracts the TS packets from the IP packet received from the packet communication network 3A, decrypts the payload portions, and decodes the elementary stream generated from the obtained TS packets, thereby generating the desired video signal.

The video quality estimation apparatus 10 connected to the packet communication network 3A captures the IP packet of the target video communication, extracts the TS packets, identifies the frame types based on the TS packets, and estimates video quality based on the identification result. In this case, the video quality estimation apparatus 10 may be provided in the reception apparatus 2A, as shown in FIG. 2, to identify the frame types based on the TS packets generated in the reception apparatus 2A and estimate video quality based on the identification result.

Figure 3:
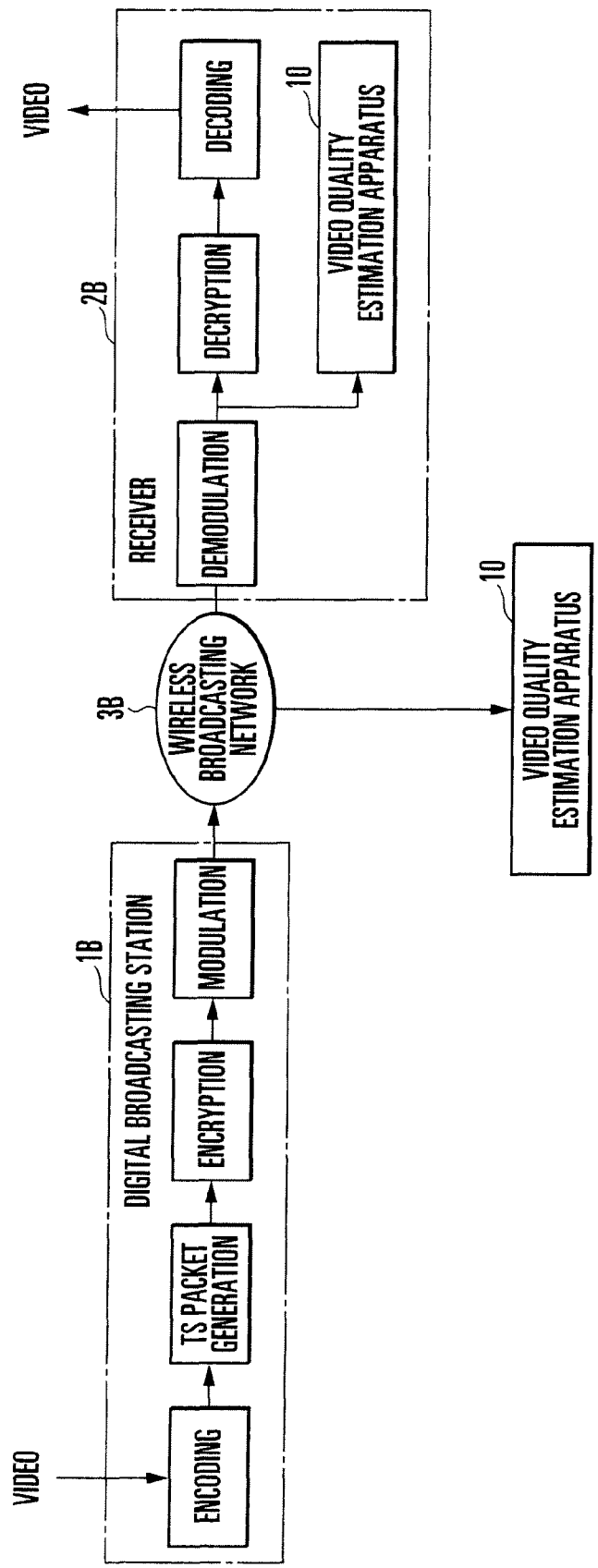
FIG. 3 is a block diagram showing an example of the arrangement of a digital broadcasting system using the video quality estimation apparatus according to the present invention.

A digital broadcasting system shown in FIG. 3 is a video distribution system such as terrestrial digital broadcasting or satellite broadcasting which compression-codes a video signal and distributes it via a wireless broadcasting network 3B. The digital broadcasting system includes a transmission apparatus (digital broadcasting station) 1B and a reception apparatus (TV receiver) 2B, which are connected to the wireless broadcasting network 3B.

The transmission apparatus 1B generates an elementary stream from a video signal, like the transmission apparatus 1A of the above-described IPTV system, modulates the elementary stream by, e.g., OFDM, and transmits it to the wireless broadcasting network 3B as a broadcast wave.

The reception apparatus 2B demodulates the broadcast wave received from the wireless broadcasting network 3B to generate the elementary stream, and then generates the desired video signal, like the reception apparatus 2A of the above-described IPTV system.

The video quality estimation apparatus 10 receives and demodulates the broadcast wave from the wireless broadcasting network 3B to generate the elementary stream, extracts the TS packets from the obtained elementary stream, identifies the frame types based on the TS packets, and estimates video quality based on the identification result. In this case, the receiver which receives and demodulates the broadcast wave from the wireless broadcasting network 3B to generate an IP packet of target video communication may be provided between the wireless broadcasting network 3B and the video quality estimation apparatus 10, as shown in FIG. 2.

Alternatively, the video quality estimation apparatus 10 may be provided in the reception apparatus 2B to identify the frame types based on the TS packets generated in the reception apparatus 2B and estimate video quality based on the identification result. At this time, the video quality estimation apparatus 10 may have a function of generating the IP packet of target video communication by receiving and demodulating the broadcast wave from the wireless broadcasting network 3B.

[Arrangement of Video Quality Estimation Apparatus]

The arrangement of the video quality estimation apparatus according to the first embodiment of the present invention will be described next in detail with reference to FIG. 1. An example will be explained here in which the video quality estimation apparatus is applied to the IPTV network shown in FIG. 2.

The video quality estimation apparatus 10 includes, as main functional units, the communication I/F unit 11, operation input unit 12, screen display unit 13, storage unit 14, and arithmetic processing unit 15.

The communication I/F unit 11 includes a dedicated communication circuit, and has a function of transmitting/receiving various kinds of IP packets via the packet communication network. When the video quality estimation apparatus is applied to the digital broadcasting system shown in FIG. 3, the communication I/F unit 11 may have a function of generating an IP packet by receiving and demodulating a broadcast wave.

The operation input unit 12 includes operation input devices such as a keyboard and a mouse, and has a function of detecting an operator's operation and outputting it to the arithmetic processing unit 15.

The screen display unit 13 is formed from a screen display device such as an LCD or PDP, and has a function of displaying, on the screen, various kinds of information such as an operation menu and a video quality estimation result in accordance with an instruction from the arithmetic processing unit 15.

The storage unit 14 includes a storage device such as a hard disk or a memory, and has a function of storing process information and a program 14P to be used in various kinds of processing by the arithmetic processing unit 15. The program 14P is read out in advance from an external device or a recording medium (not shown) via the data input/output function of, e.g., the communication I/F unit 11 provided in the video quality estimation apparatus 10 and stored in the storage unit 14.

The storage unit 14 stores, as main process information, a frame structure 14A, process target PID 14B, frame data amount 14C, frame data amount sequence 14D, frame type determination result sequence 14F, and video quality estimated value 14G.

The frame structure 14A is configuration information such as GOP information representing the frame sequence in an elementary stream. Contents corresponding to target video communication are input via the operation input unit 12 or the communication I/F unit 11 in advance and stored in the storage unit 14.

The process target PID 14B is identification information to identify each TS packet of a process target elementary stream. The process target PID 14B is input via the operation input unit 12 or the communication I/F unit 11 in advance and stored in the storage unit 14. As for a PID (packet_indicator), PIDs stored in received TS packets may be totaled, and a PID with the largest reception count may be used as the process target PID 14B. The process target PID 14B may be acquired from a PMT (Program Map Table) notified by a TS packet.

The frame data amount 14C is a value obtained by causing the frame type determination unit 15B to count the number of TS packets in each frame based on a frame start position included in a TS packet.

The frame data amount sequence 14D is sequenced data obtained by arranging the frame data amounts of individual frames in the frame arrival order (reproduction order).

A determination sequence 14E is sequenced data obtained by extracting the frame data amounts from the frame data amount sequence 14D as data for frame type determination.

The determination result sequence 14F is sequenced data representing the frame type determination result of each frame of the frame data amount sequence 14D.

The video quality estimated value 14G is a video quality value estimated by the video quality estimation unit 15C.

The arithmetic processing unit 15 includes a microprocessor such as a CPU and its peripheral circuits, and has a function of reading out the program 14P from the storage unit 14 and causing the microprocessor to execute it to make the above-described hardware cooperate with the program 14P, thereby implementing various processing units such as the TS packet acquisition unit 15A, frame type determination unit 15B, and video quality estimation unit 15C.

The TS packet acquisition unit 15A has a function of extracting TS packets from an IP packet output from the communication I/F unit 11, and a function of acquiring one of the TS packets which has a PID matching the process target PID 14B in the storage unit 14.

The frame type determination unit 15B has a function of detecting a frame start position included in the TS packet acquired by the TS packet acquisition unit 15A, a function of counting, as the frame data amount of a frame, the number of TS packets included in the frame based on the frame start position and storing the frame data amount in the frame data amount sequence 14D in the storage unit 14, and a function of determining the frame type of each frame based on the large/small relationships between the frame data amounts of the frames.

The video quality estimation unit 15C has a function of confirming a TS packet loss state based on each TS packet acquired by the TS packet acquisition unit 15A, a function of estimating the video quality of video communication based on the TS packet loss state, the frame type of each frame obtained by the frame type determination unit 15B, and the frame structure 14A of the elementary stream read out from the storage unit 14, and a function of storing the estimated value in the storage unit 14 as the video quality estimated value 14G. The video quality estimation processing of the video quality estimation unit 15C can be done using a known technique of, e.g., patent reference 2, and a detailed description thereof will be omitted here.

[Operation of First Embodiment]

The operation of the video quality estimation apparatus according to the first embodiment of the present invention will be described next with reference to FIG. 4.

[Video Quality Estimation Processing]

Figure 4:
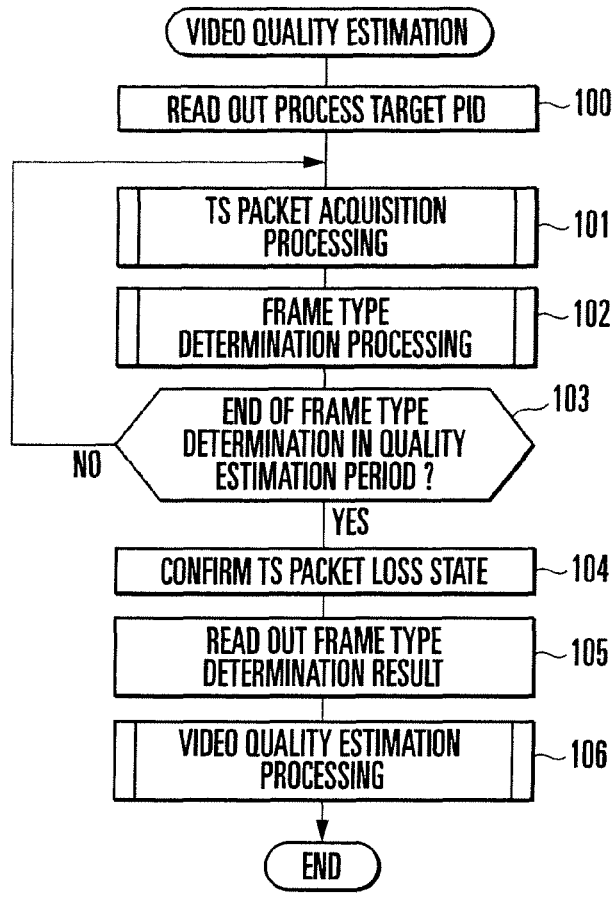
FIG. 4 is a flowchart illustrating video quality estimation processing of the video quality estimation apparatus according to the first embodiment of the present invention.

The arithmetic processing unit 15 of the video quality estimation apparatus 10 starts video quality estimation processing shown in FIG. 4 in accordance with an operator's operation to instruct the start of video quality estimation, which is detected by the operation input unit 12.

The arithmetic processing unit 15 first causes the TS packet acquisition unit 15A to read out the process target PID 14B from the storage unit 14 (step 100), and execute TS packet acquisition processing (to be described later) to acquire a process target TS packet from an IP packet received by the communication I/F unit 11 (step 101).

The arithmetic processing unit 15 causes the frame type determination unit 15B to execute frame type determination processing (to be described later) for the TS packet acquired by the TS packet acquisition unit 15A, thereby determining the frame type of each frame of the process target elementary stream (step 102).

The arithmetic processing unit 15 determines whether frame type determination has ended for all frames in the video quality estimation period to be used to estimate video quality (step 103). If frame type determination has not ended yet (NO in step 103), the process returns to step 101 to continue the processing.

If frame type determination has ended (YES in step 103), the arithmetic processing unit 15 causes the video quality estimation unit 15C to confirm the TS packet loss state based on the TS packets acquired by the TS packet acquisition unit 15A (step 104).

The video quality estimation unit 15C reads out the determination result sequence 14F from the storage unit 14 as the frame types of the frames (step 105), estimates the video quality of the video communication based on the TS packet loss state, the frame types of the frames, and the frame structure 14A of the elementary stream read out from the storage unit (step 106), stores the estimated value in the storage unit 14 as the video quality estimated value 14G (step 106), and ends the series of video quality estimation processes.

[TS Packet Acquisition Processing]

TS packet acquisition processing of the video quality estimation apparatus according to the first embodiment of the present invention will be described next with reference to FIG. 5.

In the TS packet acquisition processing in step 101 of FIG. 4, the TS packet acquisition unit 15A of the arithmetic processing unit 15 first extracts a new TS packet from an IP packet output from the communication I/F unit 11 (step 110), and acquires a PID from the TS header portion of the TS packet (step 111).

Figure 6:
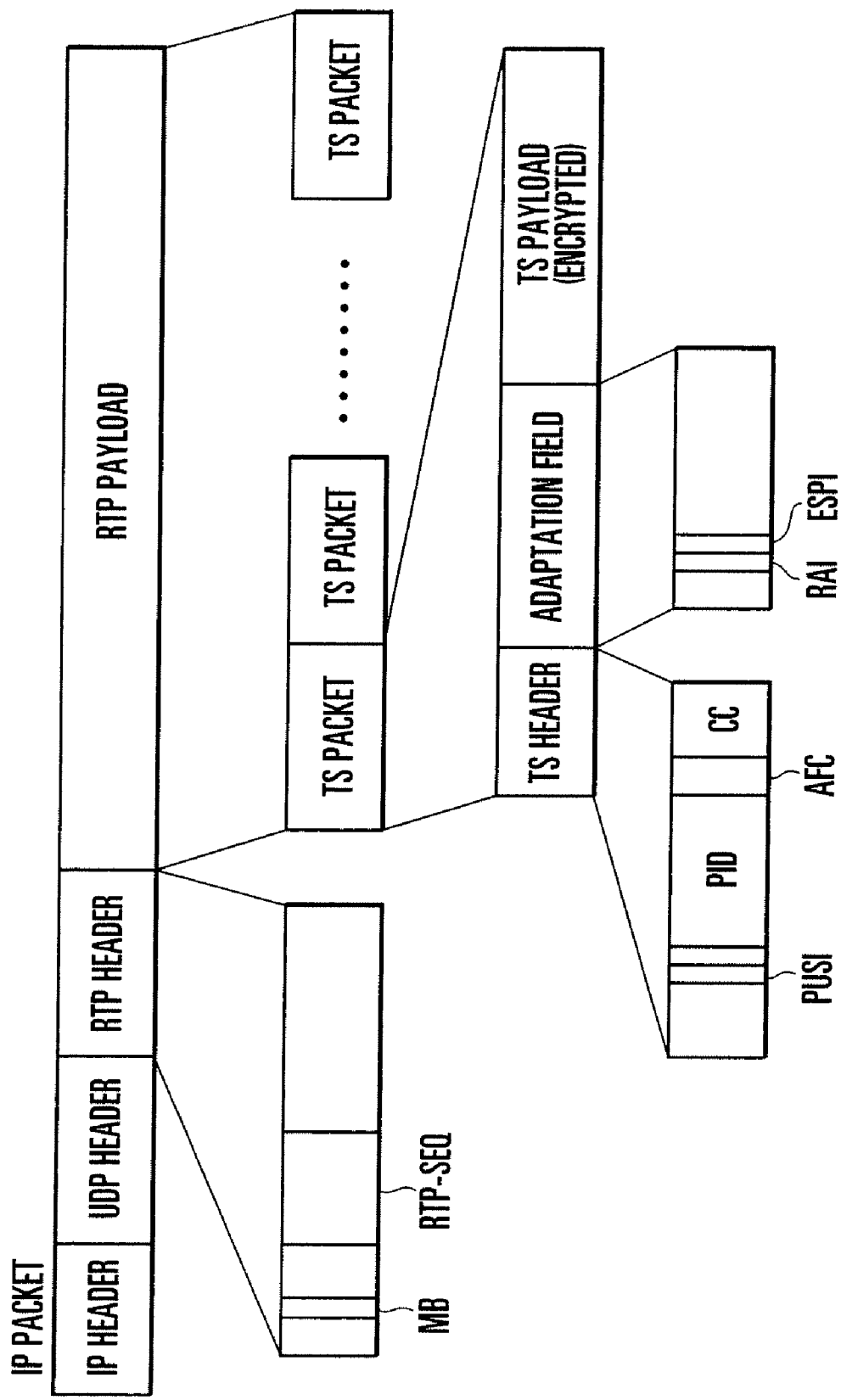
FIG. 6 is a view showing an example of the structure of a TS packet.

As shown in FIG. 6, a TS packet includes a TS header portion that stores various kinds of identification information, an adaptation field portion that stores various kinds of extended information, and a TS payload portion that stores an elementary stream, as defined by ITU-T Rec.H.222 standard. Since the TS payload portion is encrypted, its contents cannot be analyzed. On the other hand, the TS header portion and the adaptation field portion are not encrypted, and their contents can be analyzed.

The TS header portion stores, as identification information representing the frame start position, payload_unit_start_indicator (PUSI) information at the 10th bit from the top. When the payload_unit_start_indicator information is "1", the TS payload portion of the TS packet includes a PES header. The PES header represents a break in video/audio data, and its appearance occasion on an elementary stream changes depending on the encoder. In this embodiment, an encoder using a PES header representing a frame start point, such as EN5090 available from Tanber or D9054 available from Scientific Atlanta, is used. Note that if a PES header used by an encoder does not represent a frame start position but can be inferred as a frame start position based on a certain rule, the PES header is regarded as a frame start position based on the rule.

The TS header portion also stores, as identification information representing the type of data contents stored in the TS payload portion of the TS packet, PID (packet_indicator) in 13 bits from the 12th bit from the top. It is possible to identify, by checking the PID, that compression-coded frame data is stored in the TS payload of the TS packet.

The TS header portion also stores, as information representing the serial number of the TS packet having the same PID, a continuity indicator (CC: continuity_counter) in four bits from the 28th bit from the top.

The TS header portion also stores, as identification information representing the presence/absence of the adaptation field portion and the TS payload portion, adaptation field control information (AFC: adaptation_field_control) in two bits from the 26th bit from the top.

The adaptation field portion stores RAI (random_access_indicator) information and ESPI (elementary_stream_priority_indicator) information. Both pieces of information are identification information representing the start of a frame and are additively used in some CODECs.

In RTP (Real-time Transport Protocol/RFC3550), a transport layer protocol to transmit/receive audio data or a moving image in real time is defined and used as the upper protocol of UDP (User Datagram Protocol). The RTP uses a hierarchical structure that stores an RTP packet including an RTP header and an RTP payload in an IP packet based on the UDP, as shown in FIG. 6. Hence, TS packets as many as the number (e.g., seven) corresponding to the communication method are stored in the RTP payload portion of the RTP packet in the IP packet and transmitted to the packet communication network 3A.

The RTP header stores, as identification information representing the boundary of application data of a target real-time application, MB (MakerBit) information in one bit from the ninth bit from the top.

The RTP header also stores, as information representing the serial number of the RTP packet, an RTP sequence number (RTP-SEQ) in 16 bits from the 17th bit from the top.

The TS packet acquisition unit 15A compares the acquired PID with the process target PID in the storage unit 14 (step 112). If the PIDs do not match (NO in step 112), the process returns to step 110 to process the next TS packet.

If the PIDs match (YES in step 112), the TS packet acquisition unit 15A temporarily stores the TS packet in the storage unit 14 as a process target TS packet (step 113), and ends the series of TS packet acquisition processes.

[Frame Type Determination Processing]

Frame type determination processing of the video quality estimation apparatus according to the first embodiment of the present invention will be described next with reference to FIGS. 7 and 8A to 8E.

Figure 7:
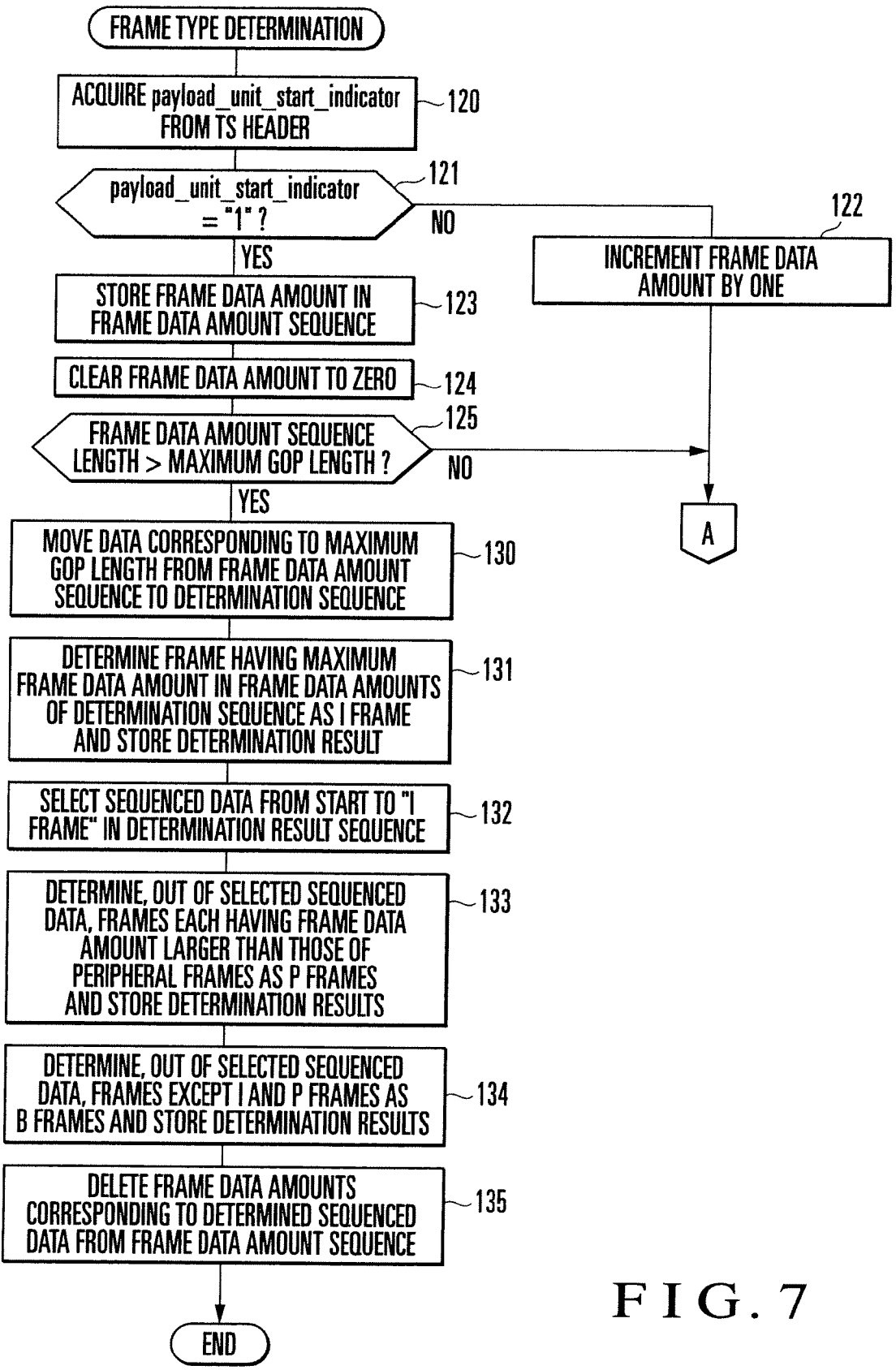
FIG. 7 is a flowchart illustrating frame type determination processing of the video quality estimation apparatus according to the first embodiment of the present invention.

In the frame type determination processing in step 102 of FIG. 4, the frame type determination unit 15B of the arithmetic processing unit 15 executes the frame type determination processing in FIG. 7.

The frame type determination unit 15B reads out the TS packet acquired by the TS packet acquisition unit 15A from the storage unit 14, and acquires payload_unit_start_indicator information from the TS header portion (step 120).

If the payload_unit_start_indicator information is not "1" (NO in step 121), the TS packet is not the TS packet at the start of the frame. The frame type determination unit 15B increments the frame data amount 14C in the storage unit 14 by one, thereby counting the number of TS packets of the frame (step 122). The process returns to step 110 in FIG. 5 to process the next TS packet.

If the payload_unit_start_indicator information is "1" (YES in step 121), the frame type determination unit 15B stores the frame data amount 14C in the storage unit 14 as new sequenced data at the end of the frame data amount sequence 14D (step 123), and clears the frame data amount 14C to zero (step 124).

The frame type determination unit 15B compares the sequence length of the frame data amount sequence 14D with the maximum GOP length defined by the frame structure 14A in the storage unit 14 (step 125). If the sequence length of the frame data amount sequence 14D is equal to or shorter than the maximum GOP length (NO in step 125), the process returns to step 110 in FIG. 5 to process the next TS packet.

Figure 8A:
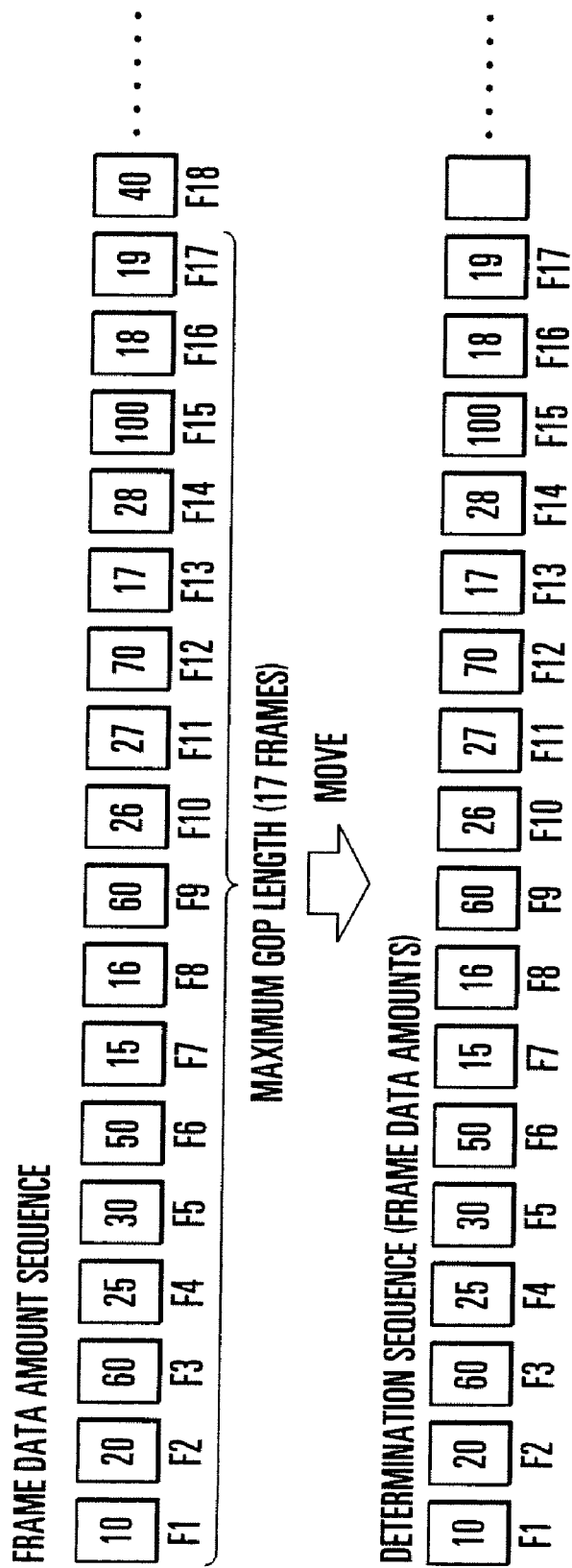
FIG. 8A is an explanatory view showing part of the frame type determination processing of the video quality estimation apparatus according to the first embodiment of the present invention.

If the sequence length of the frame data amount sequence 14D is longer than the maximum GOP length (YES in step 125), the frame type determination unit 15B moves, to the determination sequence 14E in the storage unit 14, the sequenced data (frame data amounts) of frames F1 to F17 in a determination period corresponding to, e.g., the maximum GOP length from the start of the frame data amount sequence 14D (step 130), as shown in FIG. 8A.

Figure 8B:
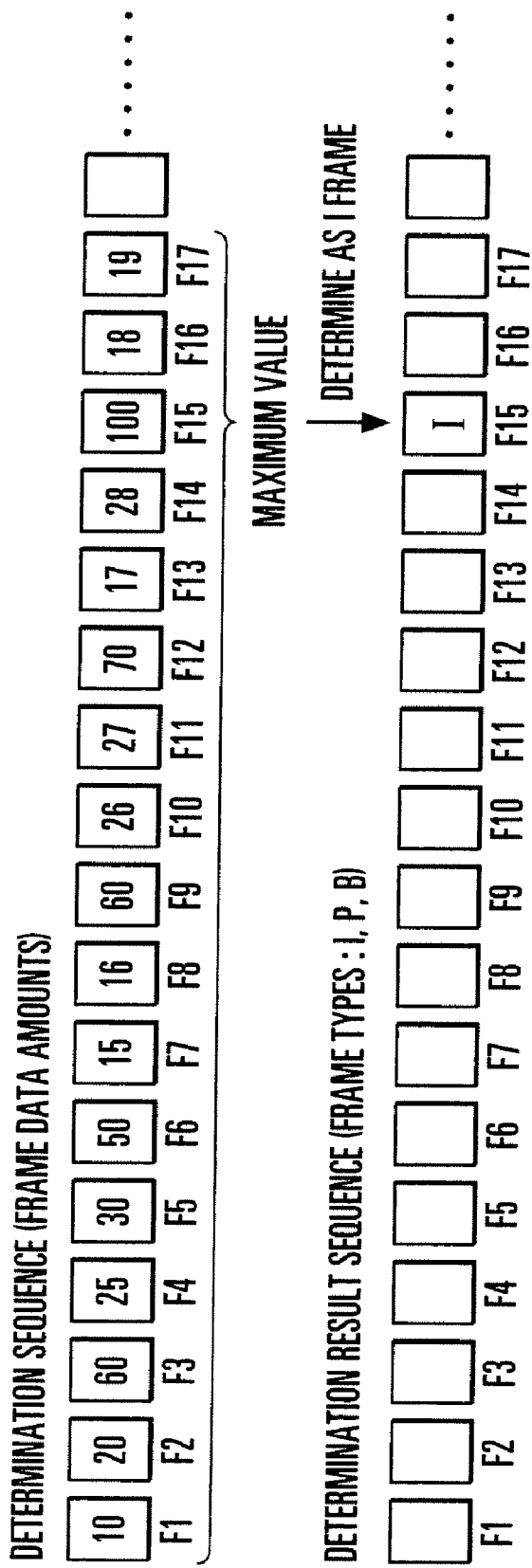
FIG. 8B is an explanatory view showing another part of the frame type determination processing of the video quality estimation apparatus according to the first embodiment of the present invention.

The frame type determination unit 15B selects, out of the sequenced data of the determination sequence 14E, the maximum frame data amount, i.e., the sequenced data of the frame F15, determines the frame corresponding to the frame data amount as an I frame, and stores frame type information representing the I frame as sequenced data corresponding to the frame F15 of the determination result sequence 14F in the storage unit 14 (step 131), as shown in FIG. 8B.

In the elementary stream, an I frame contains frame data which is not compressed by interframe prediction. Hence, the data amount of the I frame is larger than that of a P or B frame compressed by interframe prediction by several times or more. It is therefore possible to specify, as an I frame, a frame having the maximum frame data amount in a period such as the maximum GOP length in which only one I frame appears, i.e., a determination period equal to or shorter than the I frame interval in the elementary stream.

Figure 8C:
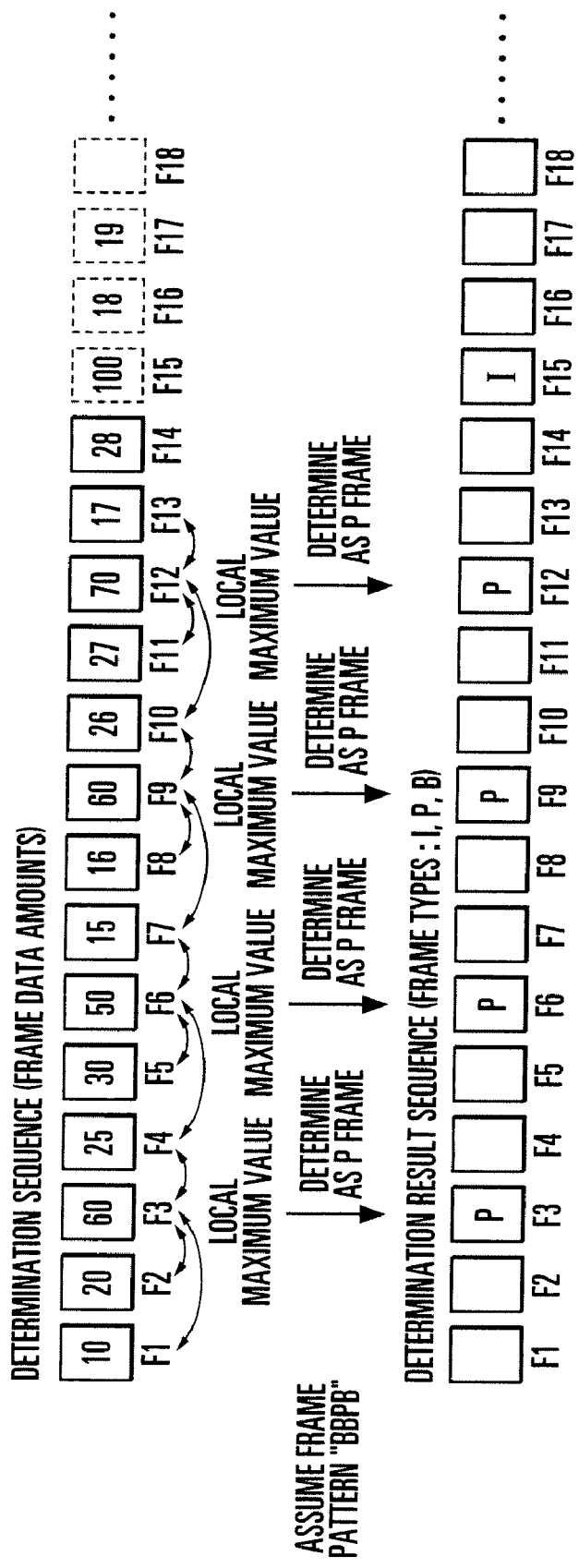
FIG. 8C is an explanatory view showing still another part of the frame type determination processing of the video quality estimation apparatus according to the first embodiment of the present invention.

The frame type determination unit 15B selects, out of the sequenced data of the determination sequence 14E, sequenced data (frame data amounts) corresponding to the start frame to the frame immediately before the I frame, i.e., the frames F1 to F14 (step 132), determines, in the sequenced data, each frame having a frame data amount larger than those of peripheral frames as a P frame, and stores frame type information representing the I frame as sequenced data corresponding to the frame F15 of the determination result sequence 14F in the storage unit 14 (step 133), as shown in FIG. 8C.

In the elementary stream, a P frame is compared with a B frame. The data amount of the P frame that is compression-coded using forward motion compensation prediction in the chronological order is larger than that of the B frame that is compression-coded using bidirectional motion compensation prediction in the forward and reverse directions. Hence, if the large/small relationships between the frame data amounts of the frames match a predetermined determination frame pattern including one P frame and a plurality of B frames in a determination period without an I frame, a frame corresponding to the P frame of the determination frame pattern can be specified as a P frame.

For example, when a determination frame pattern "BBPB" included in a frame pattern "IBBPBB" that appears in a general GOP structure is collated with the frame data amount increase/decrease transition, the P frame has a frame data amount larger than that of each B frame. In the example shown in FIG. 8C, the frame data amounts of the frames F1 to F4 are "10", "20", "60", and "25". The large/small relationships are frame F1<frame F3, frame F2<frame F3, and frame F3>frame F4, which match the frame data amount increase/decrease transition of the determination frame pattern "BBPB". It is therefore possible to determine, as a P frame, the frame F3 corresponding to the P frame in the determination frame pattern "BBPB".

Hence, as for the determination frame pattern included in the GOP structure of the process target elementary stream, continuous frames corresponding to N determination frame patterns are selected from the determination period as determination target frames. The large/small relationships between the frame data amounts of the determination target frames are compared with the determination frame pattern. A P frame can be specified based on matching between them. It is possible to specify all P frames in the determination period without an I frame by repeating the comparison while sequentially shifting the determination target frame selection position.

As the determination frame pattern, a pattern in the GOP structure, which includes all continuous B frames immediately before the P frame and one B frame next to the P frame is used. In, e.g., a GOP structure "IBBBPBBB", a determination frame pattern "BBBPB" including three continuous B frames immediately before the P frame and one B frame next to the P frame is used. Use of such a determination frame pattern enables to correctly detect an increase in the frame data amount by the P frame relative to the remaining B frames without erroneously detecting an increase in the frame data amount among only the B frames.

Figure 8D:
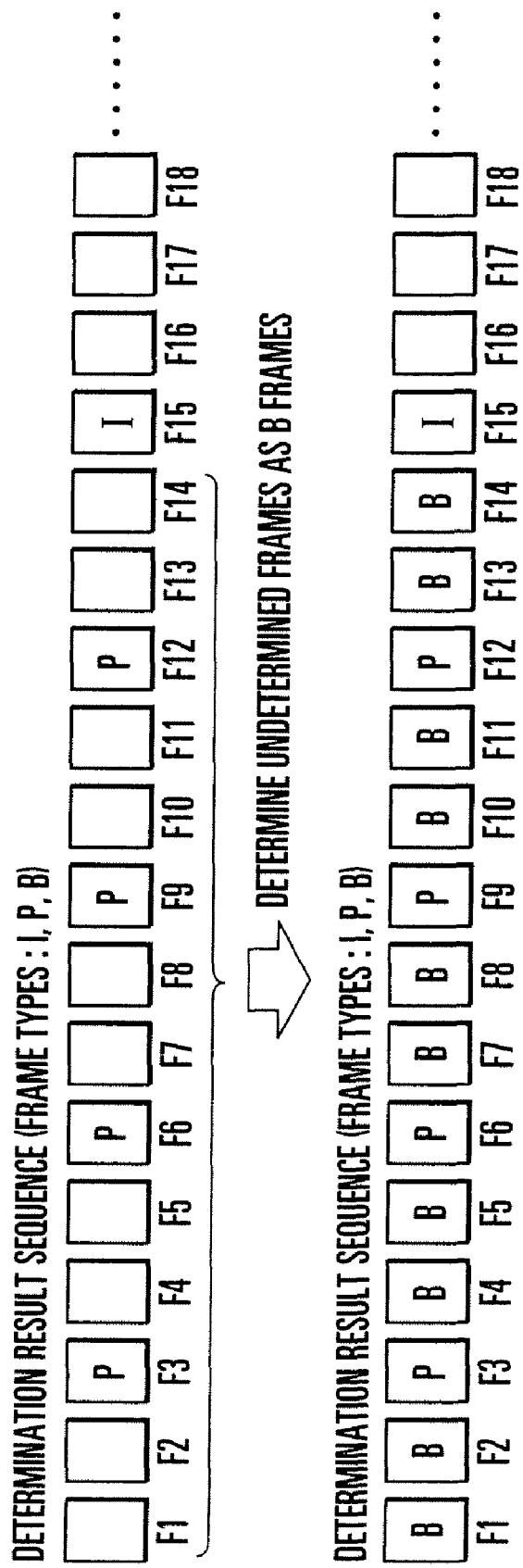
FIG. 8D is an explanatory view showing still another part of the frame type determination processing of the video quality estimation apparatus according to the first embodiment of the present invention.

After determining the P frames in this way, the frame type determination unit 15B determines, as B frames, remaining undetermined frames F1, F2, F4, F5, F7, F8, F10, F11, F13, and F14 out of the frames F1 to F14 which are selected from the determination period in step 132 but not determined as P frames in step 133, and stores frame type information representing the B frames as sequenced data corresponding to the B frames of the determination result sequence 14F in the storage unit 14 (step 134), as shown in FIG. 8D.

Figure 8E:
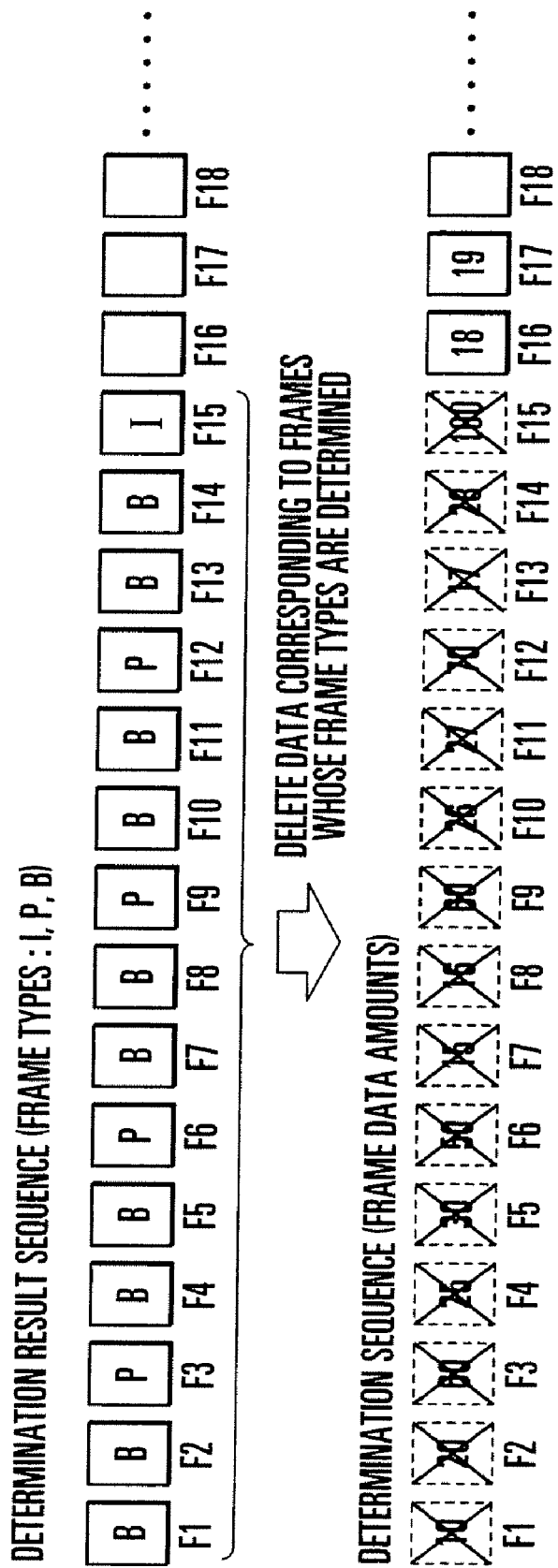
FIG. 8E is an explanatory view showing still another part of the frame type determination processing of the video quality estimation apparatus according to the first embodiment of the present invention.

The frame type determination unit 15B deletes the frame data amounts corresponding to the determined frames F1 to F15 from the frame data amount sequence 14D in the storage unit 14 (step 135), as shown in FIG. 8E, and ends the series of frame type determination processes.

[Effects of First Embodiment]

As described above, in this embodiment, the frame type determination unit 15B counts, as the frame data amount of a frame, the number of TS packets included in the frame based on the frame start position included in an input TS packet of video communication, and determines the frame type based on the large/small relationships between the frame data amounts of the frames. The video quality estimation unit 15C estimates the video quality of the video communication based on the frame type of each frame obtained by the frame type determination unit 15B, the frame structure 14A of the elementary stream read out from the storage unit 14, and the TS packet loss state detected from a TS packet of the video communication. It is therefore possible to grasp the frame type of each frame and estimate the video quality in consideration of the influence of a degraded frame even when the payload portion of a TS packet is encrypted.

In this embodiment, out of temporally continuous frames in the determination period equal to or shorter than the I frame interval in the elementary stream, a frame having the maximum frame data amount is determined as an I frame. As the determination period, the maximum GOP length in the elementary stream is used. It is therefore possible to correctly specify the I frame. Additionally, since the calculation amount is small, restrictions in implementation decrease.

In this embodiment, assume that the frame structure of the elementary stream includes a determination frame pattern in which N (N is an integer of 4 or more) frames including a plurality of B frames, one P frame, and one B frame temporally continue. If out of N temporally continuous frames excluding the I frame, all the first to (N-2)th frames and the Nth frame have frame data amounts smaller than that of the (N-1)th frame, the (N-1)th frame is determined as a P frame. This allows to correctly specify the P frame. Additionally, since the calculation amount is small, restrictions in implementation decrease.

In this embodiment, out of a predetermined number of temporally continuous frames excluding the I frame, remaining frames that are not determined as P frames are determined as B frames. This allows to correctly specify the B frame. Additionally, since the calculation amount is small, restrictions in implementation decrease.

In this embodiment, the frame start position is detected based on the value of payload_unit_start_indicator information included in the header portion of a TS packet. This enables to correctly count the frame data amount of each frame.

[Second Embodiment]

A video quality estimation apparatus according to the second embodiment of the present invention will be described next.

In the first embodiment, frame type determination has been explained assuming a general compression-coding method in which the GOP structure rarely changes from the frame appearance pattern "IBBPBB". In the second embodiment, an example will be described in which the GOP structure includes an appearance pattern besides the above-described pattern.

In the video quality estimation apparatus according to this embodiment, frame type determination processing of a frame type determination unit 15B of an arithmetic processing unit 15 is executed by presetting, for each of a plurality of different appearance patterns, a criterion representing the relationship between the positions and the frame data amounts of frames included in the appearance pattern. It is checked whether each criterion is satisfied for a plurality of temporally continuous frames including on frame. The type of each frame is determined based on an appearance pattern corresponding to a satisfied criterion.

A criterion includes a result of comparison between a threshold value calculated based on the average value of the frame data amounts of a plurality of frames at predetermined positions in the appearance pattern and the frame data amount of each frame in the appearance pattern, i.e., the large/small relationship between them. Each criterion is stored in a storage unit 14 in advance. The frame type determination unit 15B reads out a criterion from the storage unit 14 and uses it as needed.

The arrangement of the video quality estimation apparatus of the second embodiment is the same as in the first embodiment (FIG. 1) except the contents of determination processing by the frame type determination unit 15B of the arithmetic processing unit 15, and a detailed description thereof will not be repeated here.

[Operation of Second Embodiment]

Frame type determination processing of the video quality estimation apparatus according to the second embodiment of the present invention will be described next with reference to FIG. 9. The same step numbers as in FIG. 7 described above denote the same or similar processes in FIG. 9.

In the frame type determination processing in step 102 of FIG. 4, the frame type determination unit 15B of the arithmetic processing unit 15 executes the same processes as in steps 120 to 125 in FIG. 7. described above.

If the sequence length of a frame data amount sequence 14D is longer than the maximum GOP length in step 125 (YES in step 125), the frame type determination unit 15B moves, to a determination sequence 14E in the storage unit 14, the sequenced data (frame data amounts) of frames F1 to F17 corresponding to the maximum GOP length from the start of the frame data amount sequence 14D (step 130), as shown in FIG. 8A.

The frame type determination unit 15B selects, out of the sequenced data of the determination sequence 14E, the maximum frame data amount, i.e., the sequenced data of the frame F15, determines the frame corresponding to the frame data amount as an I frame, and stores frame type information representing the I frame as sequenced data corresponding to the frame F15 of a determination result sequence 14F in the storage unit 14 (step 131), as shown in FIG. 8B.

In the elementary stream, an I frame contains frame data which is not compressed by interframe prediction. Hence, the data amount of the I frame is larger than that of a P or B frame compressed by interframe prediction by several times or more. It is therefore possible to specify, as an I frame, a frame having the maximum frame data amount in a period such as the maximum GOP length in which only one I frame appears, i.e., a determination period equal to or shorter than the I frame interval in the elementary stream.

The frame type determination unit 15B selects, out of the sequenced data of the determination sequence 14E, sequenced data (frame data amounts) corresponding to the start frame to the frame immediately before the I frame, i.e., the frames F1 to F14 (step 132), sets the start of the sequenced data as the determination target frame start position, and executes appearance pattern specific frame type determination processing in FIG. 10 to be described later (step 200), as shown in FIG. 8C.

In the appearance pattern specific frame type determination processing, if none of the criteria of appearance patterns is satisfied for a predetermined number of frames from the determination target frame start position, i.e., if the determination has failed (NO in step 201), the frame type determination unit 15B executes exceptional frame type determination processing in FIG. 11 to be described later as exceptional processing of appearance pattern specific frame type determination processing (step 202).

If one of the criteria of appearance patterns is satisfied for a predetermined number of frames from the determination target frame start position, i.e., if the determination has succeeded in step 200 (YES in step 201), or after step 202, the frame type determination unit 15B determines whether the determination has ended for all sequenced data selected in step 132 (step 203).

If the determination has not ended for all sequenced data (NO in step 203), the frame type determination unit 15B returns to step 200 to repeatedly execute the appearance pattern specific frame type determination processing from a newly set determination target frame start position.

If the determination has ended for all sequenced data selected in step 132 (YES in step 203), the frame type determination unit 15B executes continuous B frame re-determination processing in FIG. 12 (to be described later) for each determined sequenced data (step 204).

The frame type determination unit 15B deletes the frame data amounts corresponding to the determined frames F1 to F15 from the frame data amount sequence 14D in the storage unit 14 (step 135), as shown in FIG. 8E, and ends the series of frame type determination processes.

[Appearance Pattern Specific Frame Type Determination Processing]

Appearance pattern specific frame type determination processing of the video quality estimation apparatus according to the second embodiment of the present invention will be described next with reference to FIG. 10.

Figure 9:
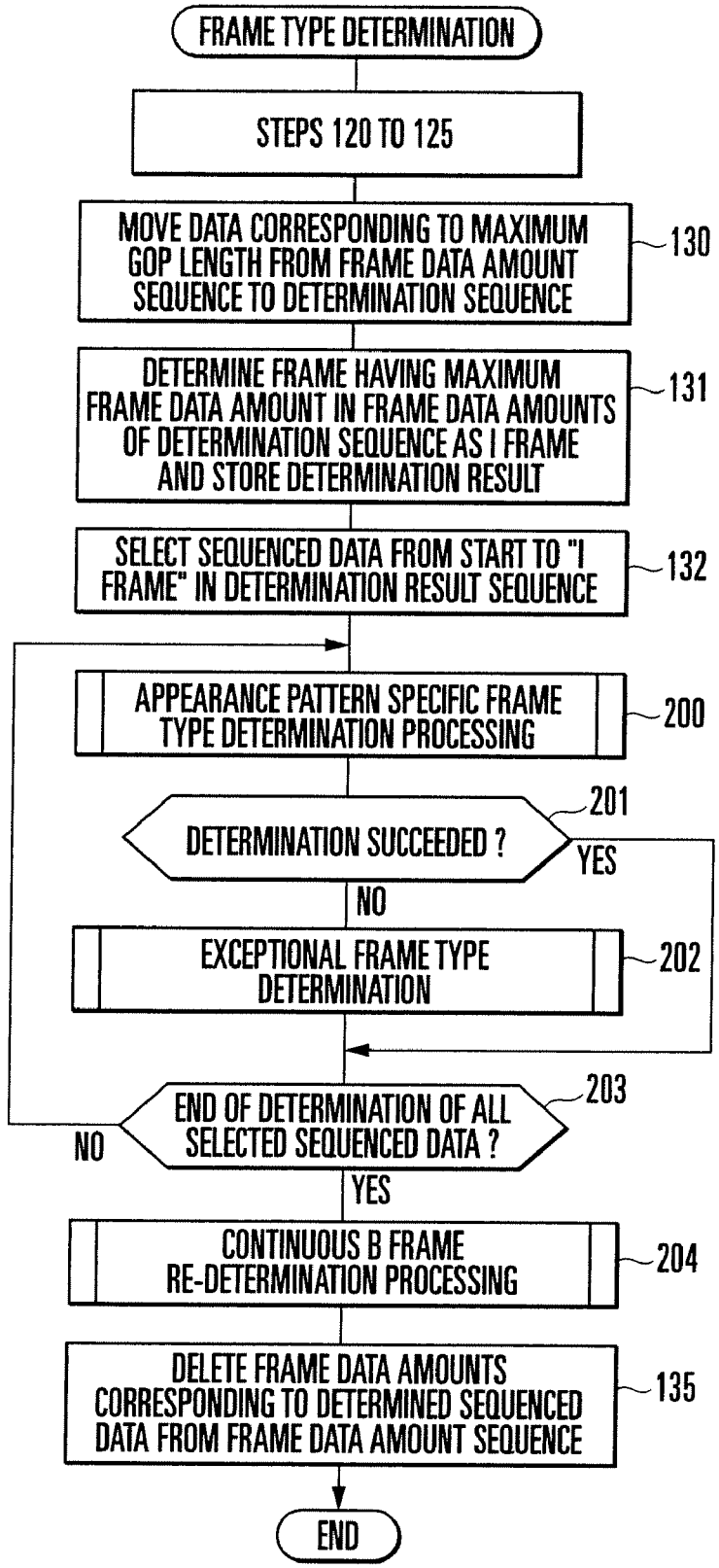
FIG. 9 is a flowchart illustrating frame type determination processing of a video quality estimation apparatus according to the second embodiment of the present invention.
Figure 10:
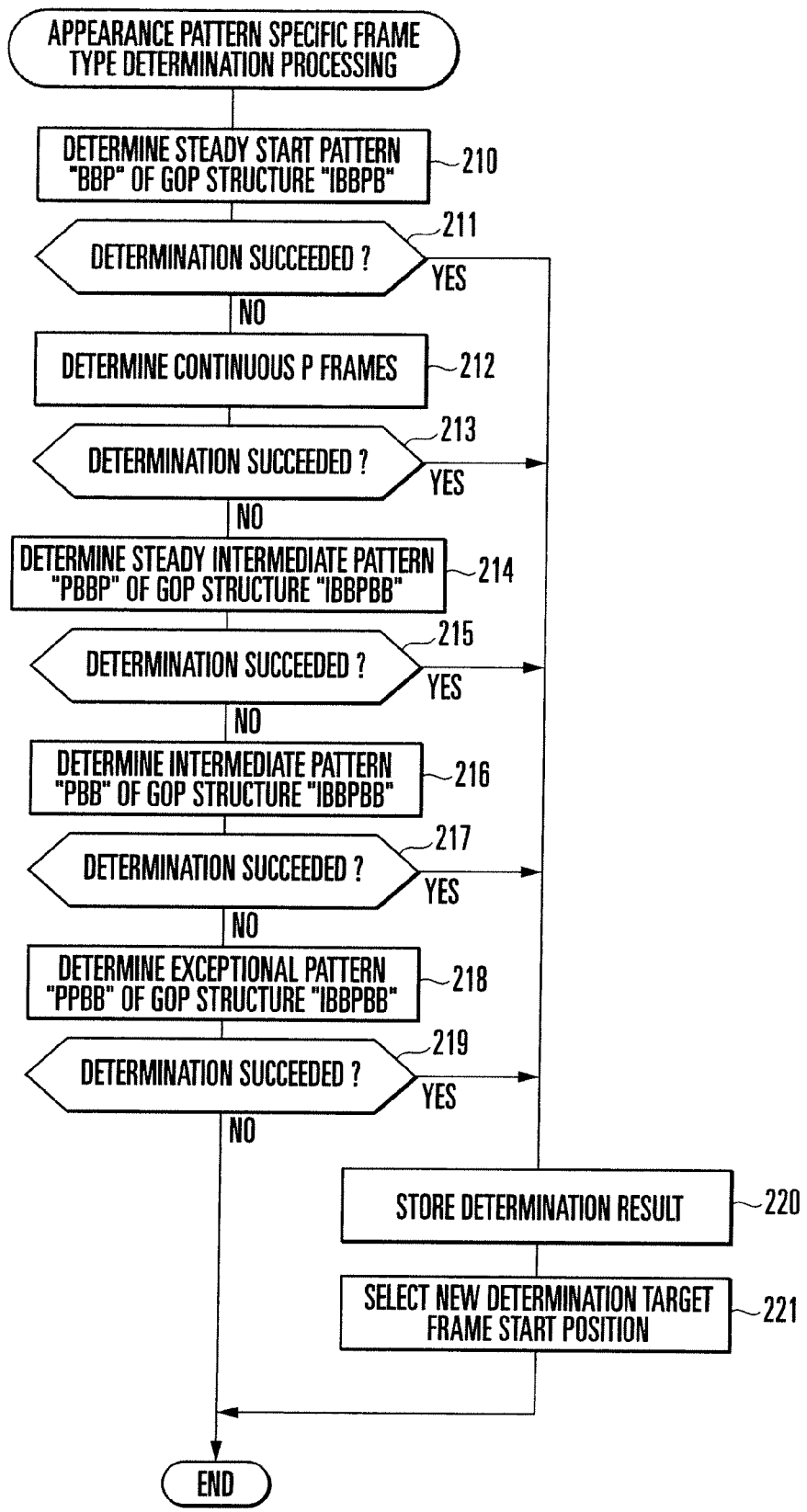
FIG. 10 is a flowchart illustrating appearance pattern specific frame type determination processing of the video quality estimation apparatus according to the second embodiment of the present invention.

In step 200 of FIG. 9, the frame type determination unit 15B of the arithmetic processing unit 15 executes the appearance pattern specific frame type determination processing in FIG. 10.

The frame type determination unit 15B determines whether the criterion of an appearance pattern "BBP" that is a steady start pattern of a GOP structure "IBBPB" is satisfied for a predetermined number of frames from the currently selected determination target frame start position (step 210).

More specifically, the determination target frame start position is set immediately after an I frame. For two frames (corresponding to BB) from the determination target frame start position, for example, two sequenced data F1 and F2 from the start of the sequenced data of the determination sequence 14E in FIG. 8C, the average value of the frame data amounts is calculated. A predetermined coefficient of, e.g., 1.2 is added to the average value, thereby calculating the lower limit value (threshold value). Next, the lower limit value is compared with the frame data amount of the third frame from the determination target frame start position, for example, third sequenced data F3 from the start of the sequenced data of the determination sequence 14E in FIG. 8C.

If the frame data amount is larger than the lower limit value, the three frames from the determination target frame start position are determined as "BBP". The frames to be used to calculate the average value are not limited to those described above. For example, the average value of three frames from the determination target frame start position may be used. The predetermined coefficient to be use to calculate the threshold value is not limited to 1.2. A value complying with the system or video can be selected.

If the criterion is satisfied, and the determination has succeeded (YES in step 211), the frame type determination unit 15B stores frame type information corresponding to each determination result in a corresponding frame of the determination result sequence 14F in the storage unit 14 (step 220), selects a new determination target frame start position (step 221), and ends the series of appearance pattern specific frame type determination processes.

In step 221, if the frame type of the last frame in the frame data determination result is a P frame, the P frame is set as the new determination target frame start position. If the frame type of the last frame is not a P frame, the frame next to the P frame is set as the new determination target frame start position. If the frame type of the last frame is a P frame, the P frame is reused as the start frame. This enables stable error-free frame type determination as compared to a case without reuse.

If the criterion is not satisfied, and the frame type determination has failed in step 210 (NO in step 211), the frame type determination unit 15B determines whether the criterion of an appearance pattern including continuous P frames is satisfied for a predetermined number of frames from the currently selected determination target frame start position (step 212).

More specifically, for a predetermined number of frames from the determination target frame start position, the average value of the frame data amounts is calculated. A predetermined coefficient of, e.g., 1.2 is added to the average value, thereby calculating the upper limit value (threshold value). Additionally, a predetermined coefficient of, e.g., 0.8 is added to the average value, thereby calculating the lower limit value (threshold value). Next, the upper and lower limit values are compared with the frame data amount of each of the predetermined number of frames from the determination target frame start position. If the frame data amounts fall within the range of the upper and lower limit values, all the predetermined number of frames from the determination target frame start position are determined as P frames.

The number of frames to be used for average value calculation and determination includes the number of frames from the determination target frame start position to the next I frame at maximum or a predetermined minimum number (e.g., four) of frames from the determination target frame start position at minimum. The determination is repeated while gradually reducing the number of frames from the maximum to the minimum and ended when the determination has succeeded. The predetermined coefficients to be used to calculate the threshold values are not limited to 1.2 and 0.8. Values complying with the system or video can be selected.

If the criterion is satisfied, and the determination has succeeded (YES in step 213), the frame type determination unit 15B stores frame type information corresponding to each determination result in a corresponding frame of the determination result sequence 14F in the storage unit 14 (step 220), selects a determination target frame start position for the next determination (step 221), and ends the series of appearance pattern specific frame type determination processes.

If the criterion is not satisfied, and the frame type determination has failed in step 212 (NO in step 213), the frame type determination unit 152 determines whether the criterion of an appearance pattern "PBBP" that is a steady intermediate pattern of the GOP structure "IBBPBB" is satisfied for a predetermined number of frames from the currently selected determination target frame start position (step 214).

More specifically, for two frames (corresponding to BB) from the frame next to the determination target frame start position, the average value of the frame data amounts is calculated. A predetermined coefficient of, e.g., 1.2 is added to the average value, thereby calculating the lower limit value (threshold value). Next, the lower limit value is compared with each of the frame (corresponding to P) at the determination target frame start position and the third frame (corresponding to P) from the determination target frame start position. If the frame data amounts of both frames are larger than the lower limit value, the four frames from the determination target frame start position are determined as "PBBP". The frames to be used to calculate the average value are not limited to those described above. For example, the average value of three frames from the frame next to the determination target frame start position may be used. The predetermined coefficient to be used to calculate the threshold value is not limited to 1.2. A value complying with the system or video can be selected.

If the criterion is satisfied, and the determination has succeeded (YES in step 215), the frame type determination unit 15B stores frame type information corresponding to each determination result in a corresponding frame of the determination result sequence 14F in the storage unit 14 (step 220), selects a determination target frame start position for the next determination (step 221), and ends the series of appearance pattern specific frame type determination processes.

If the criterion is not satisfied, and the frame type determination has failed in step 214 (NO in step 215), the frame type determination unit 15B determines whether the criterion of an appearance pattern "PBB" that is a steady intermediate pattern of the GOP structure "IBBPBB" is satisfied for a predetermined number of frames from the currently selected determination target frame start position (step 216).

More specifically, for two frames (corresponding to BB) from the frame next to the determination target frame start position, the average value of the frame data amounts is calculated. A predetermined coefficient of, e.g., 1.2 is added to the average value, thereby calculating the lower limit value (threshold value). Next, the lower limit value is compared with the frame (corresponding to P) at the determination target frame start position. If the frame data amount of the frame is larger than the lower limit value, the three frames from the determination target frame start position are determined as "PBB". The frames to be used to calculate the average value are not limited to those described above. For example, the average value of three frames from the frame next to the determination target frame start position may be used. The predetermined coefficient to be used to calculate the threshold value is not limited to 1.2. A value complying with the system or video can be selected.

If the criterion is satisfied, and the determination has succeeded (YES in step 217), the frame type determination unit 15B stores frame type information corresponding to each determination result in a corresponding frame of the determination result sequence 14F in the storage unit 14 (step 220), selects a determination target frame start position for the next determination (step 221), and ends the series of appearance pattern specific frame type determination processes.

If the criterion is not satisfied, and the frame type determination has failed in step 216 (NO in step 217), the frame type determination unit 15B determines whether the criterion of an appearance pattern "PPBBP" that is an exceptional pattern changed from the GOP structure "IBBPBB" is satisfied for a predetermined number of frames from the currently selected determination target frame start position (step 218).

More specifically, for two frames (corresponding to BB) from the second frame from the determination target frame start position, the average value of the frame data amounts is calculated. A predetermined coefficient of, e.g., 1.2 is added to the average value, thereby calculating the lower limit value (threshold value). Next, the lower limit value is compared with two frames (corresponding to P) from the determination target frame start position and the fifth frame (corresponding to P) from the determination target frame start position. If the frame data amounts of these frames are larger than the lower limit value, the five frames from the determination target frame start position are determined as "PPBBP". The frames to be used to calculate the average value are not limited to those described above. For example, the average value of four frames from the frame next to the determination target frame start position may be used. The predetermined coefficient to be used to calculate the threshold value is not limited to 1.2. A value complying with the system or video can be selected.

If the criterion is satisfied, and the determination has succeeded (YES in step 219), the frame type determination unit 15B stores frame type information corresponding to each determination result in a corresponding frame of the determination result sequence 14F in the storage unit 14 (step 220), selects a determination target frame start position for the next determination (step 221), and ends the series of appearance pattern specific frame type determination processes.

If the criterion is not satisfied, and the frame type determination has failed in step 218 (NO in step 219), the frame type determination unit 15B ends the series of appearance pattern specific frame type determination processes.

[Exceptional Frame Type Determination Processing]

Exceptional frame type determination processing of the video quality estimation apparatus according to the second embodiment of the present invention will be described next with reference to FIG. 11.

Figure 11:
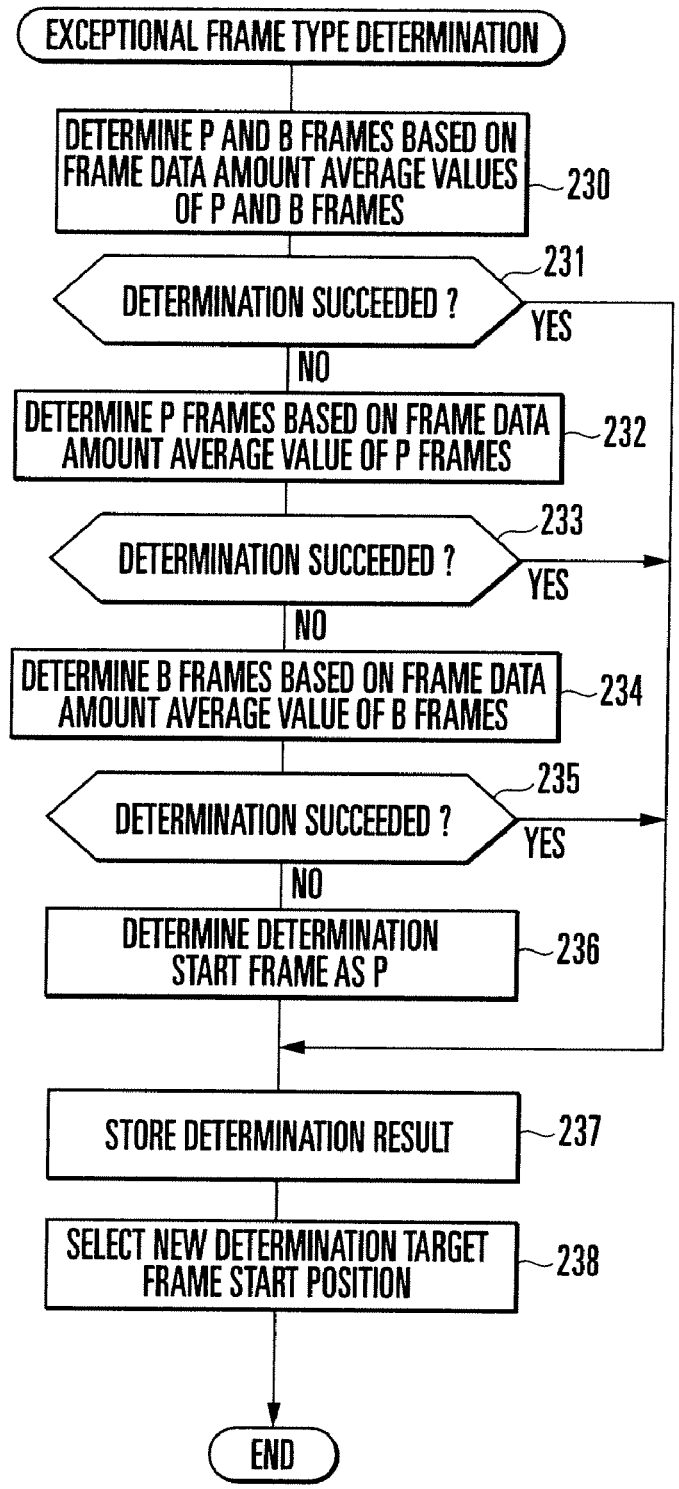
FIG. 11 is a flowchart illustrating exceptional frame type determination processing of the video quality estimation apparatus according to the second embodiment of the present invention.

In step 202 of FIG. 9, the frame type determination unit 15B of the arithmetic processing unit 15 executes the exceptional frame type determination processing in FIG. 11.

The frame type determination unit 15B determines whether the criterion of P and B frames based on the average values of their frame data amounts is satisfied for the frame at the determination target frame start position (step 230).

More specifically, a predetermined number of P frames located within a predetermined range are selected from the determination result sequence 14F with already determined frame types in the storage unit 14. Concerning these P frames, the average value is calculated based on the frame data amounts in the determination sequence 14E in the storage unit 14. Additionally, the average value of the frame data amounts of the predetermined number of P frames located within the predetermined range is calculated. The average value of the two average values is obtained as a threshold value. If the frame data amount of the frame at the determination target frame start position in the determination sequence 14E in the storage unit 14 is larger than the threshold value, the frame is determined as a P frame. If the frame data amount is smaller than the threshold value, the frame is determined as a B frame. The determination may be done for a plurality of frames from the determination target frame start position using the same criterion.

If the criterion is satisfied, and the determination has succeeded (YES in step 231), the frame type determination unit 15B stores frame type information corresponding to the determination result in the corresponding frame of the determination result sequence 14F in the storage unit 14 (step 237), selects, as a new determination target frame start position, the frame next to that determined last (step 238), and ends the series of exceptional frame type determination processes.

If the criterion is not satisfied, and the frame type determination has failed in step 230 (NO in step 231), the frame type determination unit 15B determines whether the criterion of a P frame using the average values of the frame data amounts concerning P frames is satisfied for the frame at the determination target frame start position (step 232).

More specifically, for a predetermined number of P frames before the immediately preceding P frame located within the range of the GOP, the average value of the frame data amounts is calculated. A predetermined coefficient of, e.g., 1.2 is added to the average value, thereby calculating the upper limit value (threshold value). Additionally, a predetermined coefficient of, e.g., 0.8 is added to the average value, thereby calculating the lower limit value (threshold value). Next, the upper and lower limit values are compared with the frame data amount of the frame at the determination target frame start position. If the frame data amount falls within the range of the upper and lower limit values, the frame at the determination target frame start position is determined as a P frame. The determination may be done for a plurality of frames from the determination target frame start position using the same criterion.

If the criterion is satisfied, and the determination has succeeded (YES in step 233), the frame type determination unit 15B stores frame type information corresponding to the determination result in the corresponding frame of the determination result sequence 14F in the storage unit 14 (step 237), selects, as a new determination target frame start position, the frame next to that determined last (step 238), and ends the series of exceptional frame type determination processes.

If the criterion is not satisfied, and the frame type determination has failed in step 232 (NO in step 233), the frame type determination unit 15B determines whether the criterion of a B frame using the average values of the frame data amounts concerning B frames is satisfied for the frame at the determination target frame start position (step 234).

More specifically, for a predetermined number of B frames before the immediately preceding P frame located within the range of the GOP, the average value of the frame data amounts is calculated. A predetermined coefficient of, e.g., 1.2 is added to the average value, thereby calculating the upper limit value (threshold value). Next, the upper limit value is compared with the frame data amount of the frame at the determination target frame start position. If the frame data amount is smaller than the upper limit value, the frame at the determination target frame start position is determined as a B frame. The determination may be done for a plurality of frames from the determination target frame start position using the same criterion.

If the criterion is satisfied, and the determination has succeeded (YES in step 235), the frame type determination unit 15B stores frame type information corresponding to the determination result in the corresponding frame of the determination result sequence 14F in the storage unit 14 (step 237), selects, as a new determination target frame start position, the frame next to that determined last (step 238), and ends the series of exceptional frame type determination processes.

If the criterion is not satisfied, and the frame type determination has failed in step 234 (NO in step 235), the frame type determination unit 15B determines the frame at the determination target frame start position as a P frame (step 236), stores frame type information corresponding to the determination result in the corresponding frame of the determination result sequence 14F in the storage unit 14 (step 237), selects, as a new determination target frame start position, the frame next to that determined last (step 238), and ends the series of exceptional frame type determination processes.

[Continuous B Frame Re-Determination Processing]

Continuous B frame re-determination processing of the video quality estimation apparatus according to the second embodiment of the present invention will be described next with reference to FIG. 12.

Figure 12:
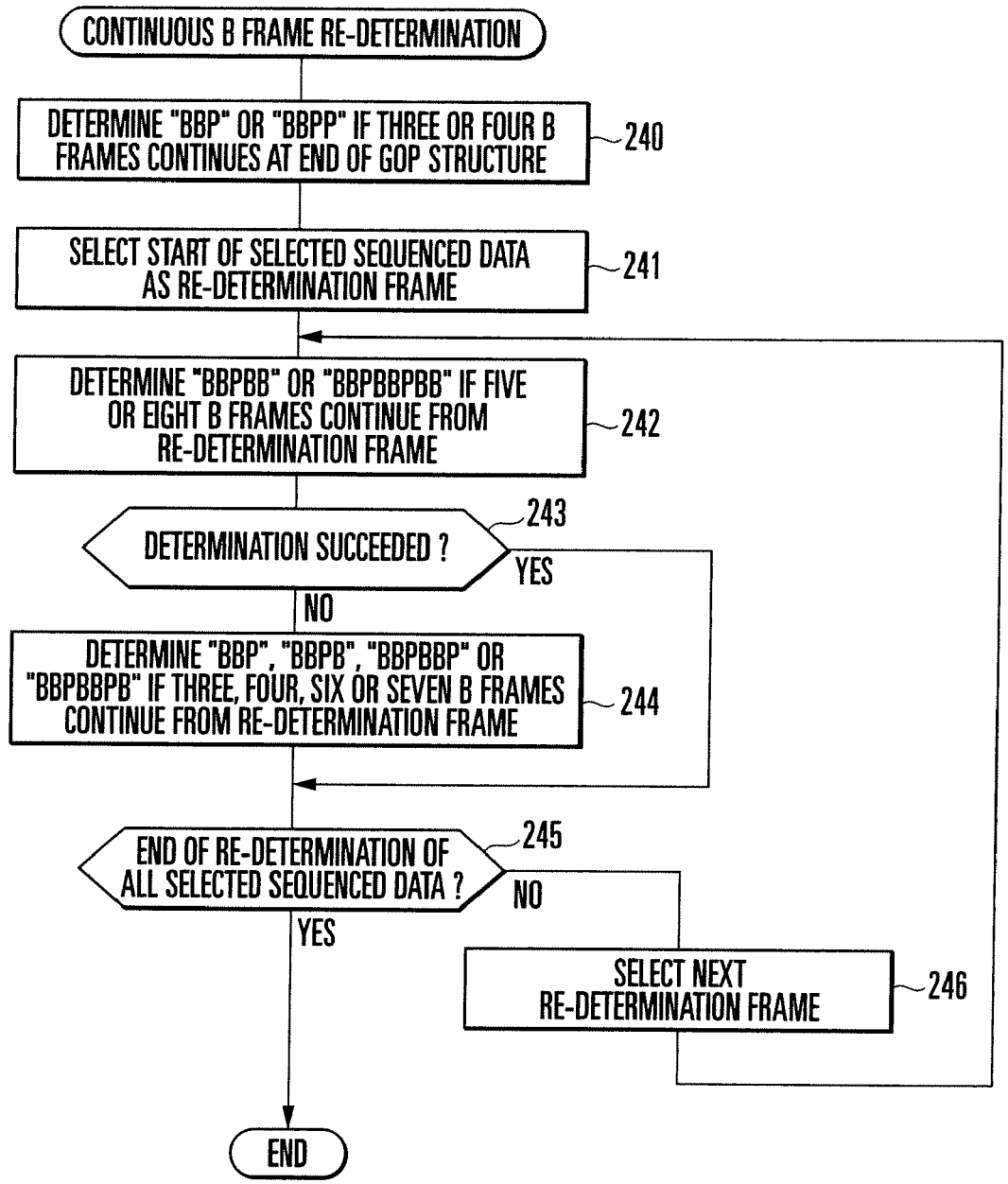
FIG. 12 is a flowchart illustrating continuous B frame re-determination processing of the video quality estimation apparatus according to the second embodiment of the present invention.

In step 204 of FIG. 9, the frame type determination unit 15B of the arithmetic processing unit 15 executes the continuous B frame re-determination processing in FIG. 12.

The frame type determination unit 15B refers to the sequenced data of the determination result sequence 14F in the storage unit 14, and determines whether a criterion that three or four B frames continue is satisfied at the end of the GOP structure. If the criterion is satisfied, the B frames are re-determined as "BBP" (if three B frames continue) or "BBPP" (if four B frames continue). Pieces of frame type information of the corresponding frames of the determination result sequence 14F in the storage unit 14 are updated in accordance with the determination results (step 240).

The frame type determination unit 15B sets, as a re-determination target frame start position, the start of the sequenced data (frame data amount) selected in step 132 of FIG. 9 (step 241), and determines whether a criterion that five or eight B frames continue from the re-determination target frame start position in the sequenced data of the determination result sequence 14F in the storage unit 14 is satisfied. If the criterion is satisfied, the B frames are re-determined as "BBPBB" (if five B frames continue) or "BBPBBPBB" (if eight B frames continue). Pieces of frame type information of the corresponding frames of the determination result sequence 14F in the storage unit 14 are updated in accordance with the determination results (step 242).

If the criterion is satisfied, and the determination has succeeded (YES in step 243), the frame type determination unit 15B determines whether the determination has ended for all sequenced data selected in step 241 (step 203).

If the determination has not ended for all sequenced data (NO in step 245), the frame type determination unit 15B selects the next re-determination target frame start position (step 246), returns to step 242 to repeatedly execute the processing from the newly set re-determination target frame start position.

If the criterion is not satisfied, and the frame type determination has failed in step 243 (NO in step 243), the frame type determination unit 15B determines whether a criterion that three, four, six, or seven B frames continue from the re-determination target frame start position is satisfied. If the criterion is satisfied, the B frames are re-determined as "BBP" (if three B frames continue), "BBPB" (if four B frames continue), "BBPBBP" (if six B frames continue), or "BBPBBPB" (if seven B frames continue). Pieces of frame type information of the corresponding frames of the determination result sequence 14F in the storage unit 14 are updated in accordance with the determination results (step 244).

After that, the frame type determination unit 15B determines whether the determination has ended for all sequenced data selected in step 241 (step 203).

If the determination has not ended for all sequenced data (NO in step 245), the frame type determination unit 15B selects the next re-determination target frame start position (step 246) and returns to step 242 to repeatedly execute the processing from the newly set re-determination target frame start position.

If the determination has ended for all sequenced data in step 245 (YES in step 245), the frame type determination unit 15B ends the series of continuous B frame re-determination processes.

[Effects of Second Embodiment]

As described above, in the frame type determination processing of the frame type determination unit 15B of the arithmetic processing unit 15 of this embodiment, a criterion representing the relationship between the positions and the frame data amounts of frames included in the appearance pattern is preset for each of a plurality of different appearance patterns. A predetermined number of temporally continuous frames including no I frame are checked based on the criterion of each appearance pattern. The type of each frame is determined based on an appearance pattern corresponding to a satisfied criterion. This enables to determine the type of each frame in an appearance pattern other than general frame appearance patterns of the GOP structure.

A criterion includes a result of comparison between a threshold value calculated based on the average value of the frame data amounts of a plurality of frames within a predetermined range and the frame data amount of each frame in an appearance pattern, i.e., the large/small relationship between them. It is therefore possible to determine a frame type by very simple arithmetic processing.

[Third Embodiment]

A video quality estimation apparatus according to the third embodiment of the present invention will be described next.

In the first and second embodiments, an example has been described in which the frame type of a determination target frame is determined based on the frame data amount increase/decrease relationship with respect to the frames before and after the determination target frame. In the third embodiment, a frame type determination method of determining P and B frames based on a threshold value, and a method of learning a coefficient to be used in the frame type determination method will be described.

The arrangement of the video quality estimation apparatus of the third embodiment is the same as in the first embodiment (FIG. 1) except the contents of processing by a frame type determination unit 15B of an arithmetic processing unit 15, and a detailed description thereof will not be repeated here.

[Operation of Third Embodiment]

The operation of the video quality estimation apparatus according to the third embodiment of the present invention will be described next.

A video quality estimation apparatus 10 of this embodiment uses two kinds of frame determination processing, i.e., I frame determination processing and P/B frame determination processing when causing the frame type determination unit 15B of the arithmetic processing unit 15 to determine the frame type of a determination target frame.

I frame determination processing is a frame determination method of determining an I frame. A determination period representing an I frame search range is used as a coefficient. A value representing the maximum GOP length is used as the determination period.

P/B frame determination processing is frame determination processing of determining P and B frames. An adjustment coefficient which adjusts a threshold value to distinguish between P and B frames based on frame data amounts is used as a coefficient.

The determination period and the adjustment coefficient are preferably learned and stored in a storage unit 14 in advance before execution of frame determination processing. However, standard values may be externally input and stored in the storage unit 14. To learn the determination period and the adjustment coefficient, learning processing is performed sequentially in two steps. More specifically, the determination period is learned first, and the adjustment coefficient is then learned.

[Frame Type Determination Processing]

Frame type determination processing of the video quality estimation apparatus according to the third embodiment of the present invention will be described first with reference to FIG. 13. The same step numbers as in FIG. 7 described above denote the same or similar processes in FIG. 13.

Figure 13:
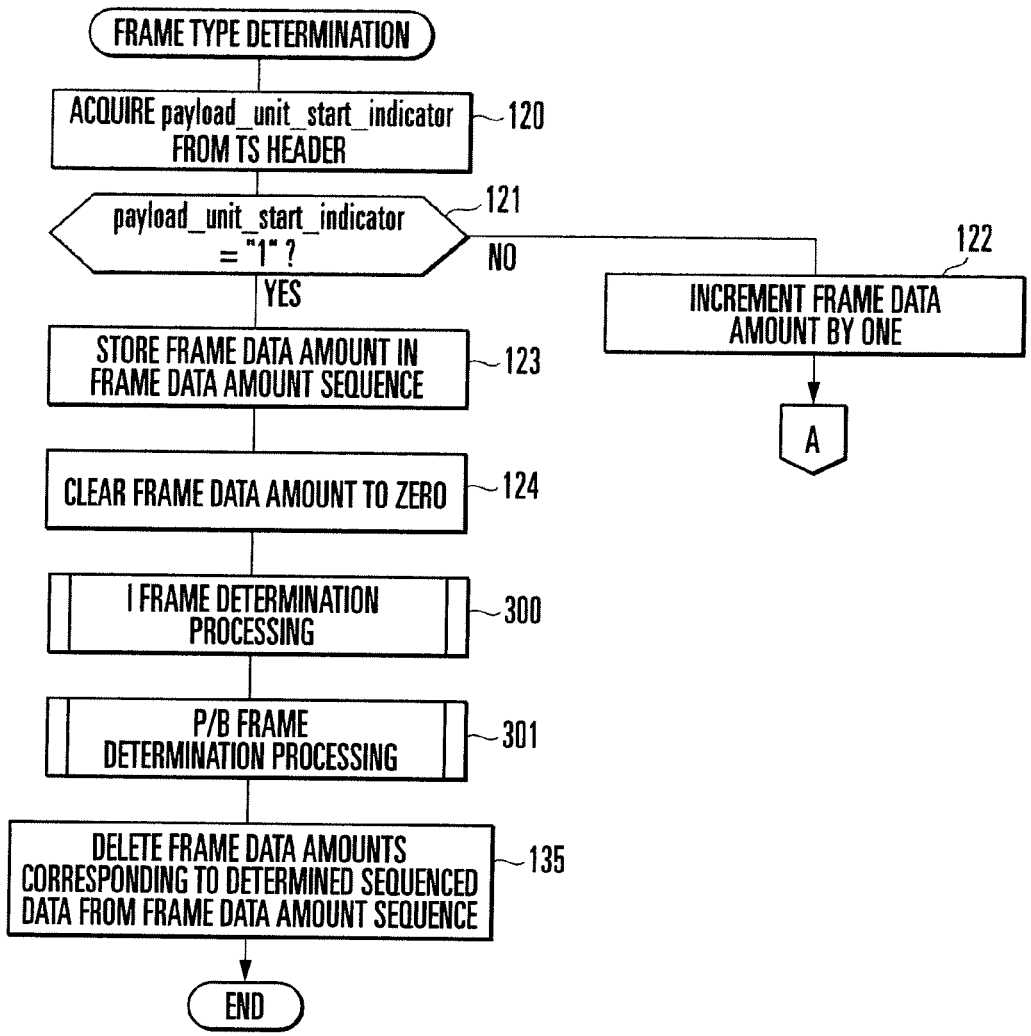
FIG. 13 is a flowchart illustrating frame type determination processing of a video quality estimation apparatus according to the third embodiment of the present invention.

In the frame type determination processing in step 102 of FIG. 4, the frame type determination unit 15B of the arithmetic processing unit 15 executes the frame type determination processing in FIG. 13.

The frame type determination unit 15B reads out a TS packet acquired by a TS packet acquisition unit 15A from the storage unit 14, and acquires payload_unit_start_indicator information from the TS header portion (step 120).

If the payload_unit_start_indicator information is not "1" (NO in step 121), the TS packet is not the TS packet at the start of the frame. The frame type determination unit 15B increments a frame data amount 14C in the storage unit 14 by one, thereby counting the number of TS packets of the frame (step 122). The process returns to step 110 in FIG. 5 to process the next TS packet.

If the payload unit_start_indicator information is "1" (YES in step 121), the frame type determination unit 15B stores the frame data amount 14C in the storage unit 14 as new sequenced data at the end of a frame data amount sequence 14D (step 123), and clears the frame data amount 14C to zero (step 124).

The frame type determination unit 15B executes I frame determination processing in FIG. 14 (to be described later) using a determination period given as a coefficient (step 300), and then executes P/B frame determination processing in FIG. 15 (to be described later) using an adjustment coefficient as a coefficient (step 301).

With these processes, a frame type determination result representing one of I, P, and B frames is stored in a determination result sequence 14F in the storage unit 14 in correspondence with each of frames up to the next I frame in the frame data amount sequence 14D.

The frame type determination unit 15B deletes the frame data amounts corresponding to the determined frames from the frame data amount sequence 14D in the storage unit 14 (step 135), as shown in FIG. 8E described above, and ends the series of frame type determination processes.

[I Frame Determination Processing]

I frame determination processing of the video quality estimation apparatus according to the third embodiment of the present invention will be described next with reference to FIG. 14.

Figure 14:
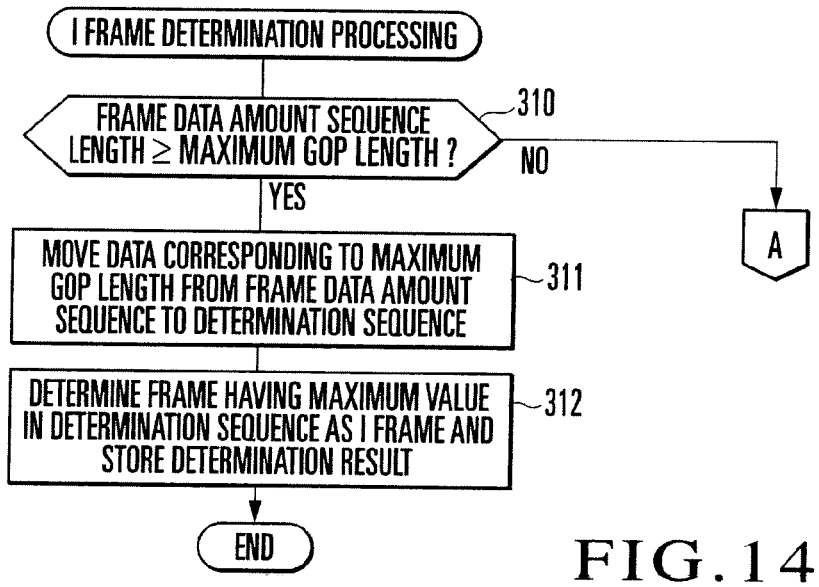
FIG. 14 is a flowchart illustrating I frame determination processing of the video quality estimation apparatus according to the third embodiment of the present invention.

In the I frame determination processing in step 300 of FIG. 13, the frame type determination unit 15B of the arithmetic processing unit 15 executes the I frame determination processing in FIG. 14.

The frame type determination unit 15B compares the sequence length, i.e., the number of data of the frame data amount sequence 14D in the storage unit 14 with a determination period given as a coefficient, i.e., the maximum GOP length in this case (step 310).

Figure 5:
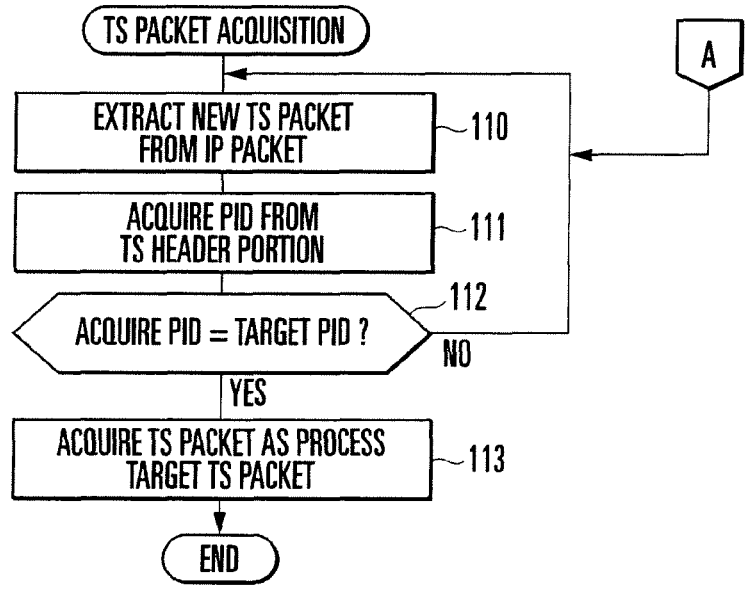
FIG. 5 is a flowchart illustrating TS packet acquisition processing of the video quality estimation apparatus according to the first embodiment of the present invention.

If the sequence length is shorter than the maximum GOP length (NO in step 310), the frame type determination unit 15B returns to step 110 in FIG. 5 to process the next TS packet.

If the sequence length is equal to or longer than the maximum GOP length (YES in step 310), the frame type determination unit 15B moves data F1 to F17 corresponding to the maximum GOP length from the frame data amount sequence 14D in the storage unit 14 to a determination sequence 14E (step 311), as shown in FIG. 8A described above.

The frame type determination unit 15B determines, as an I frame, a frame corresponding to the data F15 having the maximum frame data amount in the determination sequence 14E, stores the determination result in the determination result sequence 14F in the storage unit 14 (step 312), as shown in FIG. 8B, and ends the series of I frame determination processes.

[P/B Frame Determination Processing]

P/B frame determination processing of the video quality estimation apparatus according to the third embodiment of the present invention will be described next with reference to FIGS. 15, 16, 17A, and 17B.

Figure 15:
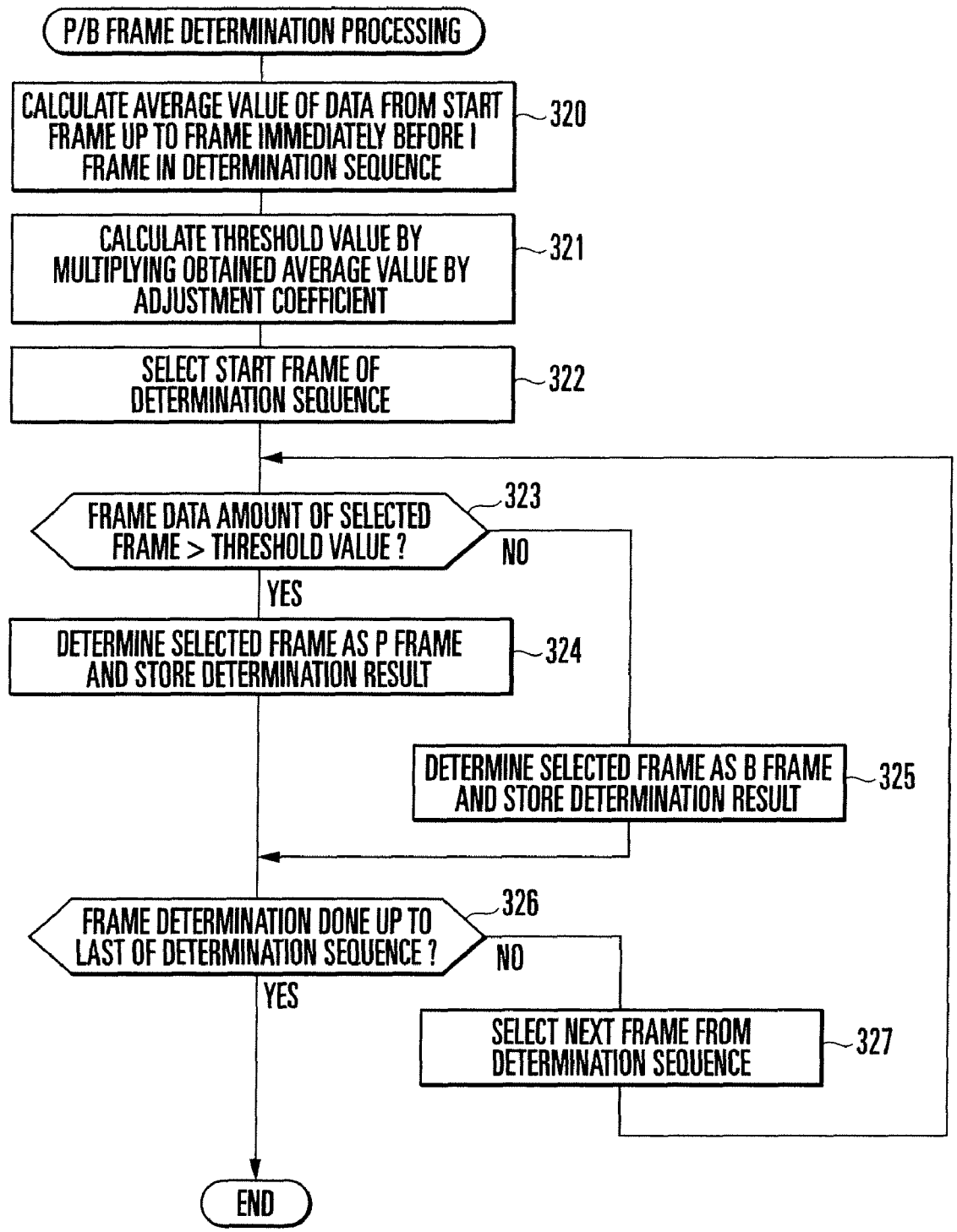
FIG. 15 is a flowchart illustrating P/B frame determination processing of the video quality estimation apparatus according to the third embodiment of the present invention.

In the P/B frame determination processing in step 301 of FIG. 13, the frame type determination unit 15B of the arithmetic processing unit 15 executes the P/B frame determination processing in FIG. 15.

Figure 16:
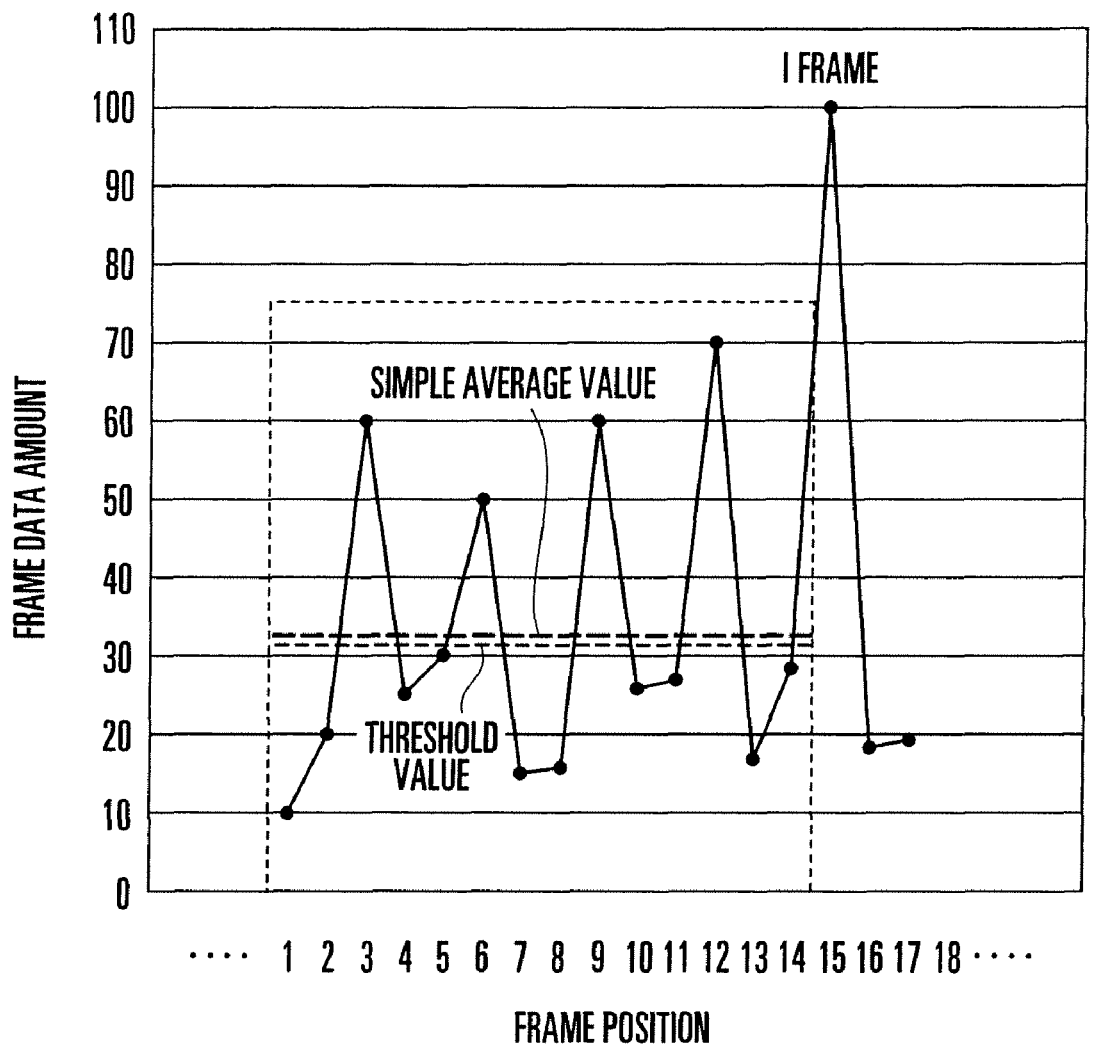
FIG. 16 is an explanatory view showing the P/B frame determination processing of the video quality estimation apparatus according to the third embodiment of the present invention.
Figure 17A:
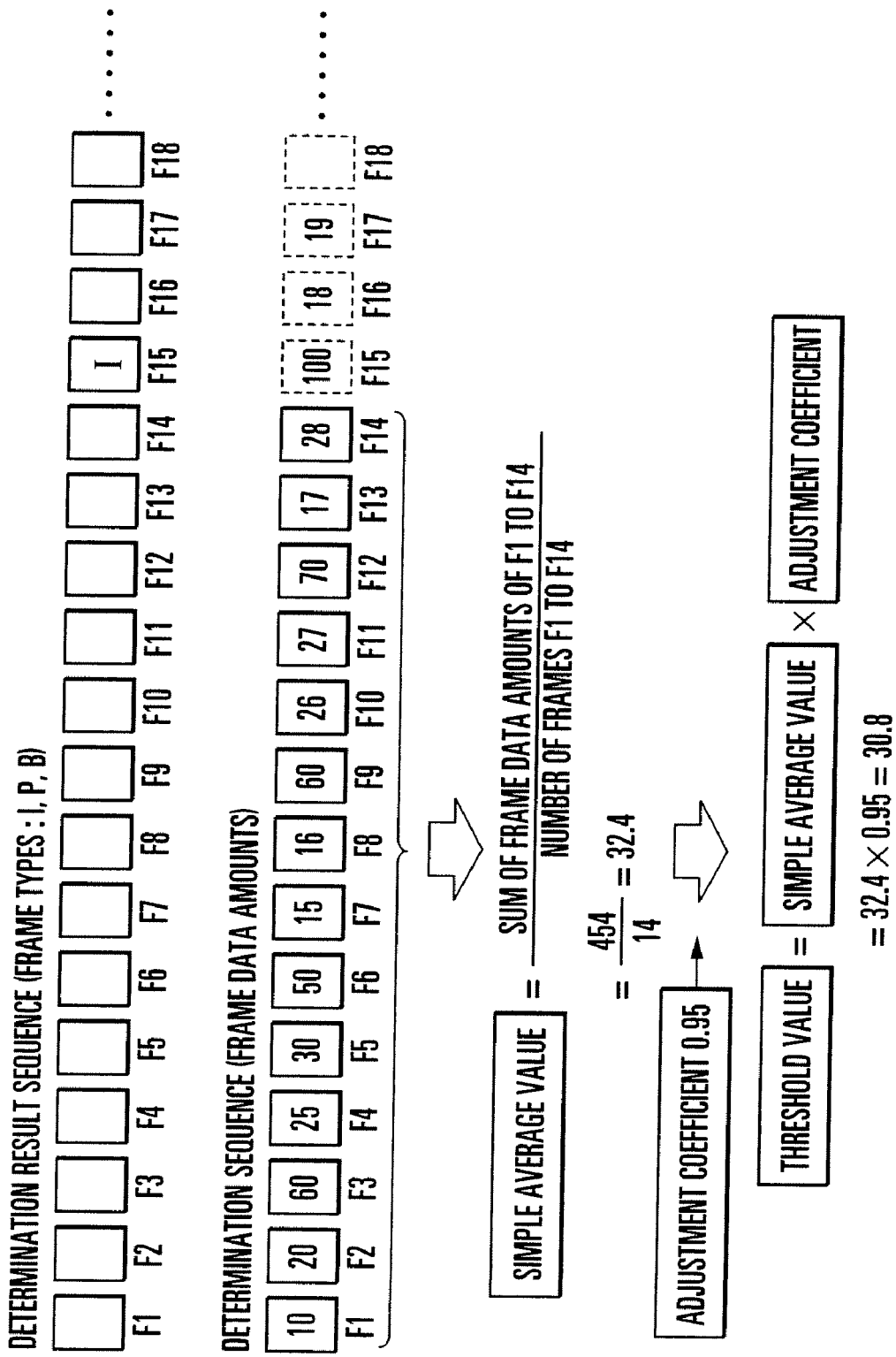
FIG. 17A is an explanatory view showing part of the P/B frame determination processing of the video quality estimation apparatus according to the third embodiment of the present invention.

The frame type determination unit 15B calculates the simple average value of the frame data amounts of the start frame up to the frame determined as an I frame in the above-described I frame determination processing in the determination sequence 14E in the storage unit 14 (step 320), as shown in FIGS. 16 and 17A. In the example shown in FIG. 17A, the simple average value of the frames F1 to F14 is calculated.

The frame type determination unit 15B multiples the obtained simple average value by an adjustment coefficient given as a coefficient, thereby calculating the threshold value for P/B frame determination (step 321).

Figure 17B:
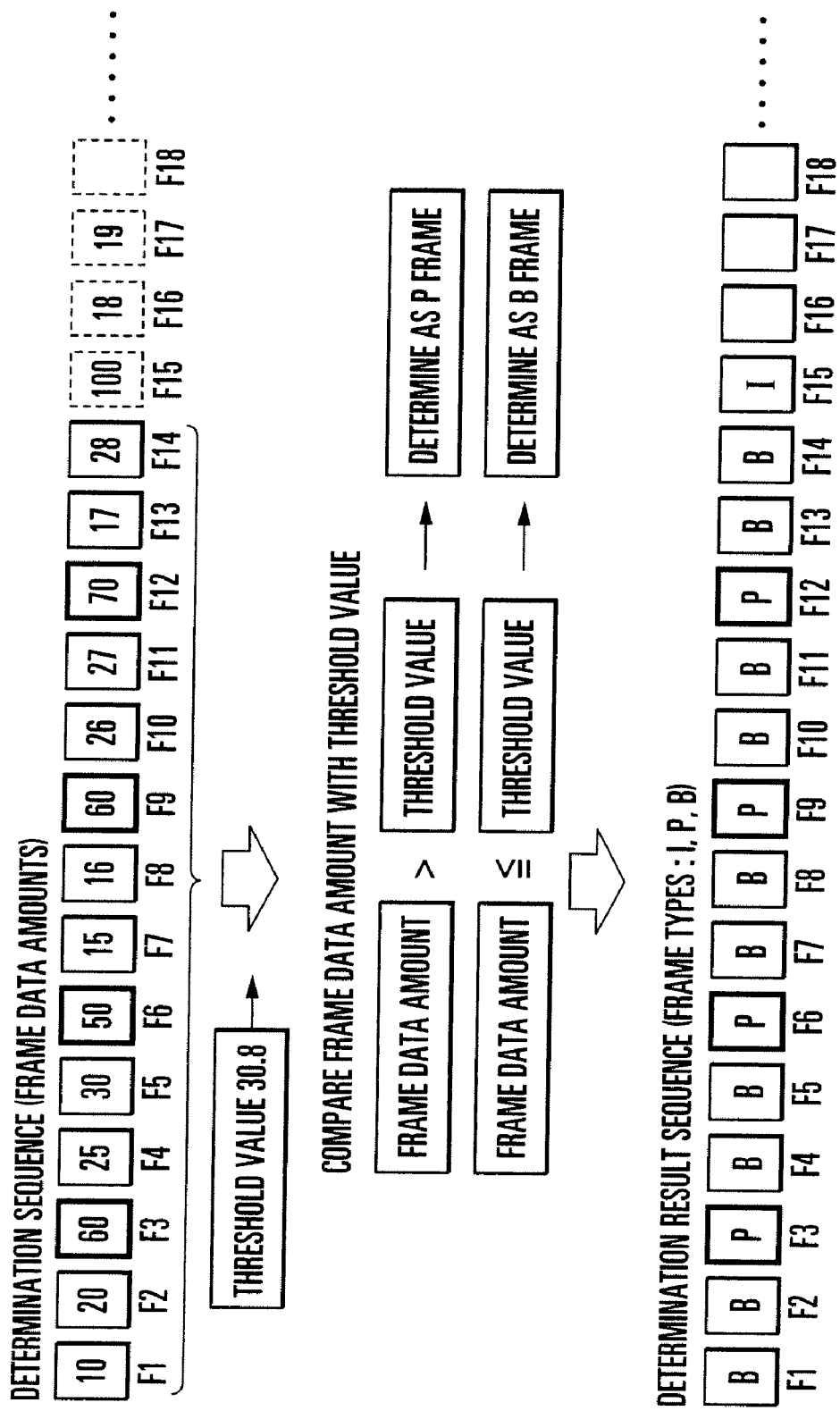
FIG. 17B is an explanatory view showing another part of the P/B frame determination processing of the video quality estimation apparatus according to the third embodiment of the present invention.

The frame type determination unit 15B selects the start frame of the determination sequence 14E (step 322), and compares the frame data amount of the selected frame with the threshold value (step 323), as shown in FIG. 17B.

If the frame data amount of the selected frame is larger than the threshold value (YES in step 323), the frame type determination unit 15B determines the selected frame as a P frame, and stores frame type information representing a P frame in the selected frame of the determination result sequence 14F in the storage unit 14 (step 324).

In the example shown in FIG. 17B, the frames F3, F6, F9, and F12 have frame data amounts larger than the threshold value and are therefore determined as P frames. The remaining frames F1, F2, F4, F5, F7, F8, F10, F11, F13, and F14 have frame data amounts equal to or smaller than the threshold value and are therefore determined as B frames.

If the frame data amount of the selected frame is equal to or smaller than the threshold value (NO in step 323), the frame type determination unit 15B determines the selected frame as a B frame, and stores frame type information representing a B frame in the selected frame of the determination result sequence 14F in the storage unit 14 (step 325).

After that, the frame type determination unit 15B determines whether the frame type determination using the threshold value has been done up to the last frame of the determination sequence 14E (step 326). If the determination has not been done up to the last frame (NO in step 326), the frame type determination unit 15B selects the next frame from the determination sequence 14E (step 327), and returns to step 323.

If the determination has been done up to the last frame (YES in step 326), the frame type determination unit 15B ends the series of P/B frame determination processes.

[Determination Period Learning Method]

The determination period learning method of the video quality estimation apparatus according to the third embodiment of the present invention will be described with reference to FIG. 18.

In the determination period learning processing, the number of frames from each I frame to the next I frame is counted in TS packets corresponding to a learning period given in advance in a process target elementary stream. The maximum value, i.e., the maximum GOP is learned as a determination period to be used as a coefficient in the I frame determination processing.

Figure 18:
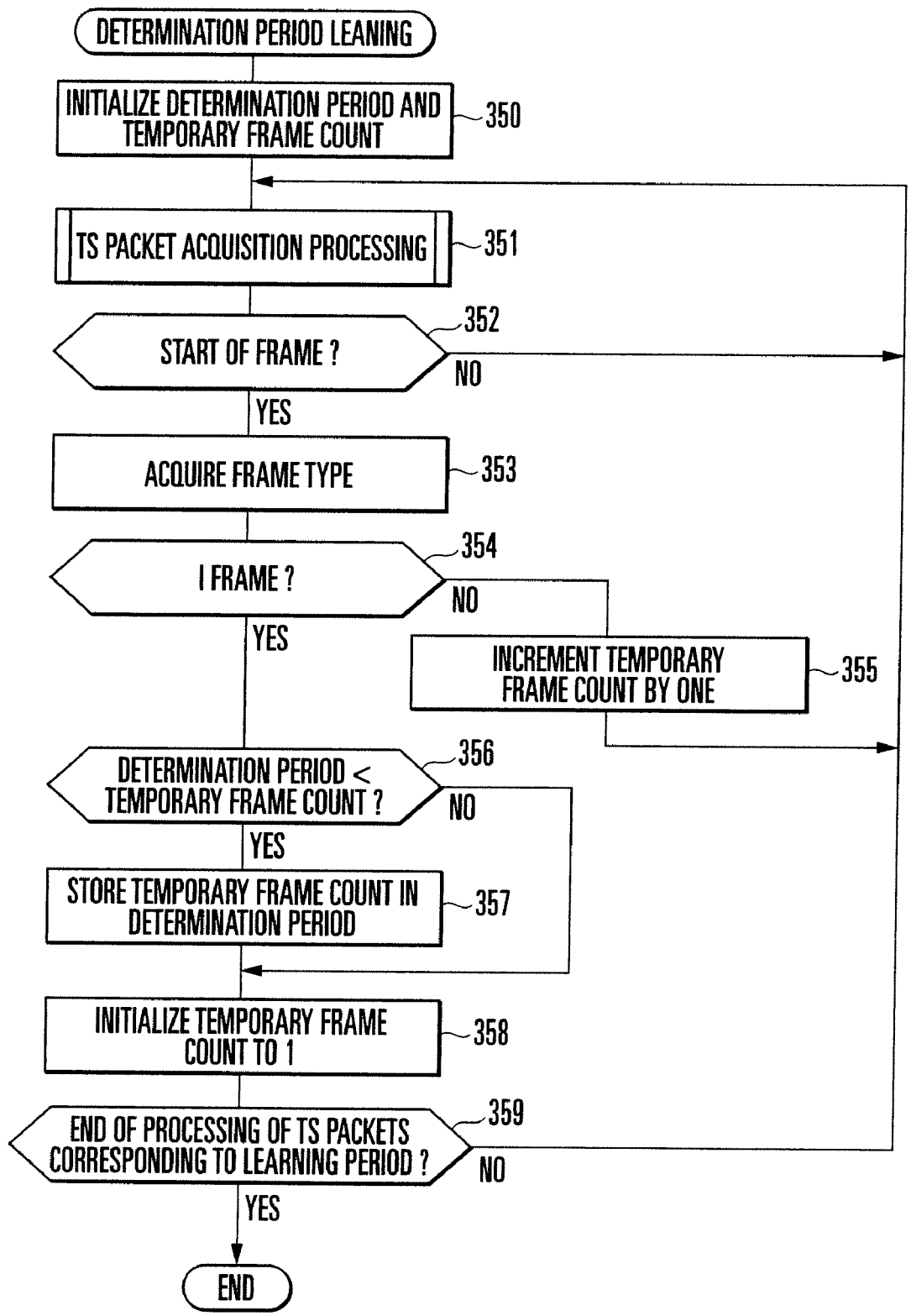
FIG. 18 is a flowchart illustrating determination period learning processing of the video quality estimation apparatus according to the third embodiment of the present invention.

When the frame type determination unit 15B is going to determine the frame type of a target frame, the arithmetic processing unit 15 of the video quality estimation apparatus 10 executes the determination period learning processing in FIG. 18 in advance. Assume that a process target PID 14B is stored in the storage unit 14 as identification information to identify a TS packet of the process target elementary stream before execution of the determination period learning processing.

The frame type determination unit 15B clears the determination period to zero and sets "1" as the temporary frame count, thereby initializing the determination period and the temporary frame count (step 350). The TS packet acquisition unit 15A executes the TS packet acquisition processing in FIG. 5 described above, thereby acquiring a TS packet having the process target PID 14B (step 351).

The frame type determination unit 15B reads out, from the storage unit 14, the TS packet acquired by the TS packet acquisition unit 15A, and determines based on payload_unit_start_indicator information in the TS header portion whether the TS packet is at the start of a frame (step 352). If the TS packet is not at the start of a frame (NO in step 352), the process returns to step 351.

If the acquired TS packet is at the start of a frame (NO in step 352), the frame type determination unit 15B analyzes the TS packet to acquire the frame type (step 353).

If the acquired frame type represents a frame other than an I frame (NO in step 354), the frame type determination unit 15B increments the temporary frame count by one (step 355), and returns to step 301.

If the acquired frame type represents an I frame (YES in step 354), the frame type determination unit 15B compares the temporary frame count with the determination period (step 356). Only when the temporary frame count is larger than the determination period (YES in step 356), the frame type determination unit 15B stores the temporary frame count in the determination period (step 357).

After that, the frame type determination unit 15B initializes the temporary frame count to 1 (step 358). If the processing of the TS packets corresponding to the learning period has not ended yet (NO in step 359), the process returns to step 301. If the processing of the TS packets corresponding to the learning period has ended (YES in step 359), the frame type determination unit 15B ends the series of determination period learning processes.

With this processing, the number of frames from an I frame to the next I frame is counted in TS packets of a process target elementary stream. The maximum value, i.e., the maximum GOP is learned as a determination period.

[Adjustment Coefficient Learning Method]

The adjustment coefficient learning method of the video quality estimation apparatus according to the third embodiment of the present invention will be described next with reference to FIG. 19.

The adjustment coefficient learning processing learns an adjustment coefficient to be used as a coefficient in the P/B frame determination processing.

A case will be explained here, in which the same processing as the frame type determination processing is executed using temporary adjustment coefficients sequentially selected within a given range, thereby estimating the frame type of each frame in a learning period given in advance, the erroneous determination ratio of the estimation results to the actual frame types acquired from a non-encrypted stream is calculated, and a temporary adjustment coefficient having the lowest erroneous determination ratio is learned as a true adjustment coefficient.

Figure 19:
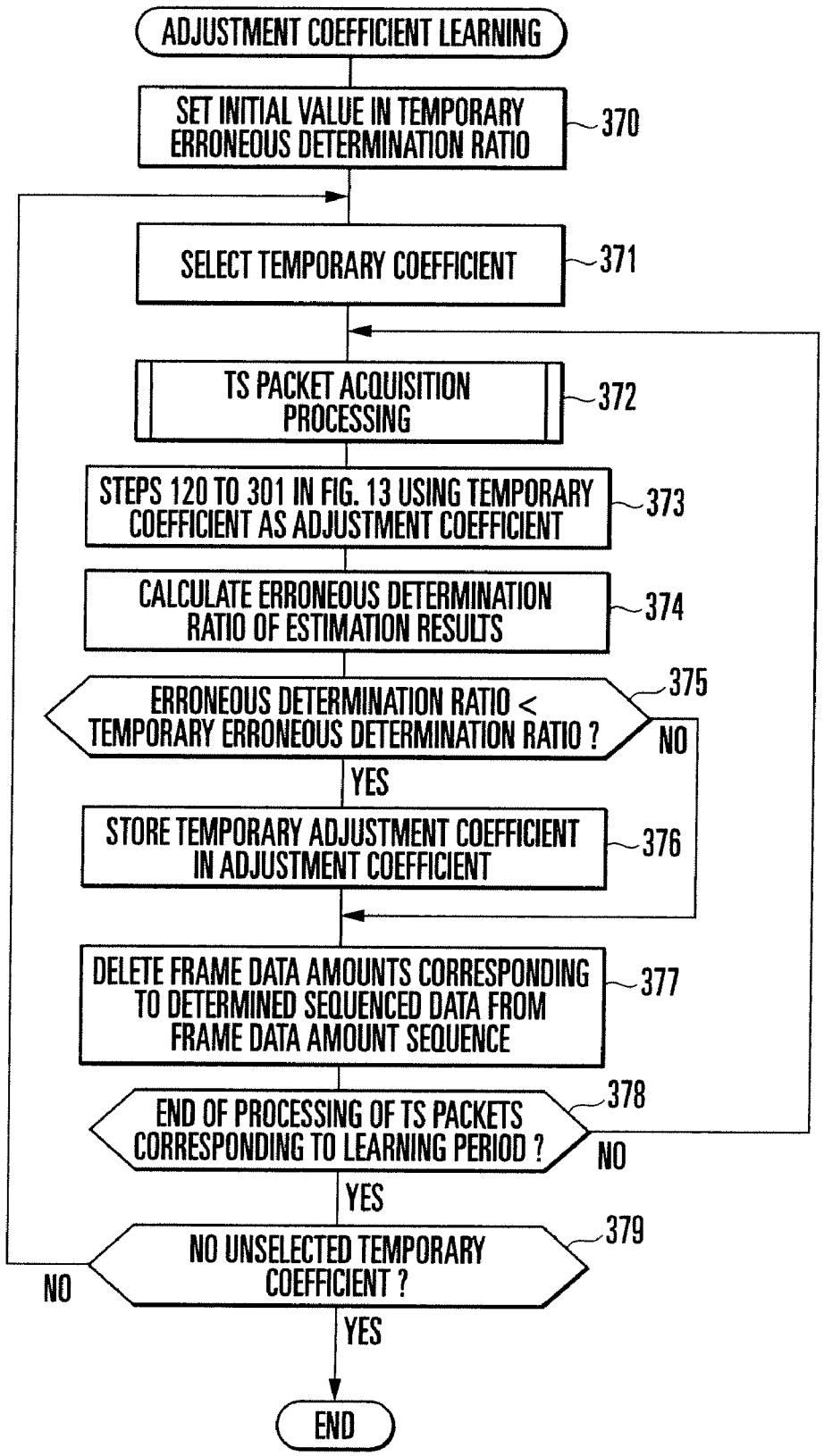
FIG. 19 is a flowchart illustrating adjustment coefficient learning processing of the video quality estimation apparatus according to the third embodiment of the present invention.

When the frame type determination unit 15B is going to determine the frame type of a target frame, the arithmetic processing unit 15 of the video quality estimation apparatus 10 executes the adjustment coefficient learning processing in FIG. 19 in advance. Assume that the process target PID 14B is stored in the storage unit 14 as identification information to identify a TS packet of the process target elementary stream, and the determination period is obtained by the above-described determination period learning processing shown in FIG. 18 before execution of the adjustment coefficient learning processing.

The frame type determination unit 15B sets an appropriate initial value in the temporary erroneous determination ratio (step 370), and sets an unselected value in a given range as a temporary adjustment coefficient (step 371). The TS packet acquisition unit 15A executes the TS packet acquisition processing in FIG. 5 described above, thereby acquiring a TS packet having the process target PID 14B (step 372).

The frame type determination unit 15B executes the same processes as in steps 120 to 301 in FIG. 13 (step 373). At this time, a temporary adjustment coefficient is used in place of an adjustment coefficient.

With this processing, a frame type determination result representing one of I, P, and B frames is stored in the determination result sequence 14F in the storage unit 14 in correspondence with each of frames up to the next I frame in the frame data amount sequence 14D.

After that, the frame type determination unit 15B compares the obtained frame type estimation results with actual frame types, i.e., the correct frame types acquired from the non-encrypted stream of the process target elementary stream prepared in advance, thereby calculating the erroneous determination ratio of the estimation results to the correct frame types (step 374). The erroneous determination ratio is obtained by [number of frames whose estimation results are wrong]÷[total number of frames of estimation target].

The frame type determination unit 15B compares the obtained erroneous determination ratio with the temporary erroneous determination ratio (step 375). Only when the erroneous determination ratio is smaller than the temporary erroneous determination ratio (YES in step 375), the frame type determination unit 15B stores the temporary adjustment coefficient in the adjustment coefficient (step 376).

The frame type determination unit 15B deletes the frame data amounts corresponding to the determined frames F1 to F15 from the frame data amount sequence 14D in the storage unit 14 (step 377).

If the processing of the TS packets corresponding to the learning period has not ended yet (NO in step 378), the process returns to step 372. If the processing of the TS packets corresponding to the learning period has ended (YES in step 378), the frame type determination unit 15B determines whether all temporary adjustment coefficients have been selected (step 379).

If not all temporary adjustment coefficients have been selected (NO in step 379), the frame type determination unit 15B returns to step 371. If all temporary adjustment coefficients have been selected (YES in step 379), the frame type determination unit 15B ends the series of adjustment coefficient learning processes.

With this processing, an adjustment coefficient having the lowest erroneous determination ratio is learned in frame type estimation in TS packets of a process target elementary stream.

[Effects of Third Embodiment]

As described above, in the frame type determination processing of the frame type determination unit 15B of the arithmetic processing unit 15 of this embodiment, an I frame in an elementary stream is determined. Then, the frame data amount of each frame is compared with a threshold value, thereby distinguishing between P and B frames. This makes it possible to grasp the frame type of each frame based on TS packets having encrypted payload portions even when no specific frame pattern exists as the GOP structure of the elementary stream.

In this embodiment, when determining P and B frames, P and B frames are determined based on a result of comparison between a threshold value calculated based on the average value of the frame data amounts of a plurality of frames within a predetermined range and the frame data amount of each frame in an appearance pattern, i.e., the large/small relationship between them. It is therefore possible to determine a frame type by very simple arithmetic processing.

[Fourth Embodiment]

A video quality estimation apparatus according to the fourth embodiment of the present invention will be described next.

In the third embodiment, an example has been described in which P/B frame determination processing of determining P and B frames based on a threshold value is used. In the fourth embodiment, a case will be explained in which P frame determination processing of determining, as P frames, continuous frames having a predetermined frame data amount within a predetermined range is used in place of the P/B frame determination processing.

The arrangement of the video quality estimation apparatus of the fourth embodiment is the same as in the first embodiment (FIG. 1) except the contents of processing by a frame type determination unit 15B of an arithmetic processing unit 15, and a detailed description thereof will not be repeated here.

[Operation of Fourth Embodiment]

The operation of the video quality estimation apparatus according to the fourth embodiment of the present invention will be described next.

A video quality estimation apparatus 10 of this embodiment uses two kinds of frame determination processing, i.e., I frame determination processing and P/B frame determination processing when causing the frame type determination unit 15B of the arithmetic processing unit 15 to determine the frame type of a determination target frame.

I frame determination processing is a frame determination method of determining an I frame and is the same as the I frame determination processing in FIG. 14 described in the third embodiment.

P frame determination processing is frame determination processing of determining P frames. An adjustment coefficient A which adjusts a threshold value to determine the start position of continuous P frames based on frame data amounts, an adjustment coefficient B which adjusts a determination range to determine, based on frame data amounts, whether all frames within a search range from the start position to the end position of the continuous P frames are P frames, and a lower limit frame count representing the minimum necessary number of frames in the search range from the start position to the end position of the continuous P frames are used as coefficients.

The adjustment coefficients A and B and the lower limit frame count are preferably learned and stored in a storage unit 14 in advance before execution of frame determination processing. However, standard values may be externally input and stored in the storage unit 14.

[Frame Type Determination Processing]

Frame type determination processing of the video quality estimation apparatus according to the fourth embodiment of the present invention will be described first with reference to FIG. 20. The same step numbers as in FIG. 13 described above denote the same or similar processes in FIG. 20.

Figure 20:
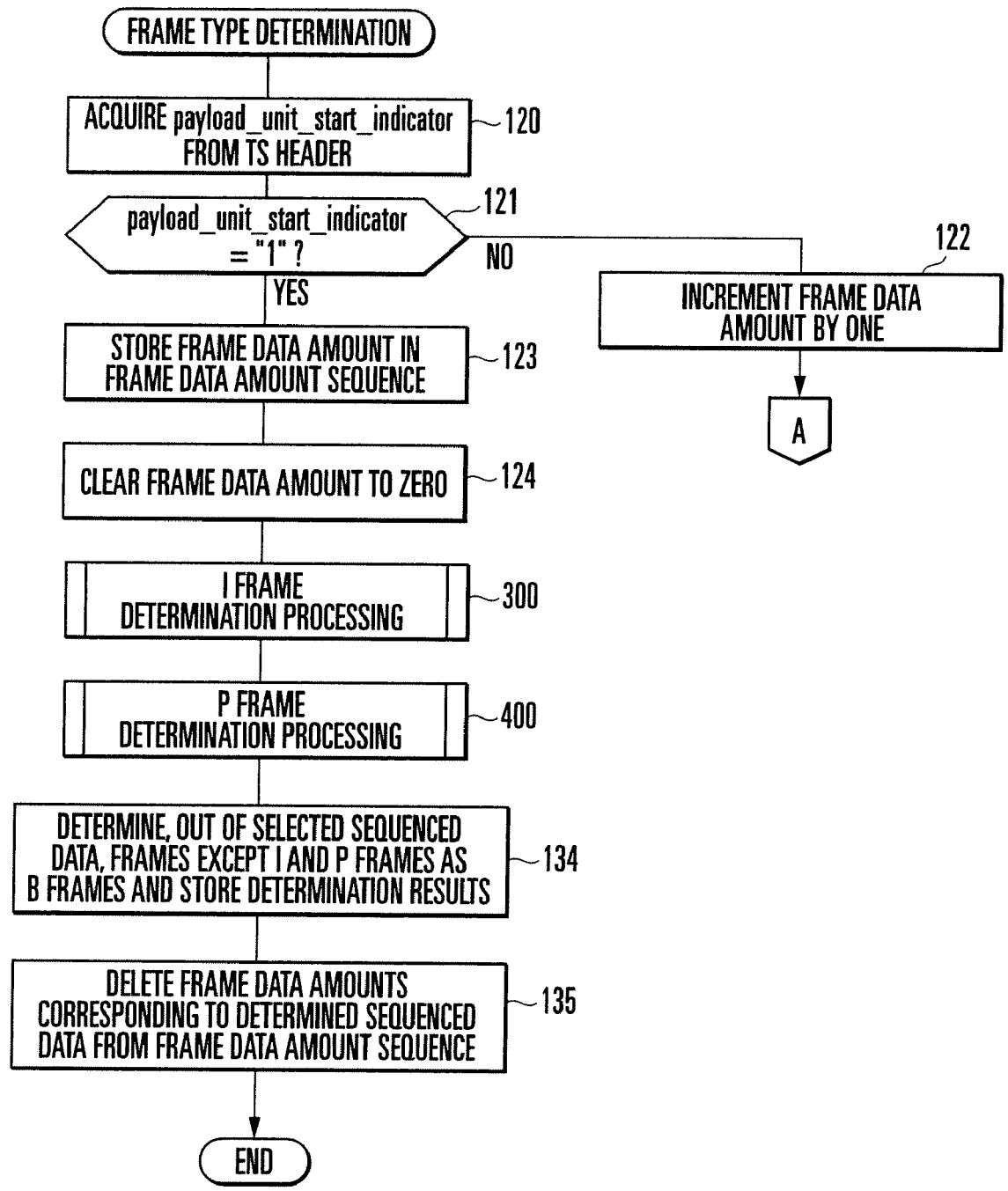
FIG. 20 is a flowchart illustrating frame type determination processing of a video quality estimation apparatus according to the fourth embodiment of the present invention.

In the frame type determination processing in step 102 of FIG. 4, the frame type determination unit 15B of the arithmetic processing unit 15 executes the frame type determination processing in FIG. 20.

The frame type determination unit 15B reads out a TS packet acquired by a TS packet acquisition unit 15A from the storage unit 14, and acquires payload_unit_start_indicator information from the TS header portion (step 120).

If the payload_unit_start_indicator information is not "1" (NO in step 121), the TS packet is not the TS packet at the start of the frame. The frame type determination unit 15B increments a frame data amount 14C in the storage unit 14 by one, thereby counting the number of TS packets of the frame (step 122). The process returns to step 110 in FIG. 5 to process the next TS packet.

If the payload_unit_start_indicator information is "1" (YES in step 121), the frame type determination unit 15B stores the frame data amount 14C in the storage unit 14 as new sequenced data at the end of a frame data amount sequence 14D (step 123), and clears the frame data amount 14C to zero (step 124).

The frame type determination unit 15B executes I frame determination processing in FIG. 14 (to be described later) using a determination period given as a coefficient (step 300), and then executes P frame determination processing in FIG. 21 (to be described later) using the adjustment coefficients A and B and a lower limit frame count as coefficients (step 400).

With these processes, a frame type determination result representing one of I and P frames is stored in a determination result sequence 14F in the storage unit 14 in correspondence with each of frames up to the next I frame in the frame data amount sequence 14D.

After thus determining I and P frames, the frame type determination unit 15B determines, as B frames, remaining undetermined frames which are determined neither as I frames nor as P frames in the frames up to the next I frame in the frame data amount sequence 14D, and stores the determination results in the determination result sequence 14F in the storage unit 14 (step 134).

The frame type determination unit 15B deletes the frame data amounts corresponding to the determined frames from the frame data amount sequence 14D in the storage unit 14 (step 135), and ends the series of frame type determination processes.

[P Frame Determination Processing]

P frame determination processing of the video quality estimation apparatus according to the fourth embodiment of the present invention will be described next with reference to FIGS. 21, 22, and 23A to 23E.

Figure 21:
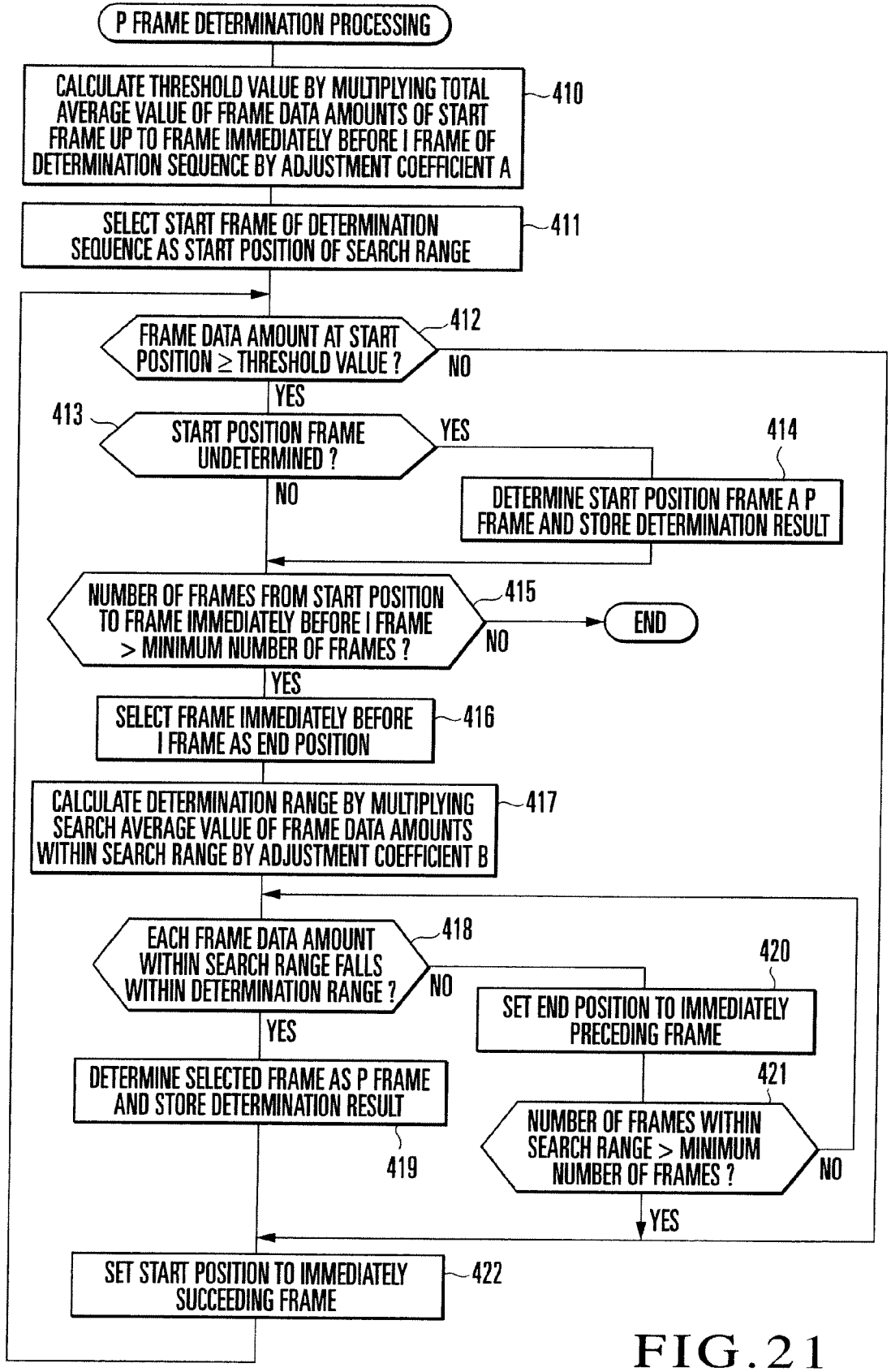
FIG. 21 is a flowchart illustrating P frame determination processing of the video quality estimation apparatus according to the fourth embodiment of the present invention.

In the P frame determination processing in step 400 of FIG. 20, the frame type determination unit 15B of the arithmetic processing unit 15 executes the P frame determination processing in FIG. 21.

Figure 22:
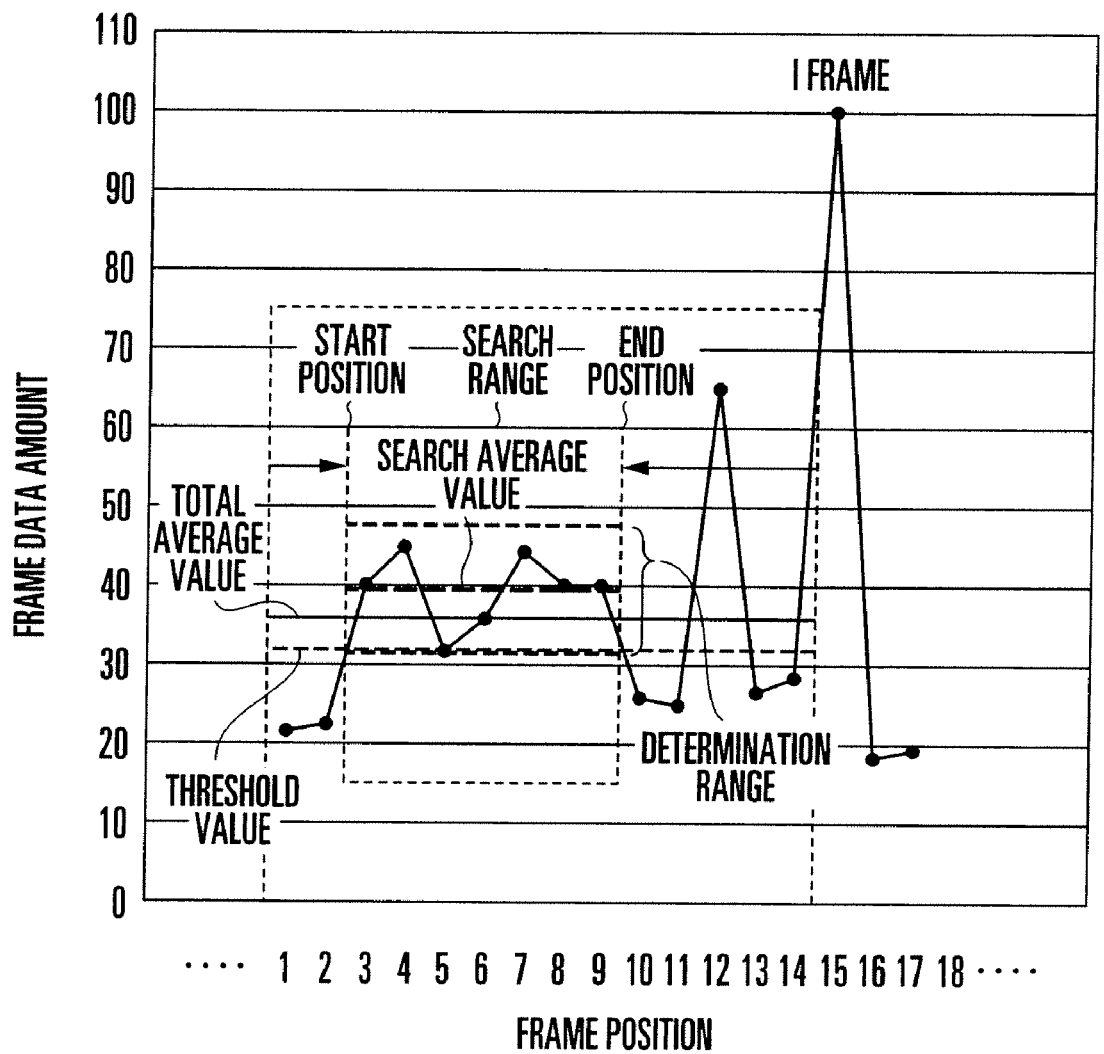
FIG. 22 is an explanatory view showing the P frame determination processing of the video quality estimation apparatus according to the fourth embodiment of the present invention.
Figure 23A:
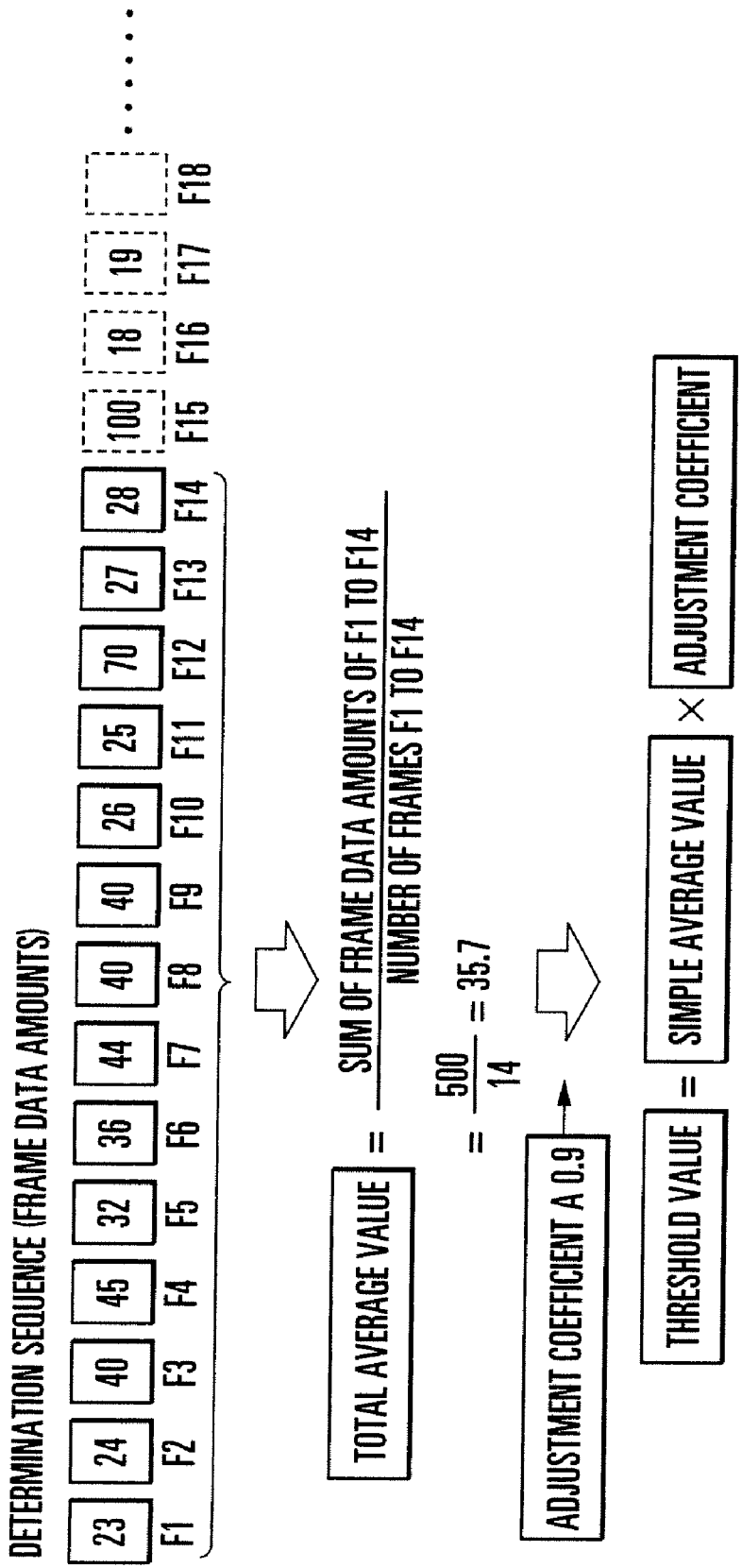
FIG. 23A is an explanatory view showing part of the P frame determination processing of the video quality estimation apparatus according to the fourth embodiment of the present invention.

The frame type determination unit 15B calculates, as a total average value, the simple average value of the frame data amounts of the start frame up to the frame determined as an I frame in the above-described I frame determination processing in a determination sequence 14E in the storage unit 14, and multiples the total average value by the adjustment coefficient A given as a coefficient, thereby calculating a threshold value to determine the start position of continuous P frames (step 410), as shown in FIGS. 22 and 23A. In the example shown in FIG. 23A, a sum "500" of the frame data amounts of frames F1 to F15 is divided by the number of frames "14", thereby obtaining a total average value "35.7". The total average value is multiplied by the adjustment coefficient A "0.7", thereby obtaining a threshold value "35.7×0.7=25.0".

Figure 23B:
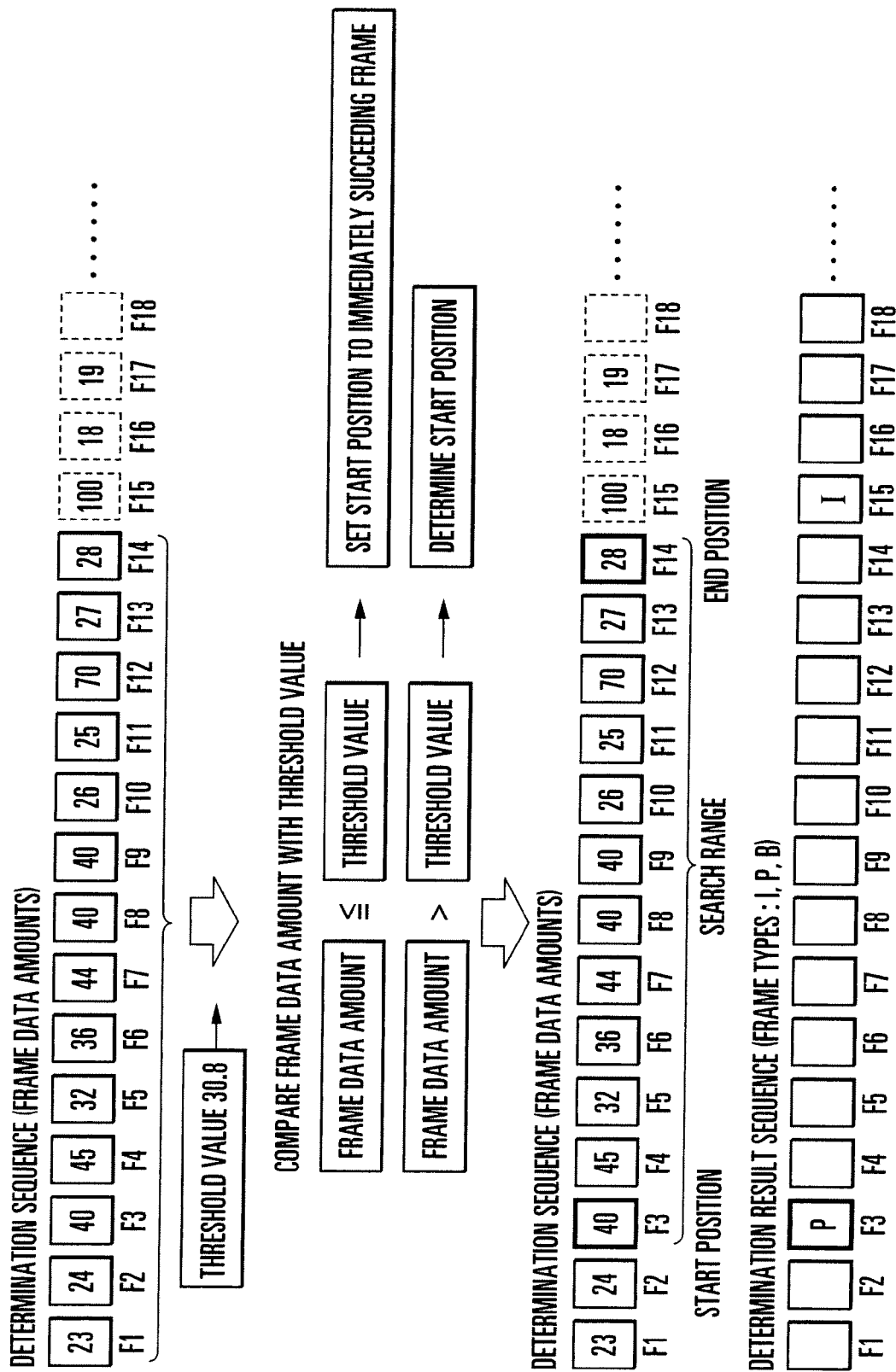
FIG. 23B is an explanatory view showing part of the P frame determination processing of the video quality estimation apparatus according to the fourth embodiment of the present invention.

The frame type determination unit 15B selects the start frame of the determination sequence 14E in the storage unit 14 as the start position of a range, i.e., a search range where P frames are expected to continue (step 411), and compares the frame data amount of the frame at the start position with the threshold value (step 412), as shown in FIG. 23B. In the example shown in FIG. 23B, the frame data amounts of the frames F1 to F14 are compared with the threshold value obtained in step 410. At this time, since the frame data amounts of the frames F1 and F2 are equal to or smaller than the threshold value, the start position is set to the immediately succeeding frame. Since the frame data amount of the frame 23 is larger than the threshold value, the frame F3 is selected as the start position of the search range and determined as a P frame.

If the frame data amount of the frame at the start position is smaller than the threshold value (NO in step 412), the frame type determination unit 15B sets the start position to the immediately succeeding frame (step 422), and returns to step 402.

If the frame data amount of the frame at the start position is equal to or larger than the threshold value (YES in step 412), the frame type determination unit 15B determines the frame at the start position as a P frame only when it has not yet undergone the frame type determination (YES in step 413), and stores the determination result in the determination result sequence 14F in the storage unit 14 (step 414).

The frame type determination unit 15B compares the number of frames from the start position to the frame immediately before the next I frame with the lower limit frame count (step 415). If the number of frames is smaller than the lower limit frame count (NO in step 415), the frame type determination unit 15B ends the series of P frame determination processes.

If the number of frames is equal to or larger than the lower limit frame count (YES in step 415), the frame type determination unit 15B selects the frame immediately before the next I frame as the end position of the range where P frames are expected to continue, i.e., the search range (step 416).

Figure 23C:
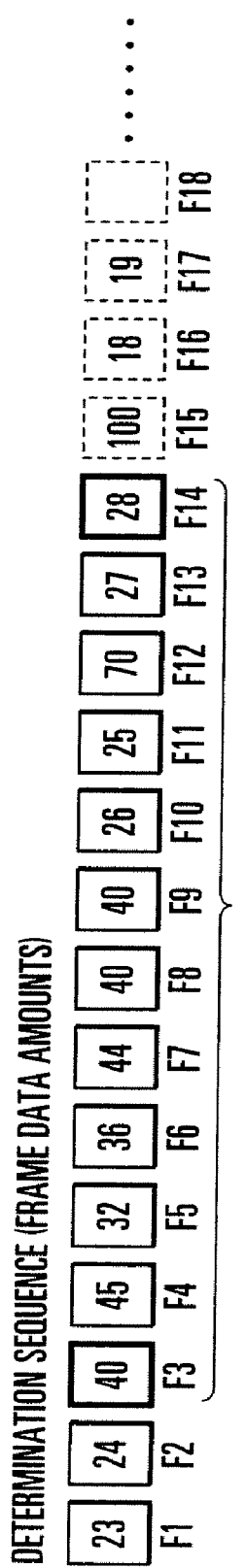
FIG. 23C is an explanatory view showing part of the P frame determination processing of the video quality estimation apparatus according to the fourth embodiment of the present invention.

The frame type determination unit 15B calculates, as a search average value, the average value of the frame data amounts of the frames from the start position to the end position of the search range, and multiples the search average value by the adjustment coefficient B given as a coefficient, thereby calculating a determination range for continuous P frame determination (step 417), as shown in FIG. 23C.

In the example shown in FIG. 23C, a sum "453" of the frame data amounts of the frames F3 to F14 within the search range is divided by the number of frames "12", thereby obtaining a search average value "37.75". The search average value is multiplied by the adjustment coefficient B to obtain a determination range width. The determination range width is added/subtracted to/from the search average value, thereby obtaining a determination range "30.2 to 45.3".

Figure 23D:
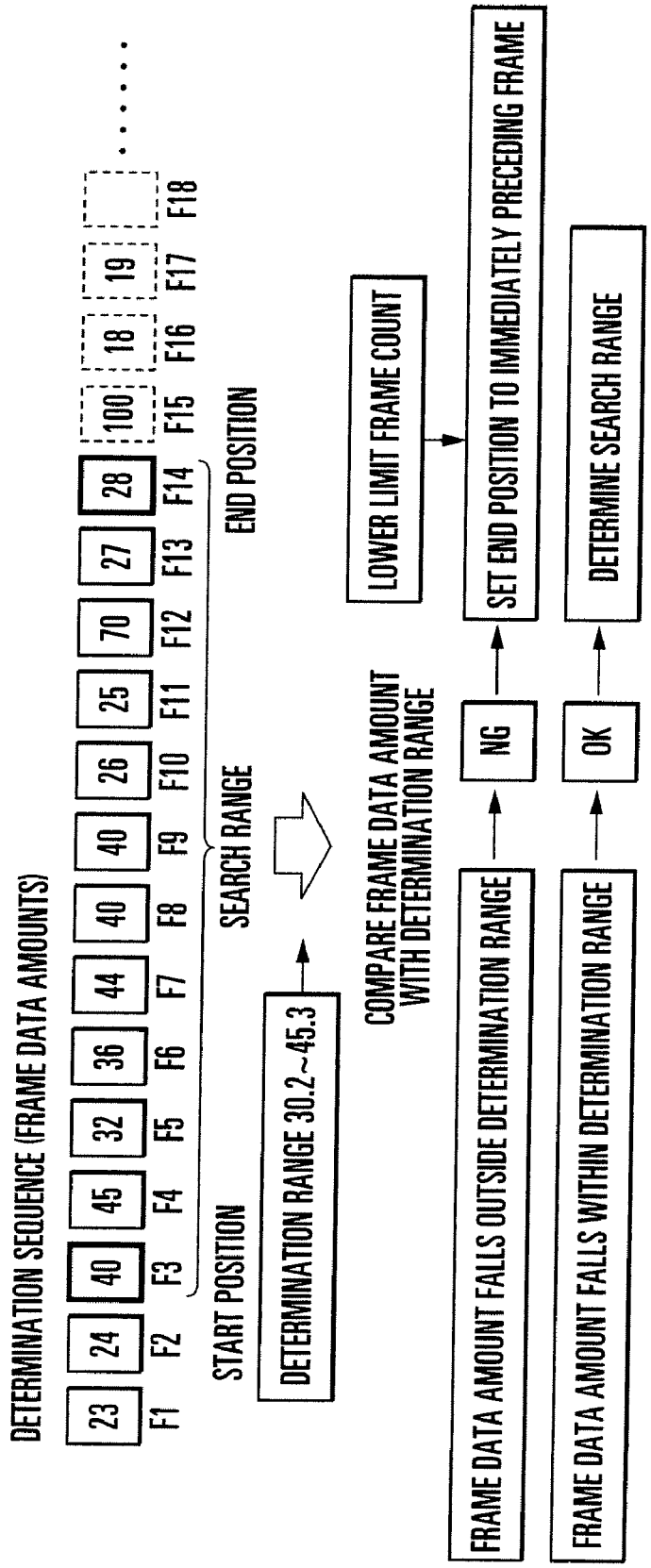
FIG. 23D is an explanatory view showing part of the P frame determination processing of the video quality estimation apparatus according to the fourth embodiment of the present invention.

The frame type determination unit 15B compares the frame data amount of each frame from the start position to the end position of the search range with the determination range (step 418), as shown in FIG. 23D. In the example shown in FIG. 23D, the frames F3 to F14 belonging to the search range defined in step 416 are compared with the determination range "30.2 to 45.3" obtained in step 417.

If all the frame data amounts of these frames fall within the determination range (YES in step 418), the frame type determination unit 15B determines the frames within the search range as continuous P frames, stores the determination results in the determination result sequence 14F in the storage unit 14 (step 419), and advances to step 422 to execute determination of continuous P frames concerning a new search range having the start position set to the immediately succeeding frame.

Figure 23E:
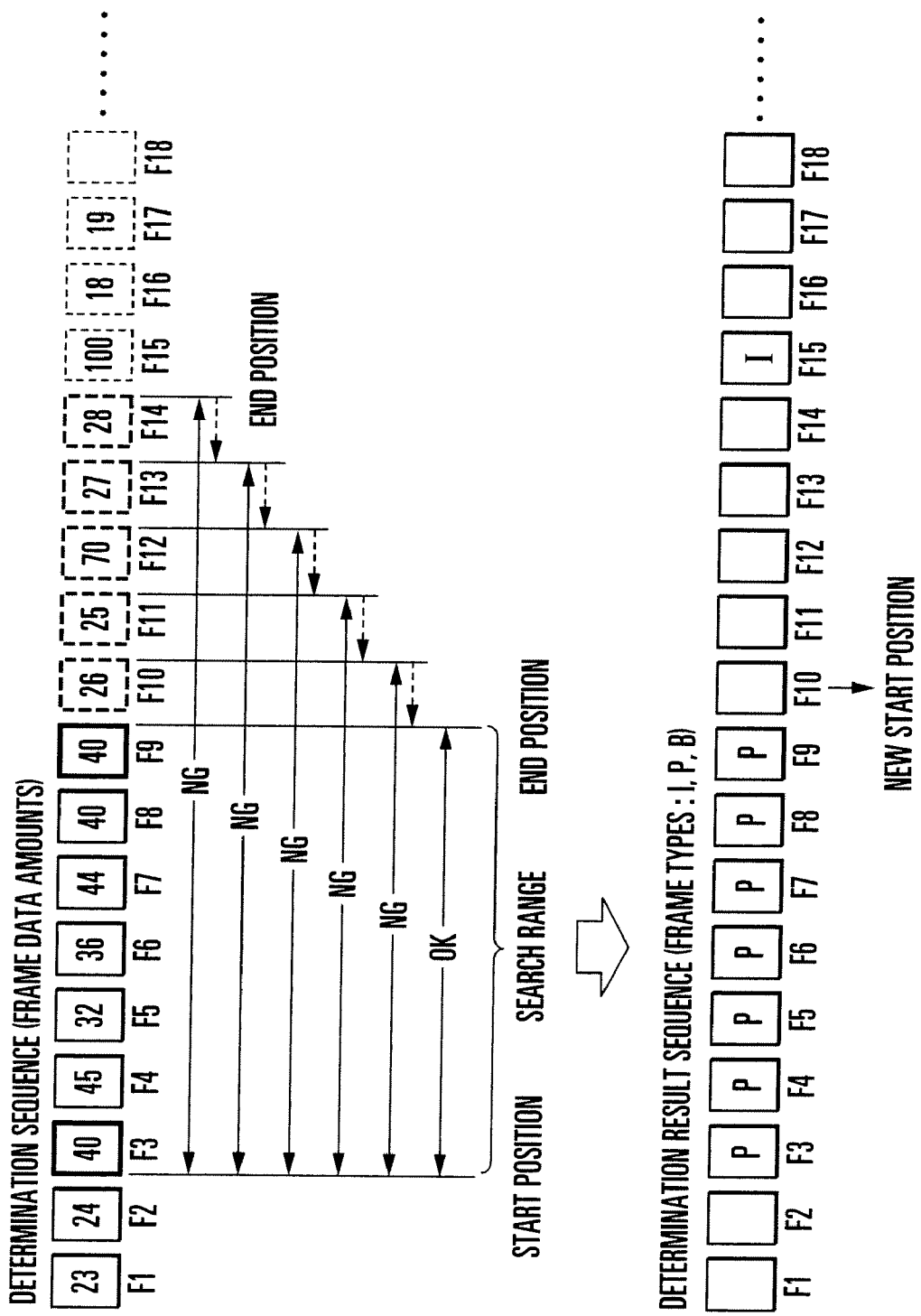
FIG. 23E is an explanatory view showing part of the P frame determination processing of the video quality estimation apparatus according to the fourth embodiment of the present invention.

If one of the frame data amounts of these frames falls outside the determination range (NO in step 418), the frame type determination unit 15B sets the end position to the immediately preceding frame (step 420), and compares the number of frames included in the search range with the lower limit frame count (step 421), as shown in FIG. 23E. In the example shown in FIG. 23E, regarding the search range of the frames F3 to F14, since not all the frame data amounts of these frames fall within the determination range, the end position is set to the immediately preceding frame F13. The determination is executed for the search ranges of F3 to F13, F3 to F12, F3 to F11, and F3 to F10 in the same way, and the end position is set to the immediately preceding frame each time. In the search range of the frames F3 to F9, the frame data amounts of all frames fall within the determination range at last. Hence, the frames F3 to F9 are determined as continuous P frames.

If the number of frames is equal to or larger than the lower limit frame count (YES in step 421), the process returns to step 418 to execute determination of continuous P frames concerning a new search range narrowed by one frame. If the number of frames is smaller than the lower limit frame count (NO in step 421), the process advances to step 422 to execute determination of continuous P frames concerning a new search range having the start position set to the immediately succeeding frame.

[Coefficient Learning Processing]

Coefficient learning processing of the video quality estimation apparatus according to the fourth embodiment of the present invention will be described next.

Learning of the adjustment coefficients A and B and the lower limit frame count to be used in the frame type determination processing of this embodiment can be executed by replacing the adjustment coefficient of the adjustment coefficient learning processing in FIG. 19 described in the third embodiment with the adjustment coefficients A and B and the lower limit frame count of the fourth embodiment. A detailed description thereof will be omitted.

To learn the adjustment coefficients A and B and the lower limit frame count, learning processing is performed in two steps. More specifically, the determination period to be used in the I frame determination processing is learned first by the determination period learning processing in FIG. 18 described in the third embodiment, and the adjustment coefficients A and B and the lower limit frame count are then learned.

When learning the adjustment coefficients A and B and the lower limit frame count, the P frame determination processing in FIG. 21 described above is executed while giving temporary values to the adjustment coefficients A and B and the lower limit frame count, respectively. Then, a combination which minimizes the erroneous determination ratio to the determination results is selected.

[Effects of Fourth Embodiment]

As described above, in the frame type determination processing of the frame type determination unit 15B of the arithmetic processing unit 15 of this embodiment, an I frame in an elementary stream is determined. Then, all of a predetermined number or more of continuous frames in which the frame at the start position has a frame data amount equal to or larger than a predetermined threshold value, and the frame data amounts of all frames from the start position to the end position fall within a predetermined determination range are determined as P frames. This makes it possible to grasp the frame type of each frame based on TS packets having encrypted payload portions even when no specific frame pattern exists as the GOP structure of the elementary stream.

Especially, when P frames continue in a predetermined number or more, the information amount of each P frame becomes as small as a B frame. Hence, it may be impossible to correctly determine them by the P/B frame determination processing used in the third embodiment. In this embodiment, placing focus on the small variations between the frame data amounts of such continuous P frames, frames which continue in a predetermined number or more and have frame data amounts within a predetermined determination range are determined as P frames. It is therefore possible to correctly determine P frames.

In this embodiment, a threshold value calculated based on the average value of the frame data amounts of all frames as the target of the frame type determination processing is compared with the frame data amounts of all target frames sequentially from the start frame. It is determined based on the comparison result whether to select a frame as the start frame of the search range. It is therefore possible to select the start frame of the search range by very simple arithmetic processing.

In this embodiment, the determination range is calculated based on the average value of the frame data amounts of frames from the start position to the end position of the search range. It is therefore possible to correctly determine continuous P frames by very simple arithmetic processing.

[Fifth Embodiment]

A video quality estimation apparatus according to the fifth embodiment of the present invention will be described next.

In the third embodiment, an example has been described in which in the frame type determination processing, I frame determination processing is executed, and then, P/B frame determination processing is executed. In the fourth embodiment, an example has been described in which in the frame type determination processing, I frame determination processing is executed, and then, P frame determination processing is executed. In the fifth embodiment, an example will be explained in which in the frame type determination processing, I frame determination processing is executed, P/B frame determination processing is executed then, and P frame determination processing is finally executed.

The arrangement of the video quality estimation apparatus of the fifth embodiment is the same as in the first embodiment (FIG. 1) except the contents of processing by a frame type determination unit 15B of an arithmetic processing unit 15, and a detailed description thereof will not be repeated here.

In the frame type determination processing of this embodiment, the same processing as in FIG. 14 is used as I frame determination processing, the same processing as in FIG. 15 is used as P/B frame determination processing, and the same processing as in FIG. 21 is used as P frame determination processing. A detailed description of these determination processes and processing of learning various coefficients to be used in the determination processes will be omitted.

[Frame Type Determination Processing]

Frame type determination processing of the video quality estimation apparatus according to the fifth embodiment of the present invention will be described next with reference to FIG. 24. The same step numbers as in FIGS. 13 and 20 described above denote the same or similar processes in FIG. 24.

Figure 24:
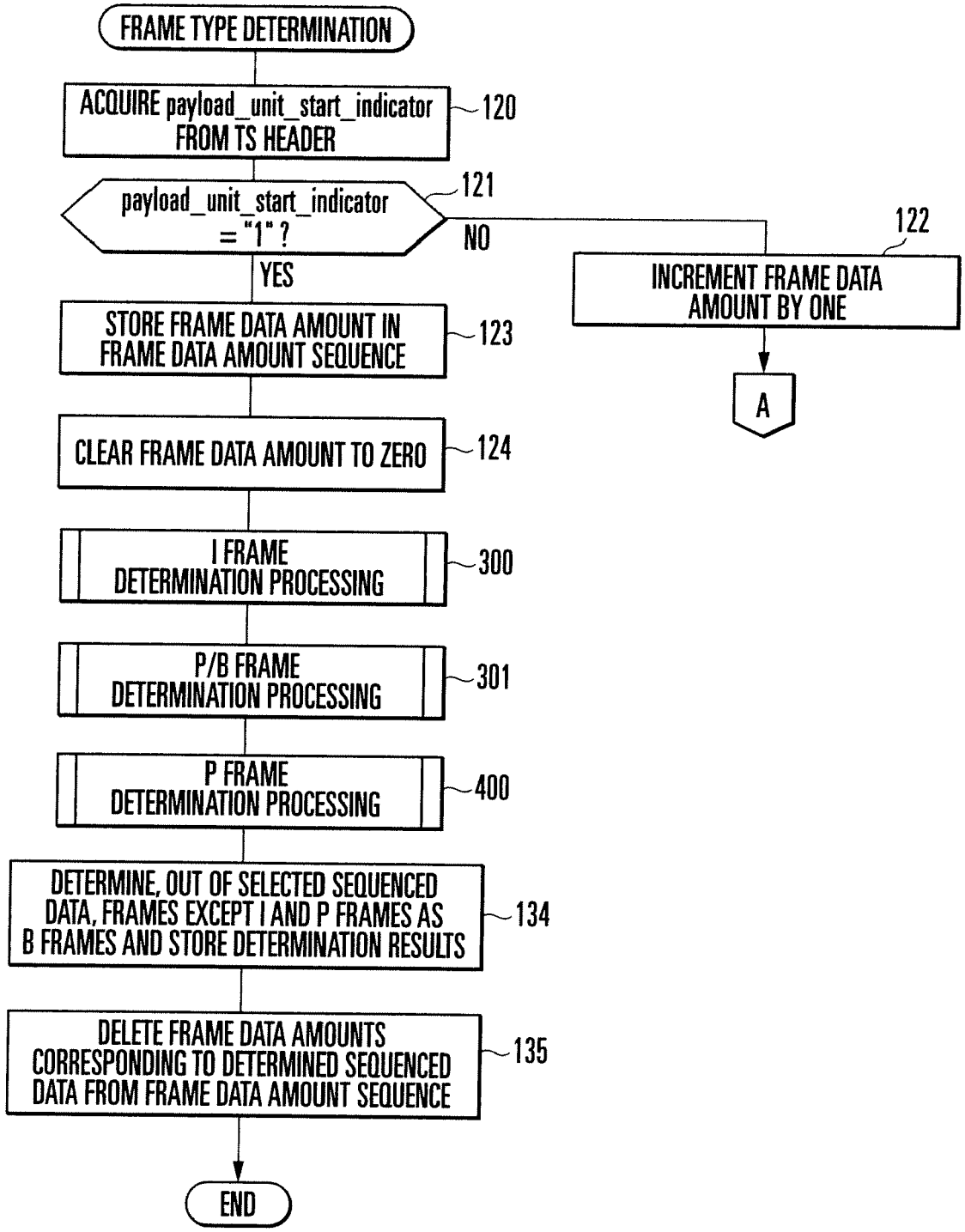
FIG. 24 is a flowchart illustrating frame type determination processing of a video quality estimation apparatus according to the fifth embodiment of the present invention.

In the frame type determination processing in step 102 of FIG. 4, the frame type determination unit 15B of the arithmetic processing unit 15 executes the frame type determination processing in FIG. 24.

The frame type determination unit 15B reads out a TS packet acquired by a TS packet acquisition unit 15A from a storage unit 14, and acquires payload_unit_start_indicator information from the TS header portion (step 120).

If the payload_unit_start_indicator information is not "1" (NO in step 121), the TS packet is not the TS packet at the start of the frame. The frame type determination unit 15B increments a frame data amount 14C in the storage unit 14 by one, thereby counting the number of TS packets of the frame (step 122). The process returns to step 110 in FIG. 5 to process the next TS packet.

If the payload_unit_start_indicator information is "1" (YES in step 121), the frame type determination unit 15B stores the frame data amount 14C in the storage unit 14 as new sequenced data at the end of a frame data amount sequence 14D (step 123), and clears the frame data amount 14C to zero (step 124).

The frame type determination unit 15B executes I frame determination processing in FIG. 14 using a determination period given as a coefficient (step 300), and then executes P/B frame determination processing in FIG. 15 described above using an adjustment coefficient as a coefficient (step 301). After that, the frame type determination unit 15B executes P frame determination processing in FIG. 21 using adjustment coefficients A and B and a lower limit frame count as coefficients (step 400).

With these processes, a frame type determination result representing one of I, P, and B frames is stored in a determination result sequence 14F in the storage unit 14 in correspondence with each of frames up to the next I frame in the frame data amount sequence 14D.

After thus determining I, P, and B frames, the frame type determination unit 15B deletes the frame data amounts corresponding to the determined frames from the frame data amount sequence 14D in the storage unit 14 (step 135), and ends the series of frame type determination processes.

[Effects of Fifth Embodiment]

As described above, in the frame type determination processing of the frame type determination unit 15B of the arithmetic processing unit 15 of this embodiment, an I frame in an elementary stream is determined. Then, the frame data amount of each frame is compared with a threshold value, thereby distinguishing between P and B frames. Finally, all of a predetermined number or more of continuous frames in which the frame at the start position has a frame data amount equal to or larger than a predetermined threshold value, and the frame data amounts of all frames from the start position to the end position fall within a predetermined determination range are determined as P frames. This makes it possible to grasp the frame type of each frame based on TS packets having encrypted payload portions even when no specific frame pattern exists as the GOP structure of the elementary stream.

In this embodiment, when determining P and B frames, P and B frames are determined based on a result of comparison between a threshold value calculated based on the average value of the frame data amounts of a plurality of frames within a predetermined range and the frame data amount of each frame in an appearance pattern, i.e., the large/small relationship between them. It is therefore possible to determine a frame type by very simple arithmetic processing.

Additionally, when P frames continue in a predetermined number or more, the information amount of each P frame becomes as small as a B frame. Hence, it may be impossible to correctly determine them by the P/B frame determination processing. In this embodiment, placing focus on the small variations between the frame data amounts of such continuous P frames, frames which continue in a predetermined number or more and have frame data amounts within a predetermined determination range are determined as P frames. It is therefore possible to correctly determine P frames.

In this embodiment, a threshold value calculated based on the average value of the frame data amounts of all frames as the target of the frame type determination processing is compared with the frame data amounts of all target frames sequentially from the start frame. It is determined based on the comparison result whether to select a frame as the start frame of the search range. It is therefore possible to select the start frame of the search range by very simple arithmetic processing.

In this embodiment, the determination range is calculated based on the average value of the frame data amounts of frames from the start position to the end position of the search range. It is therefore possible to correctly determine continuous P frames by very simple arithmetic processing. ps [Sixth Embodiment]

A video quality estimation apparatus according to the sixth embodiment of the present invention will be described next with reference to FIG. 25. The same step numbers as in FIG. 13 described above denote the same or similar processes in FIG. 25.

In the third embodiment, a case has been described in which for each frame divided into a plurality of TS packets and stored, a frame break is determined based on payload_unit_start_indicator information stored in the TS header portion of a TS packet, a frame data amount is obtained at each frame break, and a frame having the maximum frame data amount in the maximum GOP length is determined as an I frame, as shown in FIG. 13. As frame identification information similar to payload_unit_start_indicator (PUSI) information, marker-bit (MB) information in the RTP header as shown in FIG. 6 is also usable.

Some CODECs used in real-time applications can use RAI (random access indicator) information or ESPI (elementary_stream_priority_indicator) information in the adaptation field portion of the TS header portion as identification information representing the start of an I frame. In the sixth embodiment, a case will be described in which an I frame is determined using RAI information or ESPI information, based on the third embodiment.

The arrangement of the video quality estimation apparatus of the sixth embodiment is the same as in the first embodiment (FIG. 1) except the contents of processing by a frame type determination unit 15B of an arithmetic processing unit 15, and a detailed description thereof will not be repeated here.

[Frame Type Determination Processing]

Frame type determination processing of the video quality estimation apparatus according to the sixth embodiment of the present invention will be described next with reference to FIG. 25.

Figure 25:
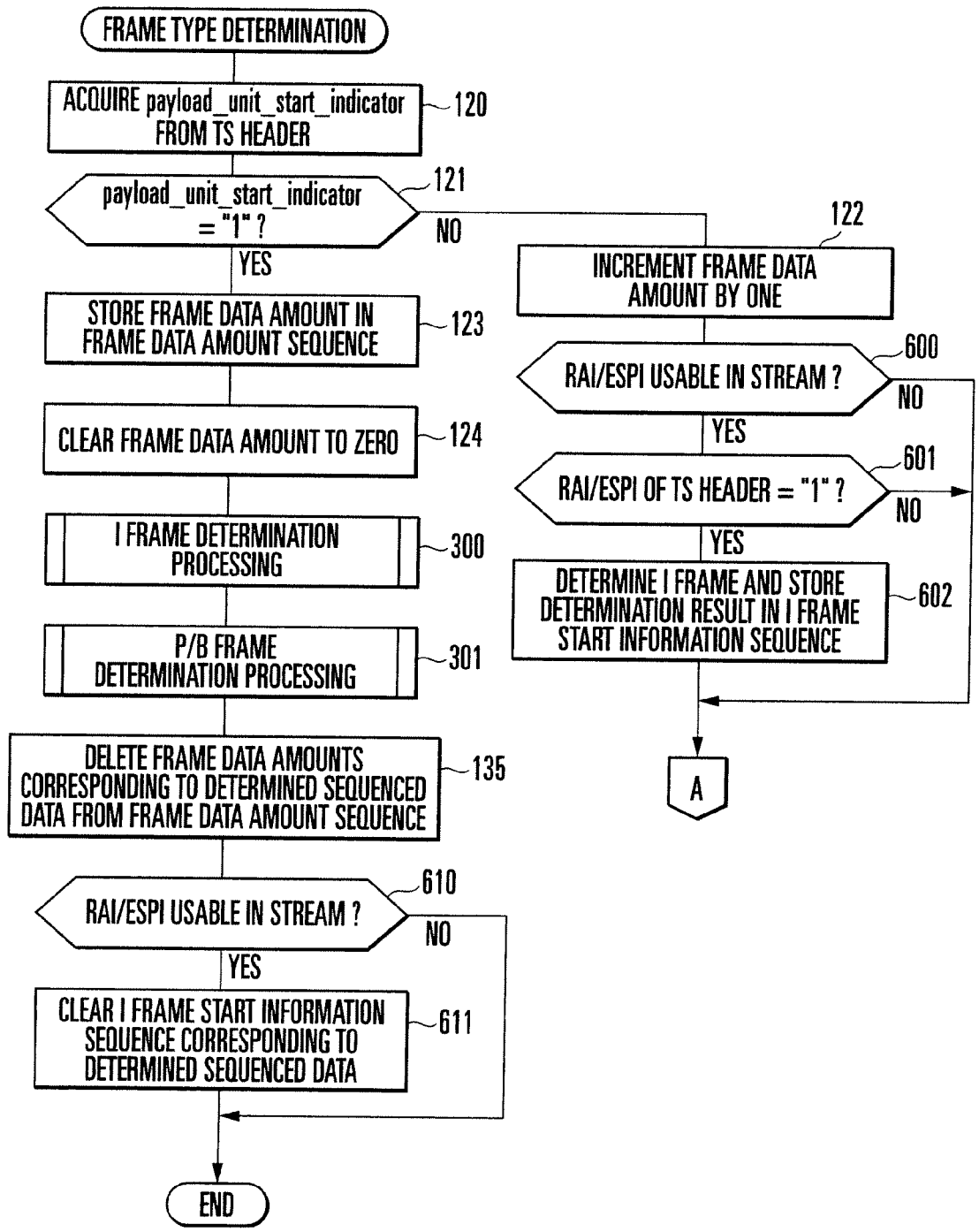
FIG. 25 is a flowchart illustrating frame type determination processing of a video quality estimation apparatus according to the sixth embodiment of the present invention.

In the frame type determination processing in step 102 of FIG. 4, the frame type determination unit 15B of the arithmetic processing unit 15 executes the frame type determination processing in FIG. 25.

The frame type determination unit 15B reads out a TS packet acquired by a TS packet acquisition unit 15A from a storage unit 14, and acquires payload_unit_start_indicator information from the TS header portion (step 120).

If the payload_unit_start_indicator information is not "1" (NO in step 121), the TS packet is not the TS packet at the start of the frame. The frame type determination unit 15B increments a frame data amount 14C in the storage unit 14 by one, thereby counting the number of TS packets of the frame (step 122).

After that, the frame type determination unit 15B determines based on the setting information in the storage unit 14 whether the above-described RAI information or ESPI information is usable in the CODEC of the stream (step 600). If RAI/ESPI information is not usable (NO in step 600), the process returns to step 110 in FIG. 5 to process the next TS packet.

If RAI/ESPI information is usable in the CODEC of the stream (YES in step 600), the frame type determination unit 15B acquires the RAI/ESPI information from the TS header portion. If the RAI/ESPI information is not "1" (NO in step 601), it is confirmed that the frame of the TS packet is not an I frame. Hence, the process returns to step 110 in FIG. 5 to process the next TS packet.

If the RAI/ESPI information is "1" (YES in step 601), it is confirmed that the frame of the TS packet is an I frame. Hence, the frame type determination unit 15B stores the frame type determination result, i.e., a value "I" representing an I frame as new sequenced data at the end of an I frame start information sequence in the storage unit 14 (step 602). The I frame start information sequence represents whether a frame is an I frame at each frame break identified by the payload_unit_start_indicator information, like a determination sequence 14E. Then, the process returns to step 110 in FIG. 5 to process the next TS packet.

If the payload_unit_start_indicator information is "1" in step 121 (YES in step 121), the frame type determination unit 15B stores the frame data amount 14C in the storage unit 14 as new sequenced data at the end of a frame data amount sequence 14D (step 123), and clears the frame data amount 14C to zero (step 124).

The frame type determination unit 15B executes I frame determination processing in FIG. 26 (to be described later) using a determination period given as a coefficient (step 300), and then executes P/B frame determination processing in FIG. 15 (to be described later) using an adjustment coefficient as a coefficient (step 301).

With these processes, a frame type determination result representing one of I, P, and B frames is stored in a determination result sequence 14F in the storage unit 14 in correspondence with each of frames up to the next I frame in the frame data amount sequence 14D.

The frame type determination unit 15B deletes the frame data amounts corresponding to the frames whose frame types are determined from the frame data amount sequence 14D in the storage unit 14 (step 135).

After that, the frame type determination unit 15B determines whether RAI/ESPI information is usable in the CODEC of the stream (step 610), as in step 600. Only when RAI/ESPI information is usable (YES in step 610), the frame type determination unit 15B clears the I frame start information sequence in the storage unit 14 (step 611), and ends the series of frame type determination processes.

[I Frame Determination Processing]

I frame determination processing of the video quality estimation apparatus according to the sixth embodiment of the present invention will be described next with reference to FIG. 26.

Figure 26:
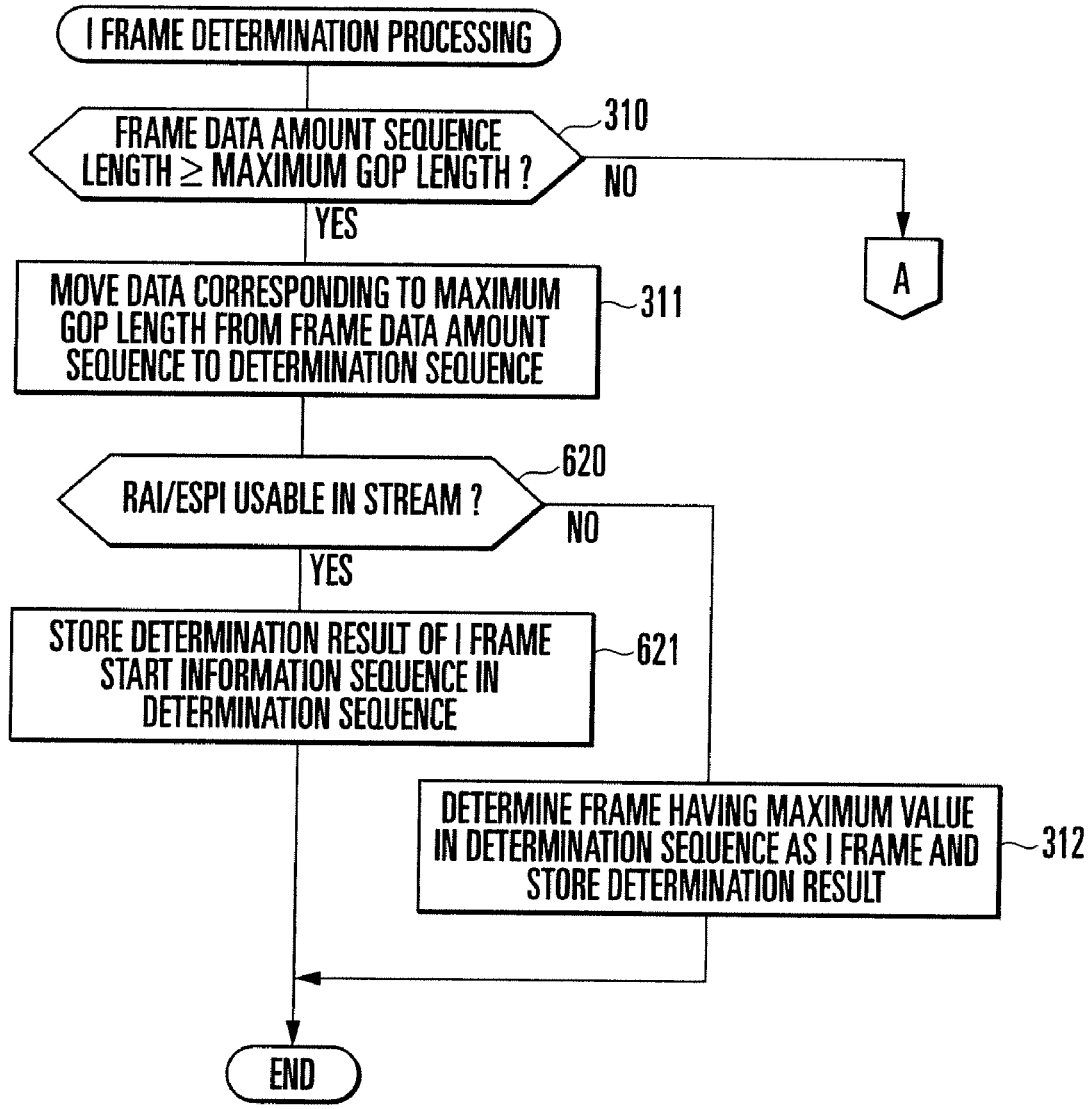
FIG. 26 is a flowchart illustrating I frame determination processing of the video quality estimation apparatus according to the sixth embodiment of the present invention.

In the I frame determination processing in step 300 of FIG. 13, the frame type determination unit 15B of the arithmetic processing unit 15 executes the I frame determination processing in FIG. 26.

The frame type determination unit 15B compares the sequence length, i.e., the number of data of the frame data amount sequence 14D in the storage unit 14 with a determination period given as a coefficient, i.e., the maximum GOP length in this case (step 310).

If the sequence length is shorter than the maximum GOP length (NO in step 310), the frame type determination unit 15B returns to step 110 in FIG. 5 to process the next TS packet.

If the sequence length is equal to or longer than the maximum GOP length (YES in step 310), the frame type determination unit 15B moves data F1 to F17 corresponding to the maximum GOP length from the frame data amount sequence 14D in the storage unit 14 to a determination sequence 14E, as shown in FIG. 8A described above (step 311).

The frame type determination unit 15B determines whether RAI/ESPI information is usable in the CODEC of the stream (step 620), as in step 600. If RAI/ESPI information is usable (YES in step 620), the frame type determination unit 15B stores, in the determination result sequence 14F in the storage unit 14, the I frame determination result stored in the I frame start information sequence in the storage unit 14 (step 621), and ends the series of I frame determination processes.

If RAI/ESPI information is not usable (NO in step 620), the frame type determination unit 15B determines a frame corresponding to data F15 having the maximum frame data amount in the determination sequence 14E as an I frame, stores the determination result in the determination result sequence 14F in the storage unit 14 (step 312), as shown in FIG. 8B described above, and ends the series of I frame determination processes.

[Effects of Sixth Embodiment]

As described above, in the frame type determination processing of the frame type determination unit 15B of the arithmetic processing unit 15 of this embodiment, an I frame is determined based on RAI information or ESPI information in the adaptation field portion of the TS header portion. This allows to simplify the I frame determination processing and obtain high determination accuracy.

In this embodiment, an example has been described in which the usability of RAI/ESPI information is successively determined in steps 610 and 620 of FIG. 24 and step 630 of FIG. 25. When the video quality estimation apparatus according to this embodiment is used only in an environment where RAI/ESPI information is usable, the above-described determination processing and step 312 in FIG. 24 can be omitted.

In this embodiment, an example has been described in which the determination processing is applied to the frame type determination processing in FIG. 13 described in the third embodiment. The determination processing is also applicable to the fourth or fifth embodiment in the same way as described above, and the same functions and effects can be obtained.

For example, in the fourth embodiment, steps 600 to 602 in FIG. 25 are added after step 122 in FIG. 20 described above. Steps 610 and 611 in FIG. 25 are added after step 135 in FIG. 20. The I frame determination processing in FIG. 26 is executed as step 300 in FIG. 20. In the fifth embodiment, steps 600 to 602 in FIG. 25 are added after step 122 in FIG. 24 described above. Steps 610 and 611 in FIG. 25 are added after step 135 in FIG. 24. The I frame determination processing in FIG. 26 is executed as step 300 in FIG. 24.

[Seventh Embodiment]

A video quality estimation apparatus according to the seventh embodiment of the present invention will be described next.

In the third embodiment, a case has been described in which for each frame divided into a plurality of TS packets and stored, a frame break is determined based on frame break determination information such as payload_unit_start_indicator information representing a frame start position. In this case, if the IP packet storing the payload_unit_start_indicator information is lost, the frame start position, i.e., the frame break cannot be determined based on the payload_unit_start_indicator information.

Figure 27:
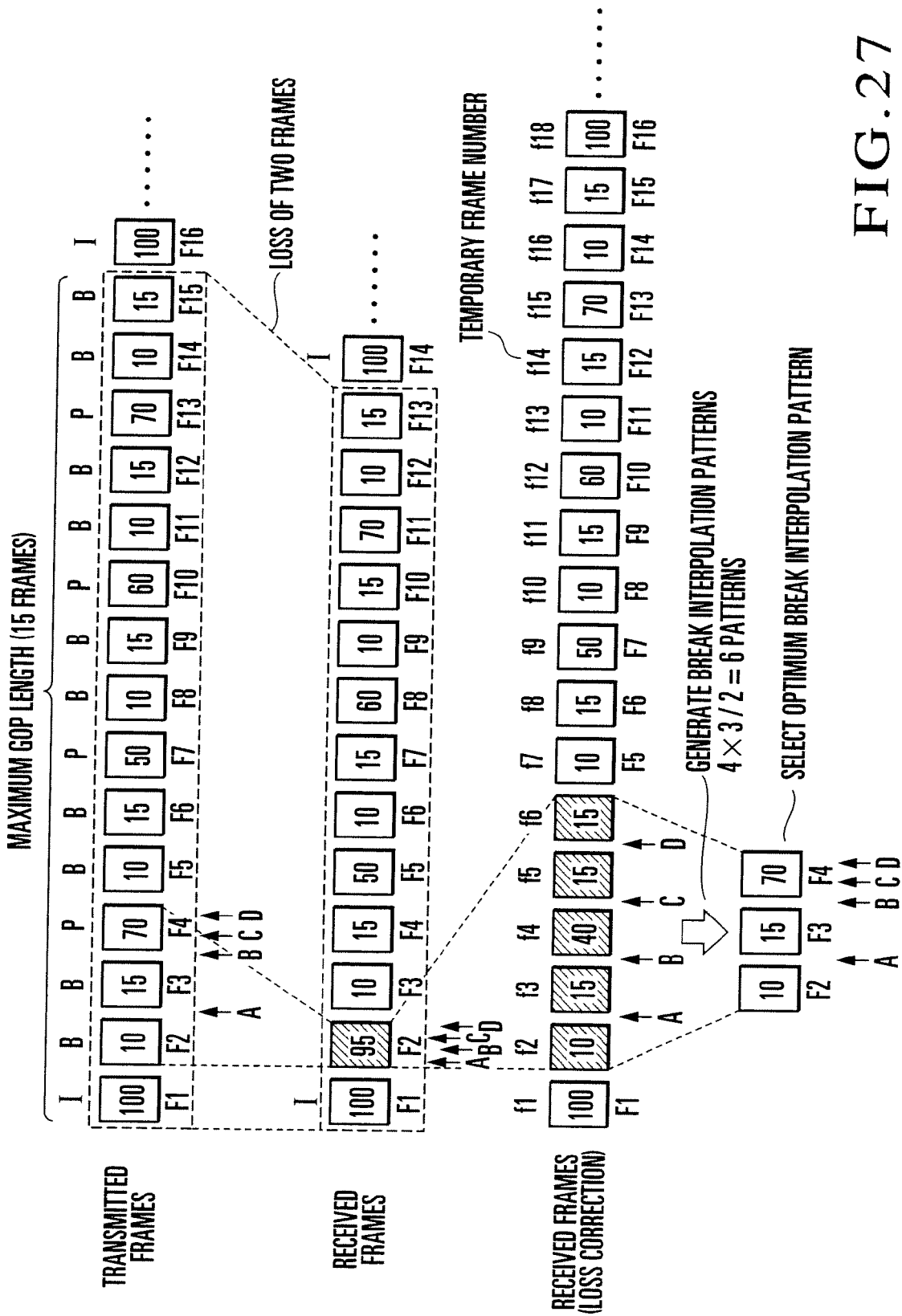
FIG. 27 is an explanatory view showing frame type determination processing of a video quality estimation apparatus according to the seventh embodiment of the present invention.

Referring to FIG. 27, the transmitting side divides a frame into a plurality of IP packets based on a predetermined GOP structure and sequentially transmits them. In this case, the typical GOP length is 15 frames. Frames F1 to F15 form one GOP structure. In these frames, a loss A occurs in the start packet of the frame F3. A loss B occurs in the start packet of the frame F4. Losses C and D occur in packets in the frame F4. That is, the four losses A, B, C, and D including two frame breaks have occurred.

The receiving side recognizes the transmitting-side frames F2 to F4 as one frame F2 because payload_unit_start_indicator information serving as frame break determination information is lost because of the losses A and B. This lowers the frame type determination accuracy.

In the example shown in FIG. 27, the packet losses A to D can be detected as TS packet losses based on the RTP sequence number (RTP-SEQ) and the TS header continuity indicator (CC: continuity_counter) described with reference to FIG. 6. Additionally, when the number of frames "13" received before a next I frame F16 is compared with the typical GOP length, i.e., 15 frames, the number of lost frames "2" can be confirmed. Since two of the four packet losses A to D include frame breaks, there are 4×3/2=6 patterns, i.e., break interpolation patterns that assume IP packet losses in which frame break determination information is lost.

In this embodiment, a case will be explained in which frame type determination processing is executed in a frame structure obtained by breaking frames by each break interpolation pattern, and a frame type determination result that matches a preset GOP structure is selected as a frame type determination result.

The arrangement of the video quality estimation apparatus of this embodiment is the same as in the first embodiment (FIG. 1) except the contents of processing by a frame type determination unit 15B of an arithmetic processing unit 15, and a detailed description thereof will not be repeated here.

[TS Packet Acquisition Processing]

TS packet acquisition processing of the video quality estimation apparatus according to the seventh embodiment of the present invention will be described first with reference to FIG. 28. The same step numbers as in FIG. 5 described above denote the same or similar processes in FIG. 28.

In the TS packet acquisition processing in step 101 of FIG. 4, a TS packet acquisition unit 15A of the arithmetic processing unit 15 confirms whether all TS packets stored in an IP packet output from a communication I/F unit 11 are extracted (step 700). If not all TS packets are extracted (NO in step 700), the process advances to step 110 to be described later.

If all TS packets are extracted (YES in step 700), the TS packet acquisition unit 15A receives a new IP packet output from the communication I/F unit 11 (step 701), and confirms whether the difference between the RTP sequence number (RTP-SEQ) of the new IP packet and the RTP sequence number of the immediately preceding IP packet is larger than 1 (step 702). RTP sequence numbers are serially added to IP packets in the transmission order. Hence, if the IP packets are normally received, the difference between the two RTP sequence numbers is 1. If the difference between the RTP sequence numbers is larger than 1, it can be confirmed that the immediately preceding IP packet is lost.

If the difference between the two RTP sequence numbers is larger than 1 (YES in step 702), the TS packet acquisition unit 15A stores "1" in a loss presence/absence flag in a storage unit 14 (step 703). If the difference between the RTP sequence numbers is not larger than 1 (NO in step 702), the TS packet acquisition unit 15A stores "0" in the loss presence/absence flag in the storage unit 14 (step 704).

The loss presence/absence flag is information representing whether an IP packet loss has occurred immediately before the IP packet of the current TS packet acquisition target. The value "1" represents the presence of a packet loss. The value "0" represents the absence of a packet loss. In the process example shown in FIG. 28, the value of the loss presence/absence flag is updated every time a new IP packet is acquired.

After that, the TS packet acquisition unit 15A extracts a new TS packet from the IP packet (step 110), and acquires a PID from the TS header portion of the TS packet (step 111).

The TS packet acquisition unit 15A compares the acquired PID with the process target PID in the storage unit 14 (step 112). If the PIDs do not match (NO in step 112), the process returns to step 700 to process the next TS packet.

If the PIDs match (YES in step 112), the TS packet acquisition unit 15A temporarily stores the TS packet in the storage unit 14 as a process target TS packet (step 113), and ends the series of TS packet acquisition processes.

[Frame Type Determination Processing]

Frame type determination processing of the video quality estimation apparatus according to the seventh embodiment of the present invention will be described next with reference to FIGS. 29 and 30. The same step numbers as in FIG. 25 described above denote the same or similar processes in FIG. 29.

Figure 29:
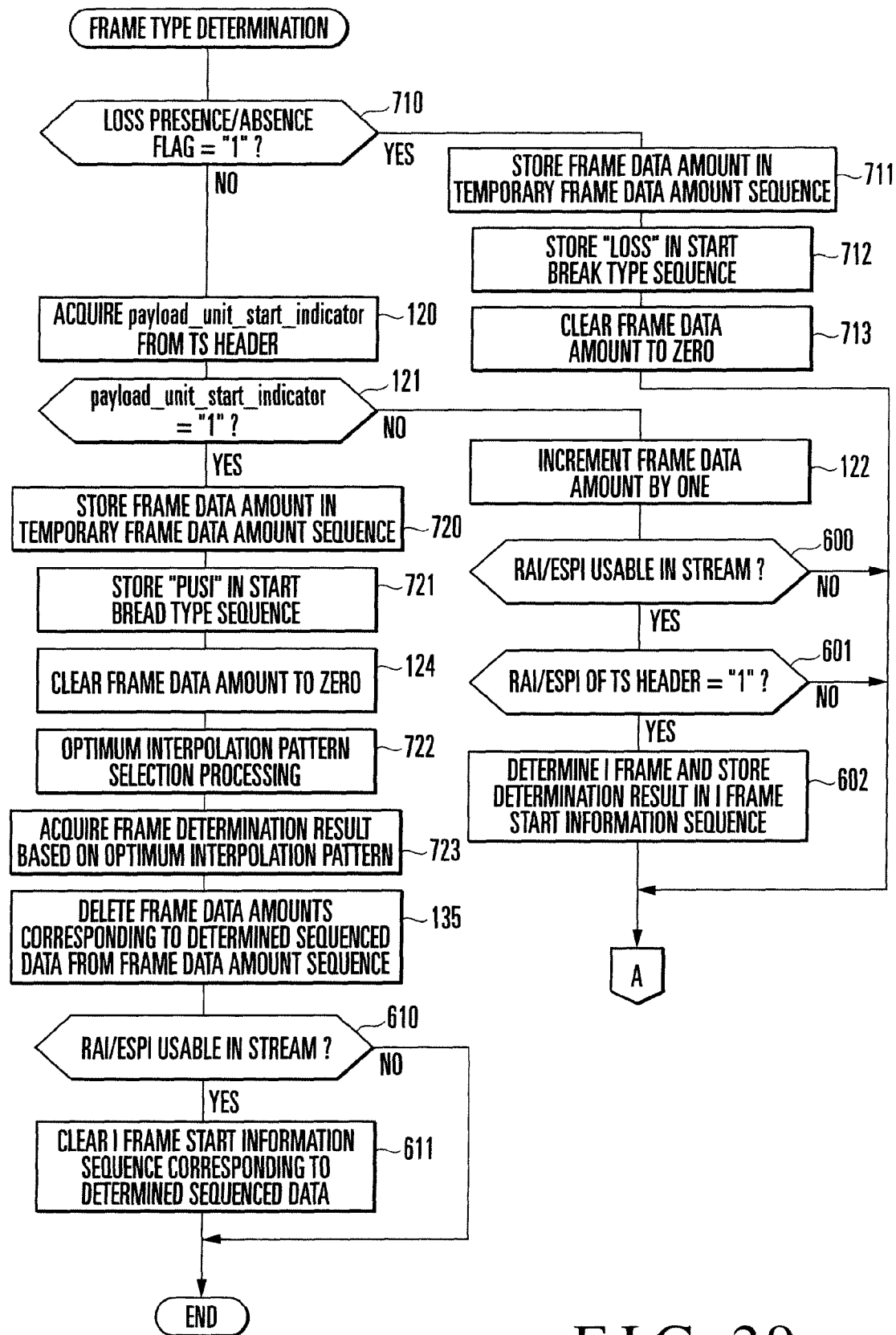
FIG. 29 is a flowchart illustrating the frame type determination processing of the video quality estimation apparatus according to the seventh embodiment of the present invention.

In the frame type determination processing in step 102 of FIG. 4, the frame type determination unit 15B of the arithmetic processing unit 15 executes the frame type determination processing in FIG. 29.

Figure 28:
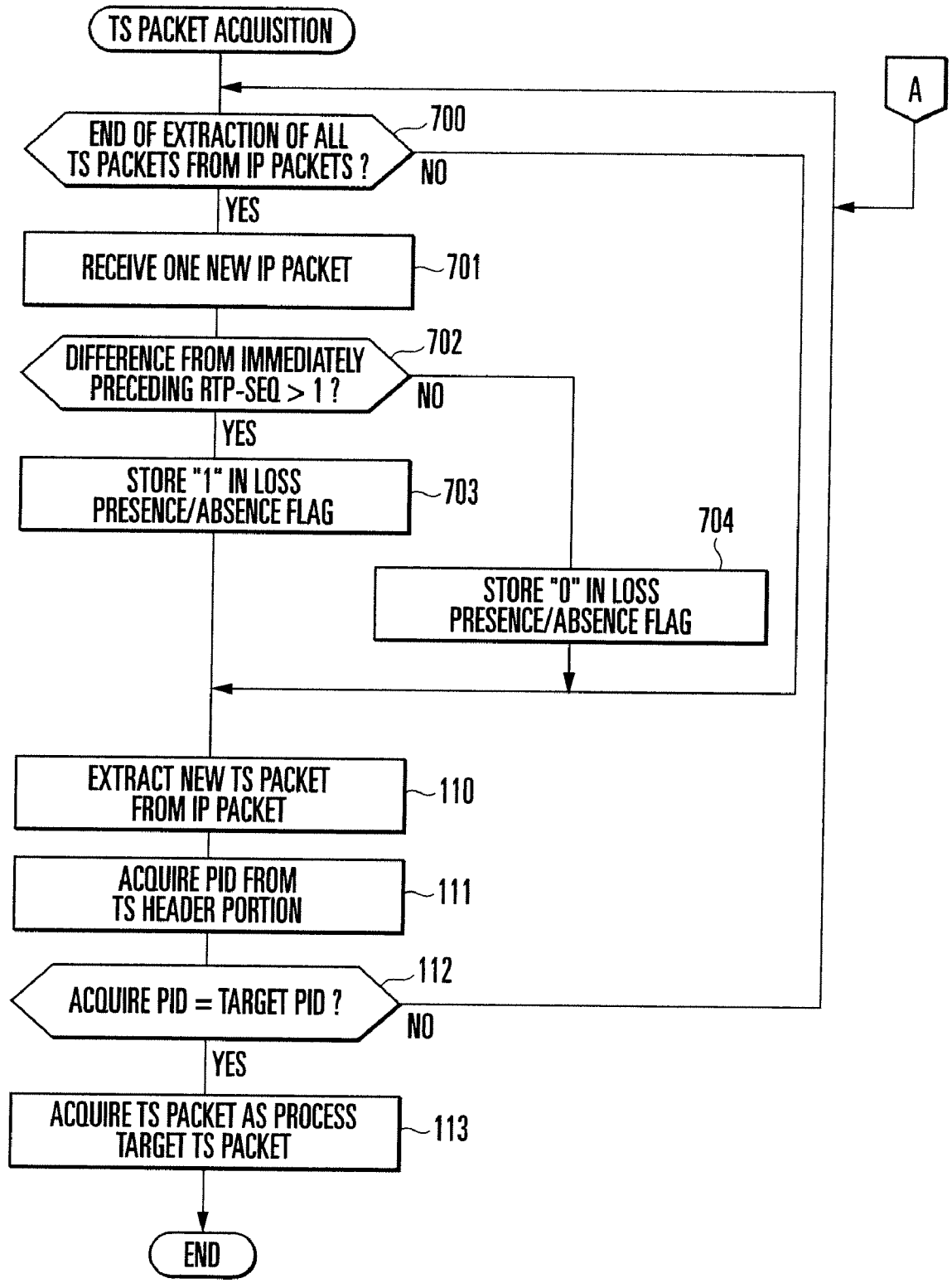
FIG. 28 is a flowchart illustrating TS packet acquisition processing of the video quality estimation apparatus according to the seventh embodiment of the present invention.

The frame type determination unit 15B reads out, from the storage unit 14, the loss presence/absence flag updated in the TS packet acquisition processing in FIG. 28 described above. If the value is "1" representing the presence of loss of the immediately preceding IP packet (YES in step 710), the frame type determination unit 15B stores a frame data amount 14C in the storage unit 14 as new sequenced data at the end of a temporary frame data amount sequence in the storage unit 14 (step 711), stores "loss" in a break type sequence in the storage unit 14 (step 712), clears the frame data amount 14C to zero (step 713), and returns to step 700 in FIG. 28 to process the next TS packet.

With these processes, a block of one or more TS packets continuously received up to the IP packet loss detected based on the loss presence/absence flag is identified as temporary frames. The frame data amounts of these frames are stored in the temporary frame data amount sequence. The break types are stored in the break type sequence.

Figure 30:
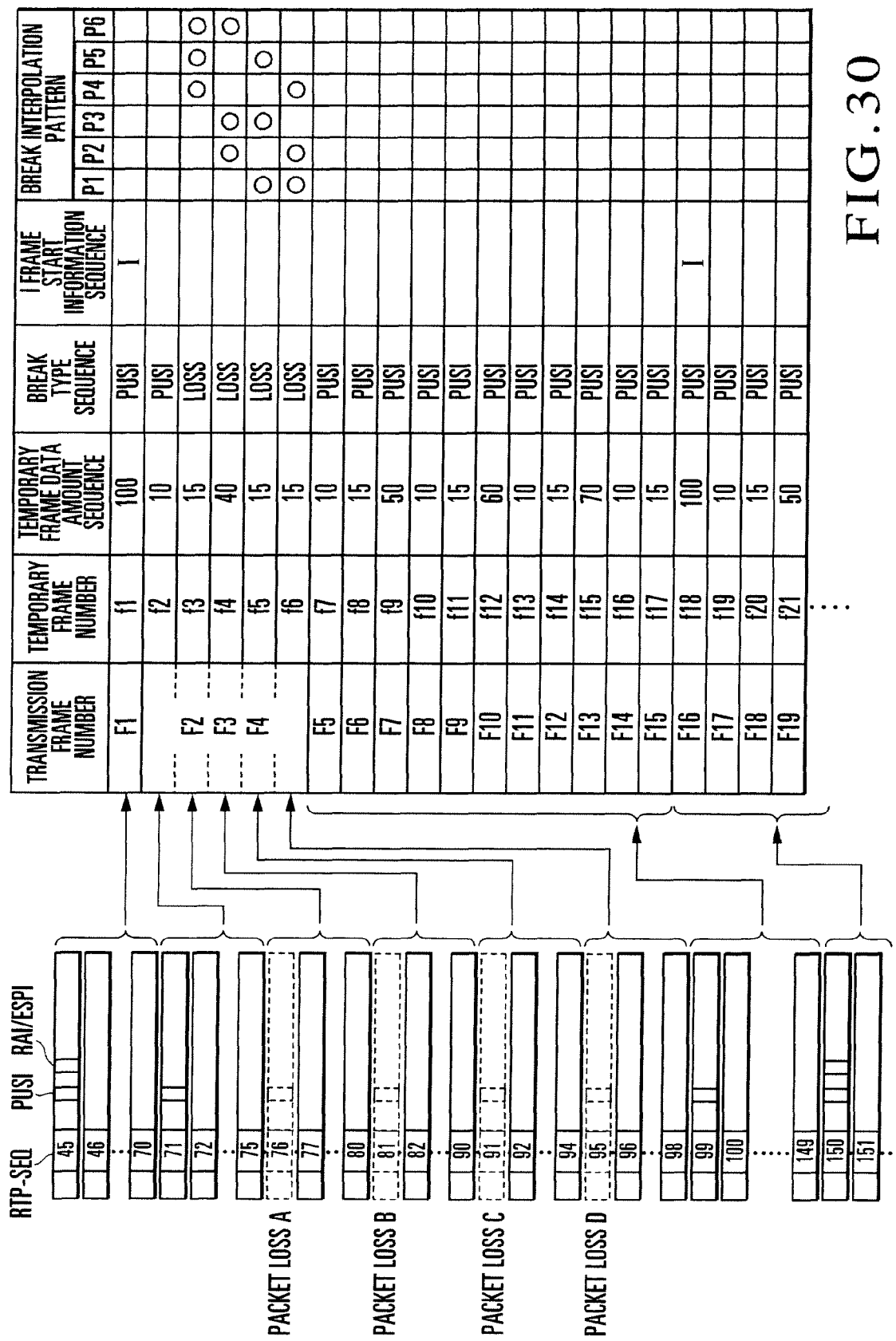
FIG. 30 is an explanatory view showing the frame type determination processing of the video quality estimation apparatus according to the seventh embodiment of the present invention.

The temporary frame data amount sequence is sequenced data representing the frame data amounts of temporary frames which include normal frames distinguished based on payload_unit_start_indicator information in the TS header portion (or markerbit (MB) information in the RTP header) and temporary frames distinguished at IP packet losses detected based on the loss presence/absence flag in one GOP structure, as shown in FIG. 30.

The break type sequence is sequenced data of type information representing the break types of the temporary frames, as shown in FIG. 30. If a temporary frame is a normal frame distinguished based on payload_unit_start_indicator information, the sequenced data has a value "PUSI". If the frame is distinguished based on an IP packet loss, the sequenced data has a value "loss". In the example shown in FIG. 30, packet losses have occurred in four IP packets having RTP sequence numbers "76", "81", "91", and "95". They correspond to the losses A, B, C, and D shown in FIG. 27. These packet losses are represented by the values "loss" corresponding to temporary frames f3, f4, f5, and f6 in the break type sequence.

If the value of the loss presence/absence flag is "0" representing the absence of loss of the immediately preceding IP packet in step 710 (NO in step 710), the frame type determination unit 15B reads out, from the storage unit 14, the TS packet acquired by the TS packet acquisition unit 15A, and acquires payload_unit_start_indicator information from the TS header portion (step 120).

If the payload_unit_start_indicator information is not "1" (NO in step 121), the TS packet is not the TS packet at the start of the frame. The frame type determination unit 15B increments the frame data amount 14C in the storage unit 14 by one, thereby counting the number of TS packets of the frame (step 122).

After that, the frame type determination unit 15B determines based on the setting information in the storage unit 14 whether the above-described RAI information or ESPI information is usable in the CODEC of the stream (step 600). If RAI/ESPI information is not usable (NO in step 600), the process returns to step 700 in FIG. 28 to process the next TS packet.

If RAI/ESPI information is usable in the CODEC of the stream (YES in step 600), the frame type determination unit 15B acquires the RAI/ESPI information from the TS header portion. If the RAI/ESPI information is not "1" (NO in step 601), it is confirmed that the frame of the TS packet is not an I frame. Hence, the process returns to step 700 in FIG. 28 to process the next TS packet.

If the RAI/ESPI information is "1" (YES in step 601), it is confirmed that the frame of the TS packet is an I frame. Hence, the frame type determination unit 15B stores the frame type determination result, i.e., a value "I" representing an I frame as new sequenced data at the end of an I frame start information sequence in the storage unit 14 (step 602). The I frame start information sequence represents whether a frame is an I frame at each frame break identified by the payload_unit_start_indicator information, like a determination sequence 14E. Then, the process returns to step 700 in FIG. 28 to process the next TS packet.

If the payload_unit_start_indicator information is "1" in step 121 (YES in step 121), the frame type determination unit 15B stores the frame data amount 14C in the storage unit 14 as new sequenced data at the end of the temporary frame data amount sequence in the storage unit 14 (step 720), stores "PUSI" in the break type sequence in the storage unit 14 (step 721), and clears the frame data amount 14C to zero (step 124).

With these processes, a normal frame detected based on payload_unit_start_indicator information is identified as a temporary frame. Its frame data amount is stored in the temporary frame data amount sequence. Its break type is stored in the break type sequence.

The frame type determination unit 15B executes optimum interpolation pattern selection processing in FIG. 31 (to be described later) (step 722), thereby creating break interpolation patterns that assume IP packet losses in which frame break determination information is lost. The frame type determination unit 15B selects an optimum interpolation pattern from the break interpolation patterns, and acquires a frame determination result based on the optimum interpolation pattern from the storage unit 14 (step 723).

The frame type determination unit 15B deletes the frame data amounts corresponding to the frames whose frame types are determined from a frame data amount sequence 14D in the storage unit 14 (step 135).

After that, the frame type determination unit 15B determines whether RAI/ESPI information is usable in the CODEC of the stream (step 610), as in step 600. Only when RAI/ESPI information is usable (YES in step 610), the frame type determination unit 15B clears the I frame start information sequence in the storage unit 14 (step 611), and ends the series of frame type determination processes.

[Optimum Interpolation Pattern Selection Processing]

Optimum interpolation pattern selection processing of the video quality estimation apparatus according to the seventh embodiment of the present invention will be described next with reference to FIG. 31.

Figure 31:
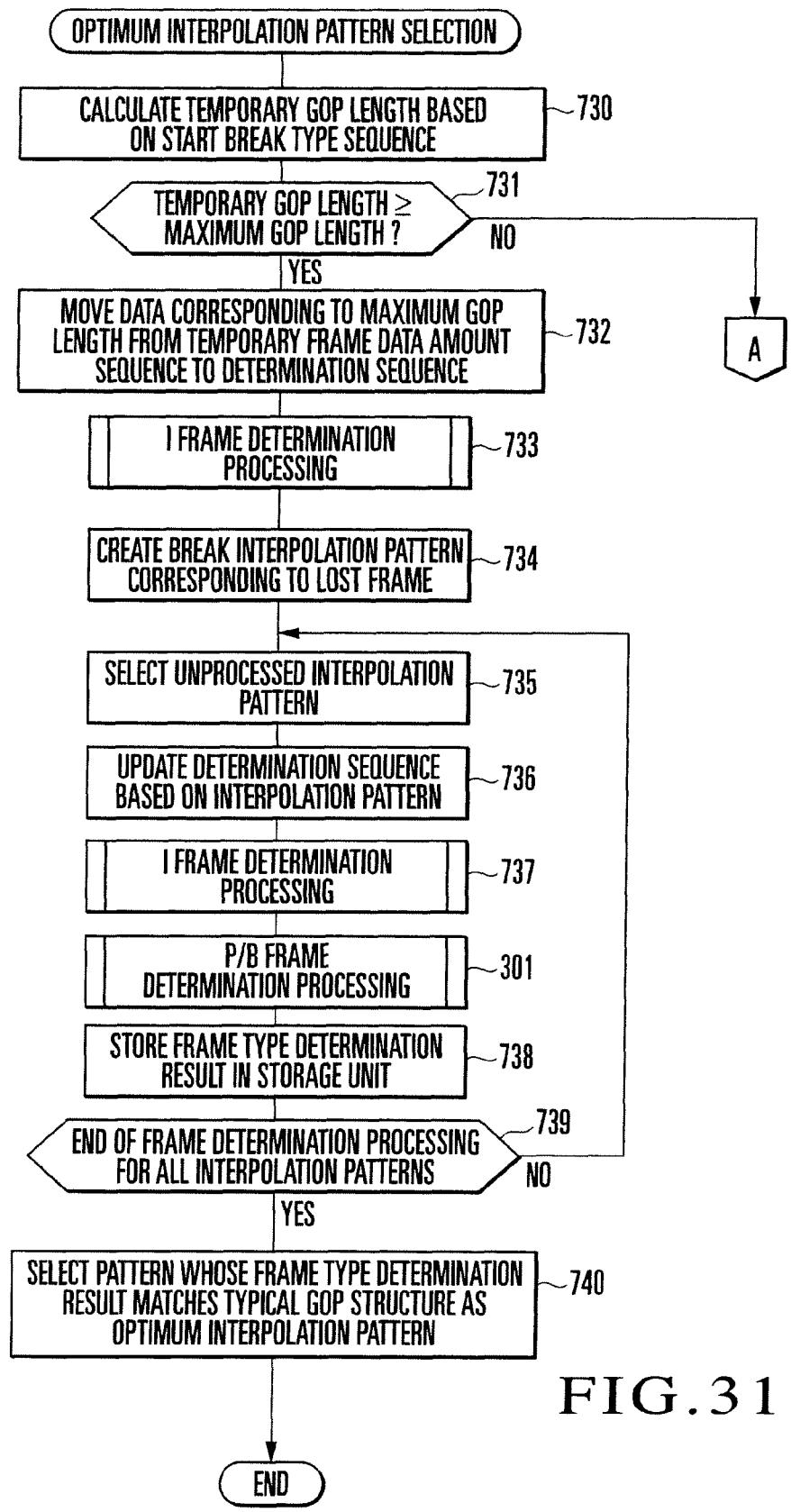
FIG. 31 is a flowchart illustrating optimum interpolation pattern selection processing of the video quality estimation apparatus according to the seventh embodiment of the present invention.

In the optimum interpolation pattern selection processing in step 722 of FIG. 29, the frame type determination unit 15B of the arithmetic processing unit 15 executes the optimum interpolation pattern selection processing in FIG. 31.

The frame type determination unit 15B refers to the break type sequence in the storage unit 14, and counts the number of normal break frames having the value "PUSI" in the temporary frames, thereby calculating the temporary GOP length (step 730). The frame type determination unit 15B compares the temporary GOP length with a determination period given as a coefficient, i.e., the maximum GOP length (17 frames) in this case (step 731).

If the temporary GOP length is shorter than the maximum GOP length (NO in step 731), the frame type determination unit 15B returns to step 700 in FIG. 28 to process the next TS packet.

If the temporary GOP length is equal to or longer than the maximum GOP length (YES in step 731), the frame type determination unit 15B moves sequenced data corresponding to the maximum GOP length from the temporary frame data amount sequence in the storage unit 14 to a determination sequence 14E (step 732).

In this case, the temporary frame data amount sequence also includes sequenced data concerning temporary frames having frame breaks based on IP packet losses. For this reason, it may be impossible to correctly select temporary frames corresponding to one GOP structure if sequenced data corresponding to the maximum GOP length from the start of the sequence are selected.

To select extra temporary frames, for example, the number of temporary frames each having the value "PUSI" in the temporary frame data amount sequence is counted. Then, sequenced data corresponding to the temporary frames from the start of the sequence to the maximum GOP length are selected.

In the example shown in FIG. 30, the maximum GOP length is defined as 17 frames, and the number of temporary frames each having the value "PUSI" in the temporary frame data amount sequence is counted. A temporary frame f21 corresponds to the 17th frame from the start f1. Hence, the temporary frames f1 to f12 are moved from the temporary frame data amount sequence to the determination sequence 14E.

The frame type determination unit 15B executes I frame determination processing based on the contents of the determination sequence 14E in the storage unit 14 (step 733). In the I frame determination processing, the frame type determination unit 15B executes only steps 620, 621, and 312 of the I frame determination processing in FIG. 26 described above.

With this process, an I frame located at the start of the next GOP structure is detected from the temporary frames in the determination sequence 14E. In the example shown in FIG. 30, the temporary frame f18 is determined as an I frame. A value "I" representing an I frame is stored as the sequenced data of the temporary frame f18 in I frame start information sequence in the storage unit 14.

The frame type determination unit 15B creates break interpolation patterns for the lost frames, i.e., temporary frames each having the value "loss" based on the break type sequence in the storage unit 14 (step 734).

More specifically, the frame type determination unit 15B refers to the I frame start information sequence in the storage unit 14, counts, as the GOP length, the number of temporary frames each having the value "PUSI" in the break type sequence in the storage unit 14 while regarding, as one GOP structure, the frames from the temporary frame f1 as an I frame to the temporary frame f18 immediately before the next I frame, and calculates the number of lost frames based on the difference between the GOP length and the typical GOP length preset in the storage unit 14.

The frame type determination unit 15B creates, as break interpolation patterns, all combinations of lost frame selections in the temporary frames each having the value "loss" in the break type sequence in the storage unit 14, and stores the break interpolation patterns in the storage unit 14.

In the example shown in FIG. 30, the GOP length is 13 frames. If the typical GOP length is 15 frames, the number of lost frames is 2. This indicates that payload_unit_start_indicator information is lost at the starts of two of the temporary frames f2 to f6 each having the value "loss". Hence, six break interpolation patterns P1 to P6 (4×3/2) are created.

After creating the break interpolation patterns in this way, the frame type determination unit 15B selects one unprocessed (undetermined) break interpolation pattern from the storage unit 14 (step 735), and updates the determination sequence 14E in the storage unit 14 based on the break interpolation pattern (step 736).

For example, if P1 in FIG. 30 is selected as the break interpolation pattern, the transmitting-side frame F2 is formed from the temporary frames f2, f3, and f4. The transmitting-side frame F3 is formed from the temporary frame f5. The transmitting-side frame F4 is formed from the temporary frame f6.

Hence, the sum of the frame data amounts of the temporary frames f2, f3, and f4 in the temporary frame data amount sequence in the storage unit 14 is stored as the frame data amount of the frame F2 in the determination sequence 14E. Similarly, the frame data amounts of the temporary frames f5 and f6 are stored as the frame data amounts of the frames F3 and F4 in the determination sequence 14E, respectively. The frame data amounts of the temporary frames f1, and f7 to f20 corresponding to the maximum GOP length are also stored as the frame data amounts of corresponding frames in the determination sequence 14E.

The frame type determination unit 15B executes the I frame determination processing based on the contents of the updated determination sequence 14E (step 737), performs P/B frame determination processing (step 301), reads out the obtained frame type determination results from the determination result sequence 14F in the storage unit 14, and stores them in the storage unit 14 in association with the break interpolation pattern (step 738). At this time, the frame type determination unit 15B executes the above-described I frame determination processing in FIG. 26 in step 737, and the above-described P/B frame determination processing in FIG. 15 in step 301.

After that, the frame type determination unit 15B confirms whether the frame type determination processing has ended for all break interpolation patterns (step 739). If an unprocessed break interpolation pattern remains (NO in step 739), the process returns to step 735 to execute frame type determination for the unprocessed break interpolation pattern.

If the frame type determination has ended for all break interpolation patterns (YES in step 739), the frame type determination unit 15B selects, as an optimum interpolation pattern, one of frame type determination results obtained for the respective break interpolation patterns, which matches a typical GOP structure preset in the storage unit 14, stores it in the storage unit 14 (step 740), and ends the series of optimum interpolation pattern selection processes.

An example of the typical GOP structure is a structure including 15 frames which correspond to the GOP length and whose frame types are "IBBPBBPBBPBBPBB". One or a plurality of GOP structures are preset in the storage unit 14. For the break interpolation pattern P6 in the example shown in FIG. 30, the transmitting-side frame F2 is formed from the temporary frame f2. The transmitting-side frame F3 is formed from the temporary frame f3. The transmitting-side frame F4 is formed from the temporary frames f4, f5, and f6. Since the frame data amounts of the frames F2, F3, and F4 are 10, 15, and 70, respectively, the frame type determination result matches the typical GOP structure.

[Effects of Seventh Embodiment]

As described above, in the frame type determination processing of the frame type determination unit 15B of the arithmetic processing unit 15 of this embodiment, packet losses that have occurred in the elementary stream are detected. A packet loss in which frame break determination information representing a frame start position is lost is assumed, and frame type determination is performed based on the frame start position obtained in accordance with the assumption result. This makes it possible to perform accurate frame type determination even when frame break determination information is lost due to an IP packet loss in the communication network.

Additionally, a plurality of break interpolation patterns that assume IP packet losses in which frame break determination information is lost are created. Frame type determination is performed for each break interpolation pattern based on the frame start position according to the break interpolation pattern. The frame type determination result for an optimum break interpolation pattern, which matches a typical GOP structure preset in the storage unit 14, is selected from obtained frame type determination results. This enables more accurate frame type determination.

In this embodiment, an example has been described in which the determination processing is applied to the frame type determination processing in FIG. 13 described in the sixth embodiment based on the third embodiment. The determination processing is also applicable to the sixth embodiment based on the fourth or fifth embodiment in the same way as described above, and the same functions and effects can be obtained.

For example, based on the fourth embodiment, steps 400 and 134 in FIG. 20 described above are executed in place of step 301 in FIG. 31 described above. Based on the fifth embodiment, steps 400 and 134 in FIG. 24 described above are executed immediately after step 301 in FIG. 31 described above.

[Examples of Frame Type Determination Processing]

Examples of frame type determination processing examples of the video quality estimation apparatus according to the seventh embodiment of the present invention will be described next.

The first example of frame type determination processing applied when identifying an I frame using I frame identification information such as RAI information or ESPI information stored in the adaptation field of a TS packet, as described in the sixth embodiment, will be explained below. Then, the second example of frame type determination processing applied when identifying an I frame without using the I frame identification information will be explained.

[First Example of Frame Type Determination Processing]

The first example of frame type determination processing used when identifying an I frame based on I frame identification information such as RAI information or ESPI information described in the sixth embodiment will be described first with reference to FIGS. 32, 33A, 33B, 34A, 34B, and 35.

In this case, each frame in a stream is identified based on frame identification information (PUSI/MB) such as payload_unit_start_indicator (PUSI) information in the TS header portion or markerbit (MB) information in the RTP header. An I frame is identified based on I frame identification information (RAI/ESPI) in the adaptation field of the TS packet. Note that the frame type appearance pattern in a GOP includes a typical appearance pattern such as "IBBPBB" which repeatedly appears.

A case without a packet loss will be described with reference to FIG. 32.

Figure 32:
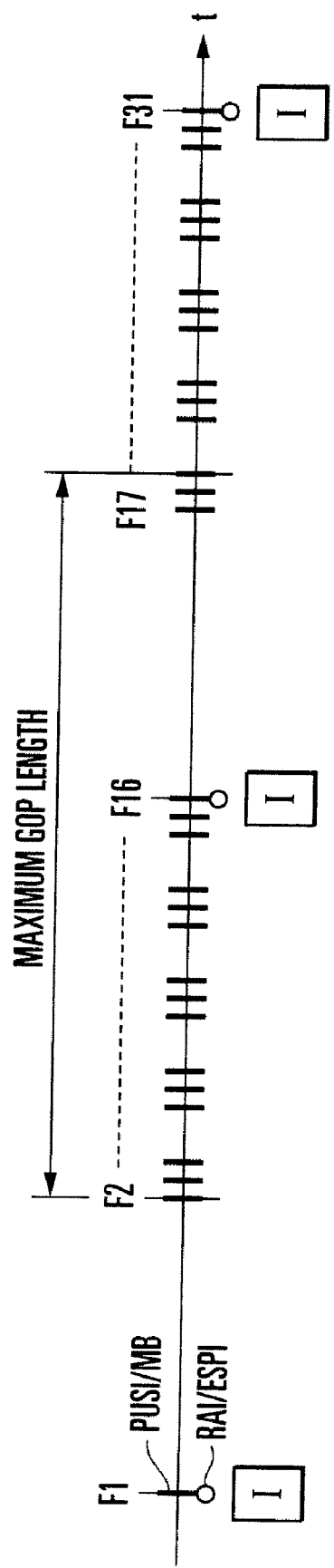
FIG. 32 is an explanatory view showing an example of the frame type determination processing (without loss) of the video quality estimation apparatus according to the seventh embodiment of the present invention.

As shown in FIG. 32, without a packet loss, the frame F1 is recognized as an I frame based on I frame identification information, and then, I frame identification information is detected in the subsequent maximum GOP length (e.g., 17 frames). Hence, the frame F16 in which I frame identification information is detected can be recognized as an I frame.

Cases in which a packet loss has occurred at the start of an I frame will be described with reference to FIGS. 33A and 33B.

Figure 33A:
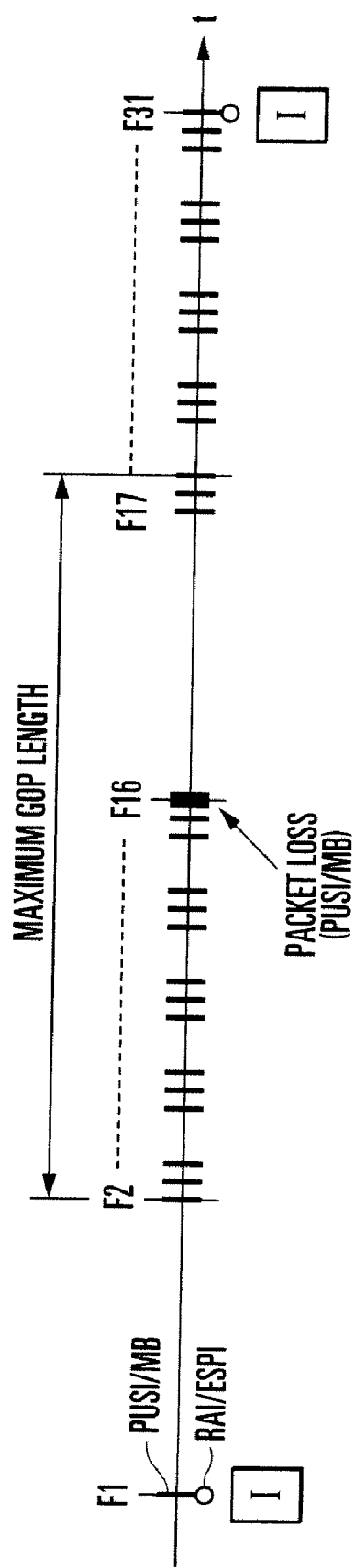
FIG. 33A is an explanatory view showing an example of the frame type determination processing (only a packet is lost at the start of an I frame) of the video quality estimation apparatus according to the seventh embodiment of the present invention.

As shown in FIG. 33A, when only the start IP packet of the I frame F16 is lost, the frame F1 is recognized as an I frame based on I frame identification information, and then, no I frame identification information is detected in the subsequent maximum GOP length. Hence, it can be recognized that the lost IP packet includes I frame identification information and frame identification information.

The recognition in FIG. 33A is applicable not only to the case in which only the start IP packet of an I frame is lost but also to a case in which only a total of two continuous IP packets, i.e., the start IP packet of an I frame and the next IP packet following it are lost.

Figure 33B:
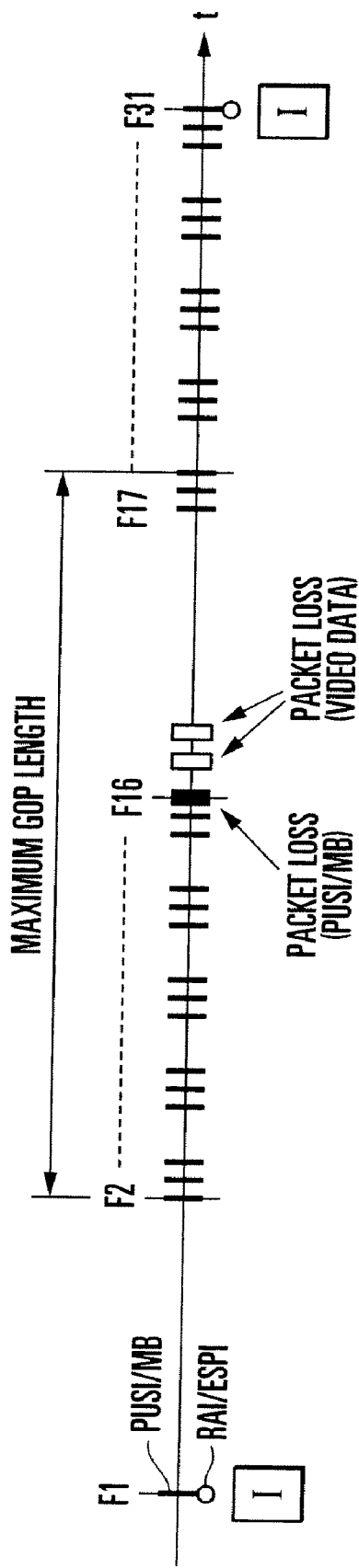
FIG. 33B is an explanatory view showing an example of the frame type determination processing (a plurality of packets are lost from the start of an I frame) of the video quality estimation apparatus according to the seventh embodiment of the present invention.

As shown in FIG. 33B, when only a total of three or more continues IP packets including the start IP packet of the I frame F16 and a plurality of succeeding IP packets (video data) following the start IP packet are lost, the frame F1 is recognized as an I frame based on I frame identification information, and then, no I frame identification information is detected in the subsequent maximum GOP length. Hence, it can be recognized that one of the lost IP packets includes I frame identification information and frame identification information.

Regarding that each lost IP packet includes frame identification information (PUSI/MB), frame type determination is performed. If the determination result matches the appearance pattern "IBBPBB", it can be recognized that the start IP packet of these IP packets includes I frame identification information (RAI/ESPI). Note that this frame type determination is done in a round-robin fashion for combinations that satisfy a condition "typical GOP length in IBBPBB structure=number of frame identification information+number of lost IP packets regarded to include frame identification information". If a plurality of combinations satisfy the condition, the determination result of a combination which minimizes the variations between the frame data amounts of each frame type (P, B) is selected.

Cases will be described with reference to FIGS. 34A and 34B, in which a packet loss has occurred not at the start of an I frame but at the start of a P or B frame.

Figure 34A:
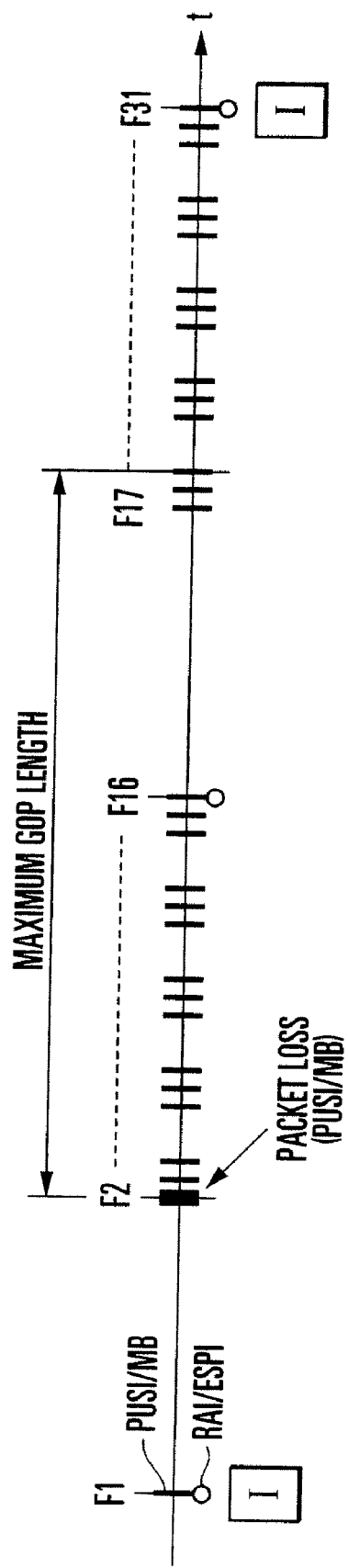
FIG. 34A is an explanatory view showing an example of the frame type determination processing (only a packet is lost at the start of a B or P frame) of the video quality estimation apparatus according to the seventh embodiment of the present invention.

As shown in FIG. 34A, when the start IP packet of the I frame F16 is not lost, but only the start IP packet of the B frame F2 is lost, the frame F1 is recognized as an I frame based on I frame identification information, and then, I frame identification information is detected in the subsequent maximum GOP length (e.g., 17 frames). Hence, the frame F16 in which I frame identification information is detected can be recognized as an I frame.

Regarding that each lost IP packet includes frame identification information (PUSI/MB), frame type determination is performed. If the determination result matches the appearance pattern "IBBPBB", it can be recognized that these IP packets include frame identification information (PUSI/MB).

The recognition in FIG. 34A is applicable not only to the case in which only the start IP packet of a B frame is lost but also to a case in which only the start IP packet of a P frame is lost. The recognition is also applicable to a case in which only a total of two continuous IP packets, i.e., the start IP packet of a B or P frame and the next IP packet following it are lost.

Figure 34B:
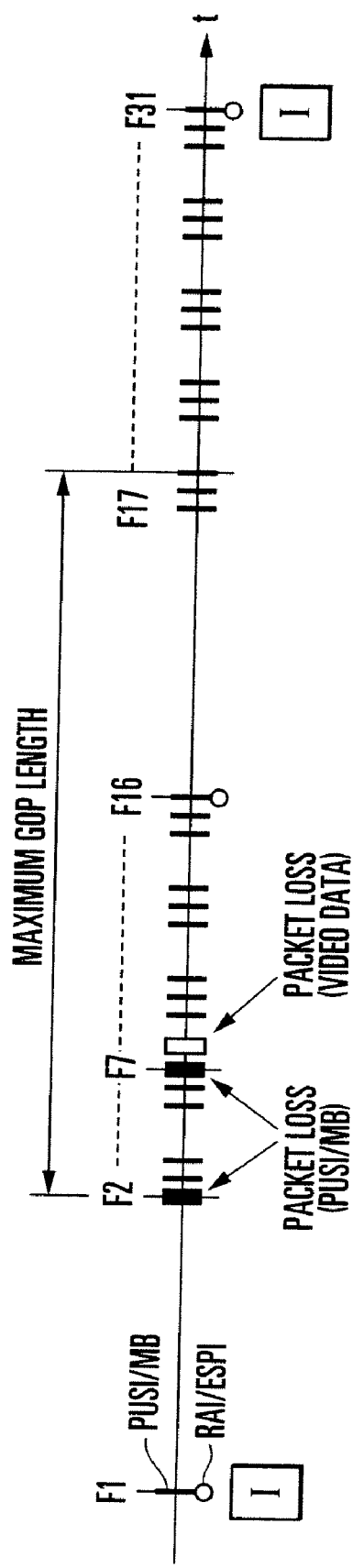
FIG. 34B is an explanatory view showing an example of the frame type determination processing (a plurality of packets are lost at the start of a B or P frame) of the video quality estimation apparatus according to the seventh embodiment of the present invention.

As shown in FIG. 34B, when the start IP packet of the I frame F16 is not lost, but a total of two or more IP packets including the start IP packet of the B frame F2 and the start IP packet of the P frame F7 are lost, the frame F1 is recognized as an I frame based on I frame identification information, and then, I frame identification information is detected in the subsequent maximum GOP length (e.g., 17 frames). Hence, the frame F16 in which I frame identification information is detected can be recognized as an I frame.

Regarding that each lost IP packet includes frame identification information (PUSI/MB), frame type determination is performed. If the determination result matches the appearance pattern "IBBPBB", it can be recognized that these IP packets include frame identification information (PUSI/MB). Note that this frame type determination is done in a round-robin fashion for combinations that satisfy a condition "typical GOP length in IBBPBB structure=number of frame identification information+number of lost IP packets regarded to include frame identification information". If a plurality of combinations satisfy the condition, the determination result of a combination which minimizes the variations between the frame data amounts of each frame type (P, B) is selected.

The recognition in FIG. 34B is applicable not only to the case in which the start IP packet of a B frame and the start IP packet of a P frame are lost but also to a case in which the start IP packets of two B frames are lost, or the start IP packets of two P frames are lost. The recognition is also applicable to a case in which one or more IP packets following the lost start IP packet of a B or P frame are lost.

A case will be described with reference to FIG. 35, in which packet losses have occurred at the start of an I frame and at the start of a P or B frame.

Figure 35:
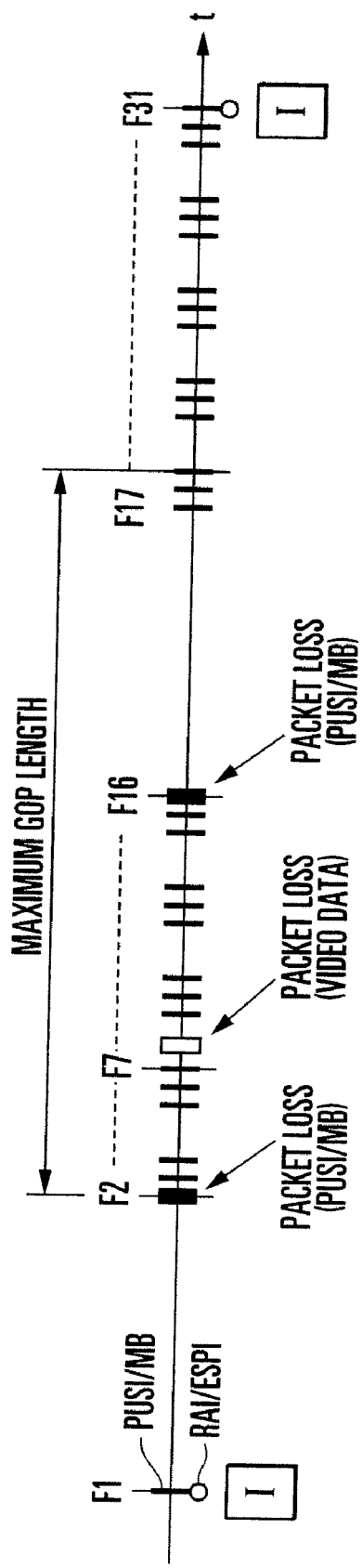
FIG. 35 is an explanatory view showing an example of the frame type determination processing (a plurality of packets are lost at the starts of I, B, and P frames) of the video quality estimation apparatus according to the seventh embodiment of the present invention.

As shown in FIG. 35, when the start IP packet of the B frame F2, an intermediate IP packet (video data) of the P frame F7, and the start IP packet of the I frame F16 are lost, the frame F1 is recognized as an I frame based on I frame identification information, and then, no I frame identification information is detected in the subsequent maximum GOP length. Hence, it can be recognized that one of the lost IP packets includes I frame identification information and frame identification information, and the remaining IP packets include frame identification information.

Regarding that each lost IP packet includes frame identification information (PUSI/MB), frame type determination is performed. If the determination result matches the appearance pattern "IBBPBB", it can be recognized that these IP packets include frame identification information. Note that this frame type determination is done in a round-robin fashion for combinations that satisfy a condition "typical GOP length in IBBPBB structure=number of frame identification information+number of lost IP packets regarded to include frame identification information". If a plurality of combinations satisfy the condition, the determination result of a combination which minimizes the variations between the frame data amounts of each frame type (P, B) is selected.

Note that it can be recognized that the lost IP packet at the position of the typical GOP length includes frame identification information (PUSI/MB) and I frame identification information (RAI/ESPI).

The recognition in FIG. 35 is also applicable to a case in which one or more IP packets following the lost start IP packet of an I, B, or P frame are lost.

[Second Example of Frame Type Determination Processing]

The second example of frame type determination processing used when identifying an I frame without using I frame identification information such as RAI information or ESPI information described in the sixth embodiment will be described next with reference to FIGS. 36A, 36B, 37A, 37B, and 38.

In this case, each frame in a stream is identified based on frame identification information (PUSI/MB) such as payload_unit_start_indicator (PUSI) information in the TS header portion or markerbit (MB) information in the RTP header. An I frame is identified based on the frame data amount. Note that the frame type appearance pattern in a GOP includes a typical appearance pattern such as "IBBPBB" which repeatedly appears.

Cases in which a packet loss has occurred at the start of an I frame will be described with reference to FIGS. 36A and 36B.

Figure 36A:
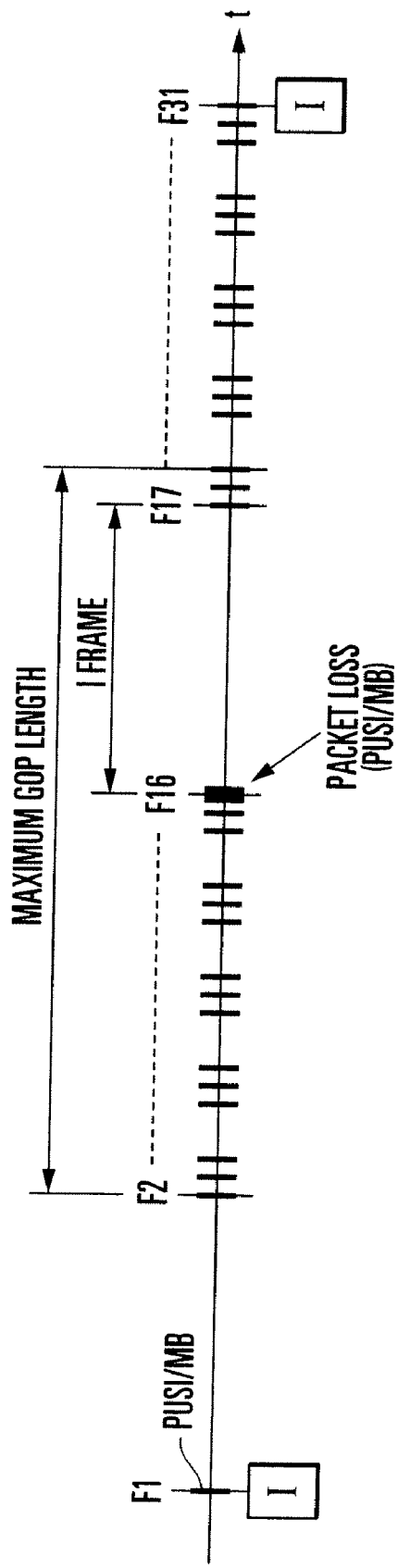
FIG. 36A is an explanatory view showing an example of frame type determination processing (only a packet is lost at the start of an I frame) of a video quality estimation apparatus according to the eighth embodiment of the present invention.

As shown in FIG. 36A, when only the start IP packet of the I frame F16 is lost, the frame F1 is recognized as an I frame, and then, the frame F16 having the maximum frame data amount in the subsequent maximum GOP length can be assumed as an I frame. Since the assumed I frame includes the IP packet loss, it is considered that the IP packet includes frame identification information (PUSI/MB).

Regarding that the lost IP packet includes frame identification information, frame type determination is performed. If the determination result matches the appearance pattern "IBBPBB", it can be recognized that the IP packet includes frame identification information.

The recognition in FIG. 36A is applicable not only to the case in which only the start IP packet of an I frame is lost but also to a case in which only a total of two continuous IP packets, i.e., the start IP packet of an I frame and the next IP packet following it are lost.

Figure 36B:
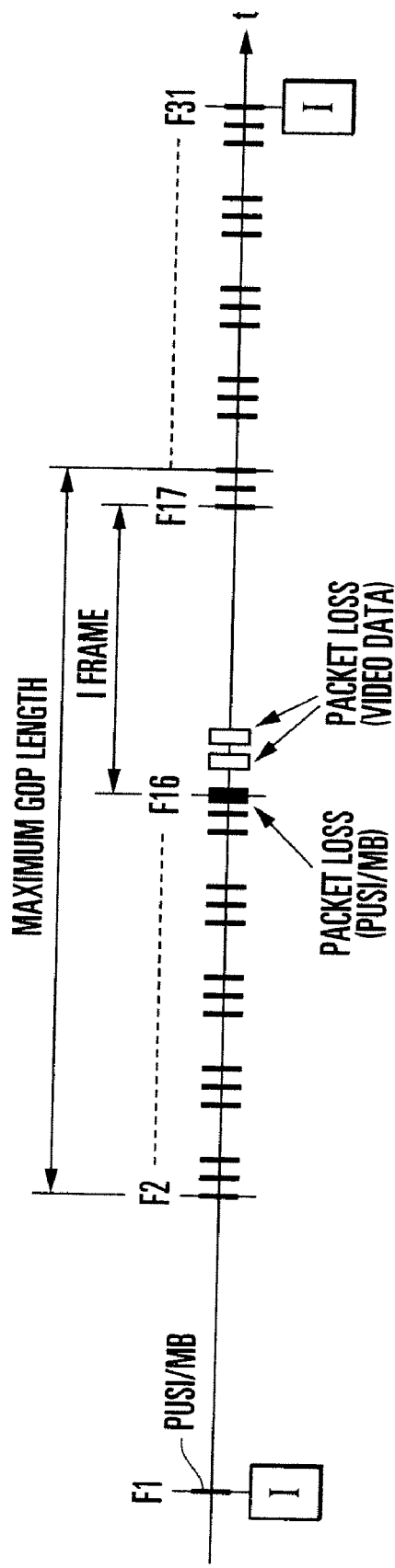
FIG. 36B is an explanatory view showing an example of the frame type determination processing (a plurality of packets are lost from the start of an I frame) of the video quality estimation apparatus according to the eighth embodiment of the present invention.

As shown in FIG. 36B, when only a total of three or more continues IP packets including the start IP packet of the I frame F16 and a plurality of succeeding IP packets (video data) following the start IP packet are lost, the frame F1 is recognized as an I frame, and then, the frame F16 having the maximum frame data amount in the subsequent maximum GOP length can be assumed as an I frame. Since the assumed I frame includes the IP packet loss, it is considered that the IP packet includes frame identification information (PUSI/MB).

Regarding that each lost IP packet includes frame identification information, frame type determination is performed. If the determination result matches the appearance pattern "IBBPBB", it can be recognized that each IP packet includes frame identification information. Note that this frame type determination is done in a round-robin fashion for combinations that satisfy a condition "typical GOP length in IBBPBB structure=number of frame identification information+number of lost IP packets regarded to include frame identification information". If a plurality of combinations satisfy the condition, the determination result of a combination which minimizes the variations between the frame data amounts of each frame type (P, B) is selected.

Cases will be described with reference to FIGS. 37A and 37B, in which a packet loss has occurred not at the start of an I frame but at the start of a P or B frame.

Figure 37A:
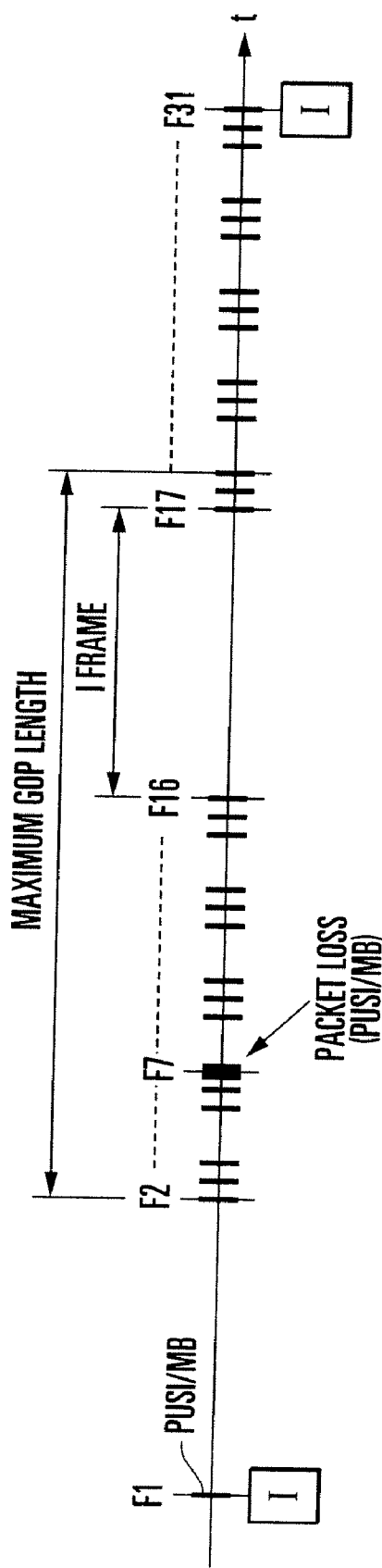
FIG. 37A is an explanatory view showing an example of the frame type determination processing (only a packet is lost at the start of a B or P frame) of the video quality estimation apparatus according to the eighth embodiment of the present invention.

As shown in FIG. 37A, when the start IP packet of the I frame F16 is not lost, but only the start IP packet of the P frame F7 is lost, the frame F1 is recognized as an I frame, and then, the frame F16 having the maximum frame data amount in the subsequent maximum GOP length can be recognized as an I frame. Since the IP packet loss is included in the GOP from the I frame (frame F1), it is considered that the IP packet includes frame identification information (PUSI/MB).

Regarding that the lost IP packet includes frame identification information, frame type determination is performed. If the determination result matches the appearance pattern "IBBPBB", it can be recognized that the IP packet includes frame identification information. Note that this frame type determination is done in a round-robin fashion for combinations that satisfy a condition "typical GOP length in IBBPBB structure=number of frame identification information+number of lost IP packets regarded to include frame identification information". If a plurality of combinations satisfy the condition, the determination result of a combination which minimizes the variations between the frame data amounts of each frame type (P, B) is selected.

The recognition in FIG. 37A is applicable not only to the case in which only the start IP packet of a B frame is lost but also to a case in which only the start IP packet of a P frame is lost. The recognition is also applicable to a case in which only a total of two continuous IP packets, i.e., the start IP packet of a B or P frame and the next IP packet following it are lost.

Figure 37B:
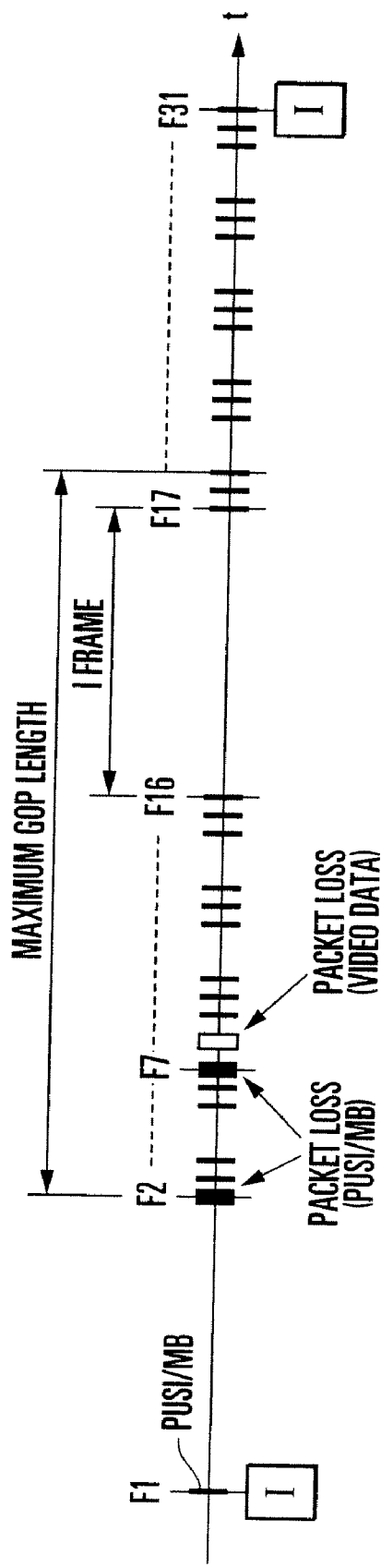
FIG. 37B is an explanatory view showing an example of the frame type determination processing (a plurality of packets are lost at the start of a B or P frame) of the video quality estimation apparatus according to the eighth embodiment of the present invention.

As shown in FIG. 37B, when the start IP packet of the I frame F16 is not lost, but a total of two or more IP packets including the start IP packet of the B frame F2 and the start IP packet of the P frame F7 are lost, the frame F1 is recognized as an I frame, and then, the frame F16 having the maximum frame data amount in the subsequent maximum GOP length can be recognized as an I frame. Since the IP packet losses are included in the GOP from the I frame (frame F1), it is considered that the IP packets include frame identification information (PUSI/MB).

Regarding that the lost IP packets include frame identification information, frame type determination is performed. If the determination result matches the appearance pattern "IBBPBB", it can be recognized that the IP packets include frame identification information. Note that this frame type determination is done in a round-robin fashion for combinations that satisfy a condition "typical GOP length in IBBPBB structure=number of frame identification information+number of lost IP packets regarded to include frame identification information". If a plurality of combinations satisfy the condition, the determination result of a combination which minimizes the variations between the frame data amounts of each frame type (P, B) is selected.

The recognition in FIG. 37B is applicable not only to the case in which the start IP packet of a B frame and the start IP packet of a P frame are lost but also to a case in which the start IP packets of two B frames are lost, or the start IP packets of two P frames are lost. The recognition is also applicable to a case in which one or more IP packets following the lost start IP packet of a B or P frame are lost.

A case will be described with reference to FIG. 38, in which packet losses have occurred at the start of an I frame and at the start of a P or B frame.

Figure 38:
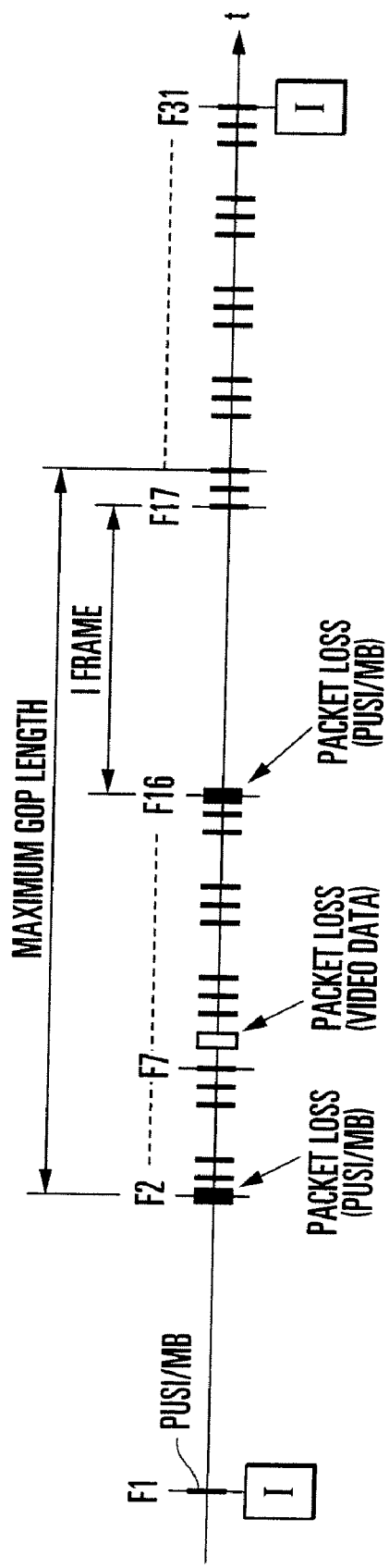
FIG. 38 is an explanatory view showing an example of the frame type determination processing (a plurality of packets are lost at the starts of I, B, and P frames) of the video quality estimation apparatus according to the eighth embodiment of the present invention.

As shown in FIG. 38, when the start IP packet of the B frame F2, an intermediate IP packet (video data) of the P frame F27, and the start IP packet of the I frame F16 are lost, the frame F1 is recognized as an I frame based on I frame identification information, and then, the frame F16 having the maximum frame data amount in the subsequent maximum GOP length can be recognized as an I frame. Since the IP packet losses are included in the GOP from the I frame (frame F1), it is considered that the IP packets include frame identification information (PUSI/MB).

Regarding that each lost IP packet includes frame identification information, frame type determination is performed. If the determination result matches the appearance pattern "IBBPBB", it can be recognized that each IP packet includes frame identification information. Note that this frame type determination is done in a round-robin fashion for combinations that satisfy a condition "typical GOP length in IBBPBB structure=number of frame identification information+number of lost IP packets regarded to include frame identification information". If a plurality of combinations satisfy the condition, the determination result of a combination which minimizes the variations between the frame data amounts of each frame type (P, B) is selected.

The recognition in FIG. 38 is also applicable to a case in which one or more IP packets following the lost start IP packet of an I, B, or P frame are lost.

In the above-described embodiments, details of large/small relationship comparison using a threshold value are set arbitrarily. For example, "equal to or larger than a threshold value" or "equal to or smaller than a threshold value" in determination may be replaced with "larger than a threshold value" or "smaller than a threshold value". This also applies to large/small relationship comparison using not a threshold value but another value such as a determination range.

INDUSTRIAL APPLICABILITY

The video quality estimation apparatus is useful for estimating video quality in a video application which exchanges video data via a communication network and, more particularly, suitable for estimating video quality in video distribution such as digital broadcasting using radio waves or video distribution such as IP retransmission of digital broadcasting using a communication network.

The invention claimed is:

1. A video quality estimation method used by a video quality estimation apparatus including an arithmetic processing unit and a storage unit to estimate, based on TS packets, video quality of video communication which converts an elementary stream into TS packets and transmits the TS packets, the elementary stream being obtained by compression-coding a video signal into a plurality of kinds of frames, comprising:

a storage step of causing the storage unit to store a frame structure of the elementary stream;

a frame type determination step of causing the arithmetic processing unit to count, as a frame data amount of each frame, the number of TS packets included in the frame based on a frame start position included in an input TS packet of the video communication, and determine a frame type based on a large/small relationships between the frame data amounts of the frames; and a video quality estimation step of causing the arithmetic processing unit to estimate the video quality of the video communication based on the frame type of each frame obtained in the frame type determination step, the frame structure of the elementary stream read out from the storage unit, and a TS packet loss state detected from the TS packets of the video communication.

2. A video quality estimation method according to claim 1, wherein the frame type determination step comprises the step of determining, out of temporally continuous frames in a determination period not more than an I frame interval in the elementary stream, a frame having a maximum frame data amount as an I frame.

3. A video quality estimation method according to claim 2, wherein the determination period is a maximum GOP length of the elementary stream.

4. A video quality estimation method according to claim 1, wherein the frame type determination step comprises the step of determining, for a predetermined number of temporally continuous frames including no I frame, a P frame and a B frame in accordance with matching between the frame structure of the elementary stream and a pattern of the large/small relationships between the frame data amounts of the frames.

5. A video quality estimation method according to claim 4, wherein the frame type determination step comprises the step of, when the frame structure of the elementary stream includes a determination frame pattern in which N (N is an integer not less than 4) frames including a plurality of B frames, one P frame, and one B frame temporally continue, and in the N temporally continuous frames including no I frame, all frame data amounts of frames including a start frame to an (N-2)th frame and an Nth frame are smaller than a frame data amount of an (N-1)th frame, determining the (N-1)th frame as a P frame.

6. A video quality estimation method according to claim 4, wherein the frame type determination step comprises the step of determining, as a B frame, each remaining frame which is not determined as a P frame in the predetermined number of temporally continuous frames including no I frame.

7. A video quality estimation method according to claim 1, wherein the frame type determination step comprises the step of checking whether a criterion which is preset for each of a plurality of different appearance patterns and represents a relationship between positions and frame data amounts of frames included in an appearance pattern is satisfied for a plurality of temporally continuous frames including no I frame, and determining a type of each frame based on the appearance pattern corresponding to the satisfied criterion.

8. A video quality estimation method according to claim 7, wherein the criterion includes a large/small relationship between a threshold value calculated based on an average value of frame data amounts of a plurality of frames within a predetermined range of the elementary stream and a frame data amount of each frame in the appearance pattern.

9. A video quality estimation method according to claim 1, wherein the frame type determination step comprises the step of detecting the frame start position based on a value of payload_unit_start_indicator information included in a header portion of the TS packet.

10. A video quality estimation method according to claim 1, wherein the frame type determination step comprises the step of comparing a frame data amount of each of temporally continuous frames including no I frame with a predetermined threshold value, and determining the frame as one of a P frame and a B frame based on a comparison result.

11. A video quality estimation method according to claim 1, wherein the frame type determination step comprises the step of determining, as P frames, all of not less than a predetermined number of continuous frames out of temporally continuous frames including no I frame, in which a frame at a start position has a frame data amount not less than a predetermined threshold value, and frame data amounts of all frames from the start position to an end position fall within a predetermined determination range.

12. A video quality estimation method according to claim 1, wherein the frame type determination step comprises the step of determining an I frame based on a value of one of RAI (random_access_indicator) information and ESPI (elementary_stream_priority_indicator) information included in an adaptation field portion of the TS packet.

13. A video quality estimation method according to claim 1, wherein the frame type determination step comprises the step of detecting a packet loss that has occurred in the elementary stream, assuming a packet loss in which frame break determination information representing the frame start position is lost, and performing the frame type determination based on the frame start position obtained in accordance with an assumption result.

14. A video quality estimation method according to claim 13, wherein the frame type determination step comprises the step of creating a plurality of break interpolation patterns that assume packet losses in which the frame break determination information is lost, performing the frame type determination for each break interpolation pattern based on the frame start position according to the break interpolation pattern, and selecting, from obtained frame type determination results, a frame type determination result for an optimum interpolation pattern, which matches atypical GOP structure preset in the storage unit.

15. A video quality estimation apparatus for estimating, based on TS packets, video quality of video communication which converts an elementary stream into TS packets and transmits the TS packets, the elementary stream being obtained by compression-coding a video signal into a plurality of kinds of frames, comprising:

a storage unit which stores a frame structure of the elementary stream;

a frame type determination unit which counts, as a frame data amount of each frame, the number of TS packets included in the frame based on a frame start position included in an input TS packet of the video communication, and determines a frame type based on a large/small relationships between the frame data amounts of the frames; and a video quality estimation unit which estimates the video quality of the video communication based on the frame type of each frame obtained by said frame type determination unit, the frame structure of the elementary stream read out from the storage unit, and a TS packet loss state detected from the TS packets of the video communication.

16. A frame type determination method of causing a processing apparatus including an arithmetic processing unit and a storage unit to determine a type of each frame based on TS packets in video communication which converts an elementary stream into TS packets and transmits the TS packets, the elementary stream being obtained by compression-coding a video signal into a plurality of kinds of frames, comprising:

a storage step of causing the storage unit to store a frame structure of the elementary stream; and a frame type determination step of causing the arithmetic processing unit to count, as a frame data amount of each frame, the number of TS packets included in the frame based on a frame start position included in an input TS packet of the video communication, and determine a frame type based on a large/small relationships between the frame data amounts of the frames.

17. A non-transitory recording medium recording a program for a video quality estimation apparatus which includes an arithmetic processing unit and a storage unit and estimates, based on TS packets, video quality of video communication which converts an elementary stream into TS packets and transmits the TS packets, the elementary stream being obtained by compression-coding a video signal into a plurality of kinds of frames, the program causing a computer of the video quality estimation apparatus to execute:

a storage step of causing the storage unit to store a frame structure of the elementary stream;

a frame type determination step of causing the arithmetic processing unit to count, as a frame data amount of each frame, the number of TS packets included in the frame based on a frame start position included in an input TS packet of the video communication, and determine a frame type based on a large/small relationships between the frame data amounts of the frames; and a video quality estimation step of causing the arithmetic processing unit to estimate the video quality of the video communication based on the frame type of each frame obtained in the frame type determination step, the frame structure of the elementary stream read out from the storage unit, and a TS packet loss state detected from the TS packets of the video communication.

18. A non-transitory recording medium recording a program for a processing apparatus which includes an arithmetic processing unit and a storage unit and determines a type of each frame based on TS packets in video communication which converts an elementary stream into TS packets and transmits the TS packets, the elementary stream being obtained by compression-coding a video signal into a plurality of kinds of frames, the program causing a computer of the processing apparatus to execute:

a storage step of causing the storage unit to store a frame structure of the elementary stream; and a frame type determination step of causing the arithmetic processing unit to count, as a frame data amount of each frame, the number of TS packets included in the frame based on a frame start position included in an input TS packet of the video communication, and determine a frame type based on a large/small relationships between the frame data amounts of the frames.

* * * * *